(12) United States Patent  
Johnston et al.

(10) Patent No.: US 8,713,073 B2  
(45) Date of Patent: Apr. 29, 2014

(54) MANAGEMENT OF TEMPORAL DATA BY MEANS OF A CANONICAL SCHEMA

(75) Inventors: Thomas M. Johnston, Atlanta, GA (US); Randall James Weis, Lemont, IL (US)

(73) Assignee: Asserted Versioning, LLC, Atlanta, GA (US)

( * ) Notice: Subject to any disclaimer, the term of this patent is extended or adjusted under 35 U.S.C. 154(b) by 0 days.

(21) Appl. No.: 13/528,954

(22) Filed: Jun. 21, 2012

(65) Prior Publication Data

US 2013/0018849 A1 Jan. 17, 2013

Related U.S. Application Data

(63) Continuation-in-part of application No. 12/803,600, filed on Jun. 29, 2010, now Pat. No. 8,219,522.

(51) Int. Cl.
*G06F 17/30* (2006.01)
*G06F 17/00* (2006.01)

(52) U.S. Cl.
USPC ........... 707/802; 707/810; 707/755; 707/756; 707/803; 707/673

(58) Field of Classification Search
CPC ............... G06F 17/30551; G06F 17/30595; G06F 17/30309; G06F 17/30286; G06F 17/30
USPC ......... 707/802, 810, 755, 756, 791, 803, 673; 701/29, 30; 702/182
See application file for complete search history.

(56) References Cited

U.S. PATENT DOCUMENTS

| | | | | |
|---|---|---|---|---|
| 5,440,730 A | * | 8/1995 | Elmasri et al. | 1/1 |
| 7,346,628 B2 | * | 3/2008 | Porter | 1/1 |
| 7,730,032 B2 | * | 6/2010 | Idicula et al. | 707/638 |
| 7,734,659 B2 | | 6/2010 | Lori | |
| 7,970,742 B2 | * | 6/2011 | Hanckel et al. | 707/673 |
| 8,078,626 B1 | * | 12/2011 | Whitt et al. | 707/751 |
| 8,407,180 B1 | * | 3/2013 | Ramesh et al. | 707/609 |

OTHER PUBLICATIONS

Johnston et al; "Time and Time Again: Managing Time in Relational Databases, Part 1"; located at http://www.information-management.com/issues/20070501/1082475-1.html?zkPrintable=true; May 1, 2007; 6 pgs.

Johnston et al; "Time and Time Again: Managing Time in Relational Databases, Part 2—Preliminaries"; located at http://www.information-management.com/infodirect/20070504/1082693-1.html?zkPrintable=true; May 1, 2007; 8 pgs.

(Continued)

*Primary Examiner* — Yicun Wu

(74) *Attorney, Agent, or Firm* — Taylor English Duma LLP

(57) ABSTRACT

Computer programs embodied in computer-readable media that can use canonical schemas to persist data from non-temporal tables, effective-time tables, assertion-time tables, and bitemporal tables, and that can enforce temporal integrity constraints on those tables, are provided. In one embodiment, the canonical schemas are used by database tables. In another embodiment, they are used by the physical files which persist data from those tables. Temporal metadata is used to express temporal requirements. Thus, uni-temporal, bitemporal, and temporally-enabled non-temporal tables can be generated without altering existing data models or designing temporal features into new data models. Support is also provided for managing temporal data that exists in future assertion time, and for using episodes to enforce temporal referential integrity.

22 Claims, 38 Drawing Sheets

(56) References Cited

OTHER PUBLICATIONS

Johnston et al; Time and Time Again; Managing Time in Relational Databases, Part 3—Version Patterns 1 and 2; located at http://www.information-management.com/infodirect/20070518/1084145-1.html?zkPrintable=true; May 1, 2007; 8 pgs.

Johnston et al;Time and Time Again: Managing Time in Relational Databases, Part 4—Preliminaries to Version Pattern 3; located at http://www.information-management.com/infodirect/20070601/1085255-1.html?zkPrintable=true; Jun. 1, 2007; 7 pgs.

Johnston et al; "Time and Time Again: Managing Time in Relational Databases, Part 5: Version Pattern 3"; located at http://www.information-management.com/infodirect/20070615/1086123-1.html?zkPrintable=true; Jun. 1, 2007; 9pgs.

Johnston et al; Time and Time Again: Managing Time in Relational Databases, Part 6: Version Pattern 4; located at http://www.information-management.com/infodirect/20070629/1087439-1.html?zkPrintable=true; Jun. 1, 2007; 7 pgs.

Johnston et al; Time and Time Again: Managing Time in Relational Databases, Part 7: Completing Version Pattern 4; located at http://www.information-management.com/infodirect/20070713/1088592-1.html?zkPrintable=true; Jun. 1, 2007; 6 pgs.

Johnston et al; "Time and Time Again: Managing Time in Relational Databases, Part 8: Version Pattern 5"; located at http://www.information-management.com/infodirect/20070803/1089849-1.html?zkPrintable=true; Aug. 1, 2007; 6 pgs.

Johnston et al; Time and Time Again: Managing Time in Relational Databases, Part 9: Completing Version Pattern 5;located at http://www.information-management.com/infodirect/20070817/1090937-1.html?zkPrintable=true; Aug. 1, 2007; 7 pgs.

Johnston et al; "Time and Time Again: Managing Time in Relational Databases, Part 10—Foreign Keys in Version Tables"; located at http://www.information-management.com/infodirect/20070907/1092319-1.html?zkPrintable=true; Sep. 1, 2007; 7 pgs.

Johnston et al; "Time and Time Again: Managing Time in Relational Databases, Part 11—Foreign Keys in Version Tables Continued"; located at http://www.information-management.com/infodirect/200710050000163-1.html?zk Printable=true; Oct. 1, 2007; 8 pgs.

Johnston et al; "Time and Time Again: Managing Time in Relational Databases, Part 12—Foreign Keys in Version Tables", located at http://www.information-management.com/infodirect/20071019/10000082-1.html?zk Printable=true; Oct. 1, 2007; 10 pgs.

Johnston et al; "Time and Time Again: Managing Time in Relational Databases, Part 13—A Roadmap of the Rest of This Series"; located at http://www.information-management.com/infodirect/2007_45/10000273-1.html?zk Printable=true; Nov. 9, 2007; 12 pgs.

Johnston et al; "Time and Time Again: Managing Time in Relational Databases, Part 14—Versioning with Surrogate Keys"; located at http://www.information-management.com/infodirect/2007_47/10000330-1.html?zk Printable=true; Nov. 30, 2007; 8 pgs.

Johnston et al; "Time and Time Again: Managing Time in Relational Databases, Part 15—For and Against Surrogate Keys"; located at http://www.information-management.com/infodirect/2007_48/10000383-1.html?zk Printable=true; Dec. 7, 2007; 7 pgs.

Johnston et al; Time and Time Again: Managing Time in Relational Databases, Part 16—Physical Implementation of Version Pattern 1; located at http://www.information-management.com/infodirect/2007_51/10000487-1.html?zk Printable=true; Dec. 21, 2007; 5 pgs.

Johnston et al; Time and Time Again: Managing Time in Relational Databases, Part 17—Physical Implementation of Version Pattern 2; located at http://www.information-management.com/infodirect/2008_53/10000583-1.html?zk Printable=true; Jan. 4, 2008; 5 pgs.

Johnston et al; Time and Time Again: Managing Time in Relational Databases, Part 18—Physical Implementation of Version Pattern 3; located at http://www.information-management.com/infodirect/2008_55/10000644-1.html?zk Printable=true; Jan. 18, 2008; 5 pgs.

Johnston et al; "Time and Time Again: Managing Time in Relational Databases, Part 19—RI and Temporal RI"; located at http://www.information-management.com/infodirect/2008_57/10000746-1.html?zkPrintable=true; Feb. 1, 2008; 7 pgs.

Johnston et al; "Time and Time Again: Managing Time in Relational Databases, Part 20—RI and Temporal RI (Continued)"; located at http://www.information-management.com/infodirect/2008_59/10000793-1.html?zk Printable=true; Feb. 15, 2008; 8 pgs.

Johnston et al; "Time and Time Again: Managing Time in Relational Databases, Part 21—Enforcement Time Options for Temporal RI"; located at http://www.information-management.com/infodirect/2008_62/10000912-1.html?zk Printable=true; Mar. 7, 2008; 6 pgs.

Johnston et al; "Time and Time Again: Managing Time in Relational Databases—Part 22: Original and Temporal Deletes:"; located at http://www.information-management.com/infodirect/2008_64/10000972-1.html?zkPrintable=true; Mar. 21, 2008; 7 pgs.

Johnston et al; "Time and Time Again: Managing Time in Relational Databases, Part 23—Original and Temporal Updates"; located at http://www.information-management.com/infodirect/2008_66/10001077-1.html?zkPrintable=true; Apr. 4, 2008; 6 pgs.

Johnston et al; "Time and Time Again: Managing Time in Relational Databases, Part 24: Original and Temporal Updates (Concluded)"; located at http://www.information-management.com/infodirect/2008_68/10001130-1.html?zk Printable=true; Apr. 18, 2008; 6 pgs.

Johnston et al; "Time and Time Again: Managing Time in Relational Databases, Part 25—Original and Temporal Inserts"; located at http://www.information-management.com/infodirect/2008_70/10001237-1.html?zkPrintable=true; May 2, 2008; 7 pgs.

Johnston et al; "Time and Time Again: Managing Time in Relational Databases, Part 26: Points in Time and Periods of Time"; located at http://www.information-management.com/infodirect/2008_72/10001287-1.html?zk Printable=true; May 16, 2008; 6 pgs.

Johnston et al; "Time and Time Again: Managing Time in Relational Databases, Part 27—Original and Temporal Inserts (Concluded)"; located at http://www.information-management.com/infodirect/2008_75110001385-1.html?zk Printable=true; Jun. 6, 2008; 8 pgs.

Johnston et al; "Time and Time Again: Managing Time in Relational Databases, Part 28—A Revised Roadmap"; located at http://www.information-management.com/infodirect/2008_77/10001487-1.html?zkPrintable=true; Jun. 20, 2008; 5 pgs.

Johnston et al; "Time and Time Again: Scenario 1"; located at http://www.information-management.com/news/10002176-1.html?zkPrintable=true; Nov. 5, 2008; 7 pgs.

Johnston et al; "Time and Time Again: Scenario 1, Transaction 2"; located at http://www.information-management.com/news/-10002233-1.html?zkPrintable=true; Nov. 19, 2008; 5 pgs.

Johnston et al; "Time and Time Again: Scenario 1, Transaction 3"; located at http://www.information-management.com/news/10002276-1.html?zkPrintable=true; Dec. 3, 2008; 7 pgs.

Johnston et al; "Time and Time Again: Scenario 1, Transaction 4"; located at http://www.information-management.com/news/10002326-1.html?zkPrintable=true; Dec. 17, 2008; 6 pgs.

Johnston et al; "Time and Time Again: Where We're Going: Themes"; located at http://www.information-management.com/news/10001620-1.html?zkPrintable=true; Jul. 2, 2008; 5 pgs.

Johnston et al; "Time and Time Again: Managing Time in Relational Databases"—A Revised Roadmap; located at http://www.information-management.com/news/10001689-1.html; Jul. 16, 2008; 7 pgs.

Johnston et al; "Time and Time Again: The Importance of Bi-Temporal Data Management"; located at http://www.information-management.com/news/10001751-1.html?zkPrintable=true; Jul. 30, 2008; 6 pgs.

Johnston et al "Time and Time Again: Concluding Our Extended Taxonomy Discussion"; located at http://www.information-management.com/news/10001807-1.html?zkPrintable=true; Aug. 13, 2008; 8 pgs.

Johnston et al; "Time and Time Again: Versions and Episodes"; located at http://www.information-management.com/news/10001901-1.html?zkPrintable=true; Sep. 3, 2008; 8 pgs.

Johnston et al; "Time and Time Again: The Origins of Asserted Versioning"; located at http://www.information-management.com/news/10001956-1.html?zkPrintable=true; Sep. 16, 2008; 5 pgs.

Johnston et al; "Time and Time Again: The Origins of Asserted Versioning"; located at http://www.information-management.com/news/10002021-1.html?zkPrintable=true; Oct. 1, 2008; 5 pgs.

(56) References Cited

OTHER PUBLICATIONS

Johnston et al; "Time and Time Again: The Logical Data Model for Asserted Versioning Examples"; located at http://www.information-management.com/news/10002021-1.html?zkPrintable=true; Oct. 15, 2008; 1 pg.

Johnston et al; "Time and Time Again: State Transformations"; located at http://www.information-management.com/news/10002357-1.html; Jan. 2, 2009; 6 pgs.

Johnston et al; "Time and Time Again: Retroactive Updates"; located at http://www.information-management.com/news/10002381-1.html?zkPrintable=true; Jan. 14, 2009; 6 pgs.

Johnston et al; "Time and Time Again: Proactive Updates, Part 2"; located at http://www.information-management.com/news/10014984-1.html?zkPrintable=true; Feb. 18, 2009; 6 pgs.

Johnston et al; "Time and Time Again: Proactive Updates, Part 3"; located at http://www.information-management.com/news/proactive_update_asserted_versioning_time_and_time_again_closed_episode10015063-1.html?zkPrintable=true; Mar. 10, 2009; 5 pgs.

Johnston et al; "Time and Time Again: Proactive Updates, Part 4"; located at http://www.information-management.com/news/database_proactive_update_closed_episode_current_assertion_asserted_version-10015109-1.html?zkPrintable=true; Apr. 3, 2009; 6 pgs.

Johnston et al; "Time and Time Again:Merging Episodes"; located at http://www.information-management.com/news/merging_episodes-10015206-1.html?zkPrintable=true; Apr. 13, 2009; 6 pgs.

Johnston et al; "Time and Time Again: Splitting Episodes"; located at http://www.information-management.com/news/database_bitemporal_transaction_episode-10015374-1.html?zkPrintable=true; May 6, 2009; 4 pgs.

Johnston et al; "Time and Time Again: Splitting Episodes, Part 2"; located at http://www.information-management.com/news/split_episode_bitemporal_database-10015483-1.html?zkPrintable=true; May 22, 2009; 5 pgs.

Johnston et al; "Time and Time Again: Splitting Episodes, Part 3"; located at http://www.information-management.com/news/split_episode_bitemporal_database-10015564-1.html?zkPrintable=true; Jun. 5, 2009; 4 pgs.

Johnston et al; "Time and Time Again: Proactive Updates, Part 1"; located at http://www.information-management.com/news/10014843-1.html?zkPrintable=true; Feb. 6, 2009; 6 pgs.

Peter Buneman, Sanjeev Khanna, Keishi Tajima, and Wang-Chieu Tan; "Archiving Scientific Data" published in ACM Transactions on Database Systems, vol. 29, No. 1, Mar. 2004, pp. 2-42.

Google scholar search for canonical schema temporal database, printed Mar. 21, 2011; 2 pgs.

Johnston; U.S. Patent Application entitled: The Management of Temporal Data by Means of a Canonical Schema, having U.S. Appl. No. 12/803,600, filed Jun. 29, 2010, 128 pgs.

Johnston; Non-Final Rejection for U.S. Appl. No. 12/803,600, filed Jun. 29, 2010, mailed Mar. 23, 2011; 23 pages.

Johnston; Final Rejection for U.S. Appl. No. 12/803,600, filed Jun. 29, 2010, mailed Jul. 13, 2011; 15 pages.

Njovu, Chiyaba, Ibrahim, Mohammed T.; "A Design Pattern Approach to Bitemporal Data Modelling", Proceedings of the 14th International Workshop on Database and Expert Systems Applications (DEXA '03), (c) 2003 IEEE; 4 pgs.

Johnston; Notice of Allowance for U.S. Appl. No. 12/803,600, filed Jun. 29, 2010, mailed Nov. 16, 2011; 5 pages.

Johnston; Notice of Allowance for U.S. Appl. No. 12/803,600, filed Jun. 29, 2010, mailed Mar. 6, 2012, 5 pgs.

Johnston; Issue Notification for U.S. Appl. No. 12/803,600, filed Jun. 29, 2010, mailed Jun. 20, 2012, 1 pg.

Johnston et al; "Bitemporal modeling with InfoSphere Data Architect, Part 1: Modeling application period temporal requirement"; located at http://www.ibm.com/developerworks/data/libraiy/techarticle/dm-1111bitemporalmodeling/index.html?ca=drs-; Nov. 17, 2011; 18 pgs.

Johnston et al; "Bitemporal modeling with InfoSphere Data Architect, Part 2: Modeling system period temporal requirement"; located at http://www.ibm.com/developerworks/data/libraiy/techarticle/dm-1111bitemporalmodelingpart2/index.html?ca=drs-; Nov. 23, 2011; 17 pgs.

* cited by examiner

505

| *tbl-nm* | bus-key-col-nm |
|---|---|
| Client_AV | client_nbr |
| Policy_AV | policy_nbr |

507

| *tbl-nm* | fkey-col-nm | tfk-col-nm |
|---|---|---|
| Policy_AV | client_nbr | client_oid |

600

| oid | eff-beg-dt | eff-end-dt | asr-beg-dt | asr-end-dt | policy-nbr | *client-oid* | policy-type | copay-amt |
|---|---|---|---|---|---|---|---|---|
| 2117 | Mar10 | 9999 | Mar10 | May10 | P861 | 8094 | HMO | $15 |

601, 605, 609, 615, 617
603, 607, 613, 617

Legend:
- Underlined column headings are primary key columns.
- Italicized column headings are temporal foreign keys.

701 EDIT TRANSACTION
703 SUPPLY TEMPORAL DEFAULTS
705 DEFINE TARGET SPACE
707 MATCH TO TARGET ROWS
709 SUPPLY OID
713 FOR EACH TFK: VALIDATE TRI
715 INSERT THE NEW ROW

| oid | eff-beg-dt | eff-end-dt | asr-beg-dt | asr-end-dt | policy-nbr | *client-oid* | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |

FIG. 11

| oid | eff-beg-dt | eff-end-dt | asr-beg-dt | asr-end-dt | policy-nbr | *client-oid* | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |
| 2117 | Mar10 | 9999 | Mar10 | 9999 | P861 | 8094 | PPO | $15 |

FIG. 12

| oid | eff-beg-dt | eff-end-dt | asr-beg-dt | asr-end-dt | policy-nbr | client-oid | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |
| 2117 | Mar10 | 9999 | Mar10 | Sep10 | P861 | 8094 | PPO | $15 |
| 2117 | Mar10 | Sep10 | Sep10 | 9999 | P861 | 8094 | PPO | $15 |
| 2117 | Sep10 | 9999 | Sep10 | 9999 | P861 | 8094 | PPO | $20 |

FIG. 14

| oid | eff-beg-dt | eff-end-dt | asr-beg-dt | asr-end-dt | client-nbr | client-nm |
|---|---|---|---|---|---|---|
| 8094 | Jan08 | 9999 | Jan08 | 9999 | C457 | Jones |

FIG. 16a

| oid | eff-beg-dt | eff-end-dt | asr-beg-dt | asr-end-dt | client-nbr | client-nm |
|---|---|---|---|---|---|---|
| 8094 | Jan08 | 9999 | Jan08 | Dec10 | C457 | Jones |
| 8094 | Jan08 | Jul10 | Dec10 | 9999 | C457 | Jones |
| 8094 | Nov10 | 9999 | Dec10 | 9999 | C457 | Jones |

FIG. 16b

| oid | eff-beg-dt | eff-end-dt | asr-beg-dt | asr-end-dt | policy-nbr | client-oid | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |
| 2117 | Mar10 | 9999 | Mar10 | Sep10 | P861 | 8094 | PPO | $15 |
| 2117 | Mar10 | Sep10 | Sep10 | Dec10 | P861 | 8094 | PPO | $15 |
| 2117 | Sep10 | 9999 | Sep10 | Dec10 | P861 | 8094 | PPO | $20 |
| 2117 | Mar10 | Jul10 | Dec10 | 9999 | P861 | 8094 | PPO | $15 |
| 2117 | Nov10 | 9999 | Dec10 | 9999 | P861 | 8094 | PPO | $20 |

FIG. 16c

```
CREATE VIEW V_Policy_Uni_Temp_Txn_Time_Curr
AS SELECT oid, asr_beg_dt, asr_end_dt,
client_oid, policy_type, copay_amt
FROM Policy_AV
WHERE eff_beg_dt <= Now() AND eff_end_dt > Now()
```

FIG. 18

```
CREATE VIEW V_Policy_Uni_Temp_Valid_Time_Curr
AS SELECT oid, eff_beg_dt, eff_end_dt,
client_oid, policy_type, copay_amt
FROM Policy_AV
WHERE asr_beg_dt <= Now() AND asr_end_dt > Now()
```

FIG. 19

```
CREATE VIEW V_Client_Non_Temp_Curr
AS SELECT oid, client_nbr, client_nm
FROM Client_AV
WHERE asr_beg_dt <= Now() AND asr_end_dt > Now()
AND eff_beg_dt <= Now() AND eff_end_dt > Now()
```

FIG. 20a

```
CREATE VIEW V_Policy_Non_Temp_Curr
AS SELECT oid, client_oid, policy_type, copay_amt
FROM Policy_AV
WHERE asr_beg_dt <= Now() AND asr_end_dt > Now()
AND eff_beg_dt <= Now() AND eff_end_dt > Now()
```

FIG. 20b

```
CREATE VIEW Policy
AS SELECT policy_nbr AS P.policy_nbr,
       policy_type AS P.policy_type,
       copay_amt AS P.copay_amt,
       client_nbr AS C.client_nbr
FROM V_Policy_Non_Temp_Curr P
JOIN V_Client_Non_Temp_Curr C
ON C.client_oid = P.client_oid
```

FIG. 21

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Mar10 | 9999 | Mar10 | May10 | Mar10 | P861 | 8094 | HMO | $10 |

FIG. 23

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | Jul08 | Jan08 | 9999 | Jan08 | P861 | 8094 | HMO | $10 |
| 2117 | Jul08 | Jan09 | Jul08 | 9999 | Jan08 | P861 | 8094 | HMO | $15 |

FIG. 24

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | 9999 | Jan08 | 9999 | Jan08 | P861 | 8094 | HMO | $10 |
| 2117 | Jul08 | Jan09 | Jul08 | 9999 | Jan08 | P861 | 8094 | HMO | $15 |
| 2117 | Mar10 | 9999 | Mar10 | 9999 | Mar10 | P861 | 8094 | PPO | $15 |

FIG. 25

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | Jul08 | Jan08 | 9999 | Jan08 | P861 | 8094 | HMO | $10 |
| 2117 | Jul08 | Jan09 | Jul08 | 9999 | Jan08 | P861 | 8094 | HMO | $15 |
| 2117 | Mar10 | 9999 | Mar10 | Sep10 | Mar10 | P861 | 8094 | PPO | $15 |
| 2117 | Mar10 | Sep10 | Sep10 | 9999 | Mar10 | P861 | 8094 | PPO | $15 |
| 2117 | Sep10 | 9999 | Sep10 | 9999 | Mar10 | P861 | 8094 | PPO | $20 |

FIG. 26

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | Jul08 | Jan08 | 9999 | Jan08 | P861 | 8094 | HMO | $10 |
| 2117 | Jul08 | Jan09 | Jul08 | 9999 | Jan08 | P861 | 8094 | HMO | $15 |
| 2117 | Mar10 | 9999 | Mar10 | Sep10 | Mar10 | P861 | 8094 | PPO | $15 |
| 2117 | Mar10 | Sep10 | Sep10 | Dec10 | Mar10 | P861 | 8094 | PPO | $15 |
| 2117 | Sep10 | 9999 | Sep10 | Dec10 | Mar10 | P861 | 8094 | PPO | $20 |
| 2117 | Mar10 | Jun10 | Dec10 | 9999 | Mar10 | P861 | 8094 | PPO | $15 |
| 2117 | Nov10 | 9999 | Dec10 | 9999 | Nov10 | P861 | 8094 | PPO | $20 |

FIG. 27

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Mar10 | 9999 | Mar10 | May10 | P861 | 8094 | HMO | $10 | Mar10 |

FIG. 28

| oid | eff-beg-dt | eff-end-dt | asr-beg-dt | asr-end-dt | client-nbr | client-nm | row-crt-dt |
|---|---|---|---|---|---|---|---|
| 8094 | Jun08 | Feb12 | Jun08 | 9999 | C457 | Jones | Jun08 |
| 8094 | Sep12 | 9999 | Mar12 | 9999 | C457 | Jones | Oct11 |

FIG. 30a

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul12 | 9999 | P861 | 8094 | PPO | $50 | Mar12 |

FIG. 30b

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul12 | Sep12 | P861 | 8094 | PPO | $50 | Mar12 |
| 2117 | Jan13 | Jun13 | Sep12 | 9999 | P861 | 8094 | PPO | $40 | May12 |
| 2117 | Jun13 | Jan14 | Sep12 | 9999 | P861 | 8094 | PPO | $50 | May12 |

FIG. 31

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul90 | 9999 | P861 | 8094 | PPO | $50 | Mar12 |

FIG. 32a

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul90 | Jul93 | P861 | 8094 | PPO | $50 | Mar12 |
| 2117 | Jan13 | Jun13 | Jul93 | 9999 | P861 | 8094 | PPO | $40 | May12 |
| 2117 | Jun13 | Jan14 | Jul93 | 9999 | P861 | 8094 | PPO | $50 | May12 |

FIG. 32b

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul90 | Jun12 | P861 | 8094 | PPO | $50 | Mar12 |
| 2117 | Jan13 | Jun13 | Jun12 | 9999 | P861 | 8094 | PPO | $40 | May12 |
| 2117 | Jun13 | Jan14 | Jun12 | 9999 | P861 | 8094 | PPO | $50 | May12 |

FIG. 32c

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jun12 | 9999 | P861 | 8094 | PPO | $50 | Mar12 |
| 2117 | Jan13 | Jun13 | Jul93 | Jun12 | P861 | 8094 | PPO | $40 | May12 |
| 2117 | Jun13 | Jan14 | Jul93 | Jun12 | P861 | 8094 | PPO | $50 | May12 |

| gcust-rgn | gcust-nbr | eff-per | asr-per | name | type |
|---|---|---|---|---|---|
| SW | C123 | Feb09-9999 | Feb09-9999 | Smith | VIP |

| gslsprsn-id | eff-per | asr-per | name | position |
|---|---|---|---|---|
| 7102 | Oct09-9999 | Oct09-9999 | Jones | Mgr-2 |

| gcust-rgn-tfk | gcust-nbr-tfk | gslsprsn-id-tfk | eff-per | asr-per | tot-sales |
|---|---|---|---|---|---|
| SW | C123 | 7102 | Jun10-9999 | Jun10-9999 | $75000 |

613,601 — 780 — 781 — 617 — 600; 615, 615

511
*Database-Metadata*

| db-id | prcrsr-data-model-info | target-db-info |
|---|---|---|
| 1 | ---------- | ---------- |

FIG. 38a

513
*Table-Metadata*

| db-id | tbl-id | prcrsr-tbl-nm | prcrsr-tbl-typ | gen-tbl-nm |
|---|---|---|---|---|
| 1 | 1 | Customer_P | non-temp | Customer_G |
| 1 | 2 | Salesperson_P | non-temp | Salesperson_G |
| 1 | 3 | Cust_Slsprsn_Xref_P | non-temp | Cust_Slsprsn_Xref_G |

| gen-tbl-typ | gen-tbl-oid-typ | gen-tbl-pk-typ | gen-tbl-sk-pk-col-nm |
|---|---|---|---|
| bitemp canonical | bk | tui | [null] |
| bitemp canonical | bk | tui | [null] |
| bitemp canonical | bk | tui | [null] |

FIG. 38b

515
BK-Column-Metadata

| db-id | tbl-id | bk-col-seq-nbr | bk-col-nm |
|---|---|---|---|
| 1 | 1 | 1 | gcust_rgn |
| 1 | 1 | 2 | gcust_nbr |
| 1 | 2 | 1 | gslsprsn-id |
| 1 | 3 | 1 | gcust_rgn_tfk |
| 1 | 3 | 2 | gcust_nbr_tfk |
| 1 | 3 | 3 | gslsprsn_id_tfk |

*FIG. 38c*

517
TFK-Metadata

| parent-db-id | parent-tbl-id | child-db-id | child-tbl-id | tfk-seq-nbr | min-card | max-card | del-rule |
|---|---|---|---|---|---|---|---|
| 1 | 1 | 1 | 3 | 1 | 0 | M | set null |
| 1 | 2 | 1 | 3 | 2 | 0 | M | cascade |

*FIG. 38d*

519
TFK-Column-Metadata

| parent-db-id | parent-tbl-id | child-db-id | child-tbl-id | tfk-seq-nbr | tfk-col-seq-nbr | tfk-col-nm |
|---|---|---|---|---|---|---|
| 1 | 1 | 1 | 3 | 1 | 1 | gcust_rgn_tfk |
| 1 | 1 | 1 | 3 | 1 | 2 | gcust_nbr_tfk |
| 1 | 2 | 1 | 3 | 2 | 1 | gslsprsn_id_tfk |

TUI-Column-Metadata

| db-id | tbl-id | tui-col-seq-nbr | tui-col-nm | eff-tp-flg | asr-tp-flg |
|---|---|---|---|---|---|
| 1 | 1 | 1 | gcust_rgn | 0 | 0 |
| 1 | 1 | 2 | gcust_nbr | 0 | 0 |
| 1 | 1 | 3 | eff_per | 1 | 0 |
| 1 | 1 | 4 | asr_per | 0 | 1 |
| 1 | 2 | 1 | gslsprsn_id | 0 | 0 |
| 1 | 2 | 2 | eff_per | 1 | 0 |
| 1 | 2 | 3 | asr_per | 0 | 1 |
| 1 | 3 | 1 | gcust_rgn_tfk | 0 | 0 |
| 1 | 3 | 2 | gcust_nbr_tfk | 0 | 0 |
| 1 | 3 | 3 | gslsprsn_id_tfk | 0 | 0 |
| 1 | 3 | 4 | eff_per | 1 | 0 |
| 1 | 3 | 5 | asr_per | 0 | 1 |

Non-Key-Metadata

| db-id | tbl-id | nk-seq-nbr | prcrsr-col-nm | gen-col-nm |
|---|---|---|---|---|
| 1 | 1 | 1 | name | name |
| 1 | 1 | 2 | type | type |
| 1 | 2 | 1 | name | name |
| 1 | 2 | 2 | position | position |
| 1 | 3 | 1 | tot_sales | tot_sales |

FIG. 38g

| cust-rgn | cust-nbr | name | type |
|---|---|---|---|
| SW | C123 | Smith | VIP |

} 303

| cust-id | cust-rgn | cust-nbr | eff-per | asr-per | name | type |
|---|---|---|---|---|---|---|
| 0005 | SW | C123 | Feb09-9999 | Feb09-9999 | Smith | VIP |

622 — cust-id; 613,601 — cust-rgn/cust-nbr; 780 — eff-per; 617 — name; 617 — type; } 600; 782 brace under eff-per/asr-per

FIG. 39

| client | name | type |
|---|---|---|
| C457 | Jones | R2 |
| C772 | Smith | R1 |

} 303

| obj-id | eff-per | asr-per | client-nbr | name | type |
|---|---|---|---|---|---|
| 8094 | Jan08-9999 | Jan08-9999 | C457 | Jones | R2 |
| 2715 | Jan07-9999 | Jan07-9999 | C772 | Smith | R1 |

| pol-nbr | client-nbr | type | copay-amt |
|---|---|---|---|
| P861 | C457 | HMO | $15 |

} 303

| obj-id | eff-per | asr-per | policy-nbr | client-oid | type | copay-amt |
|---|---|---|---|---|---|---|
| 2117 | Feb09-9999 | Feb09-9999 | P861 | 8094 | HMO | $15 |

| pol-nbr | client-nbr | type | copay-amt |
|---|---|---|---|
| P861 | C457 | HMO | $15 |

} 303

| obj-id | eff-per | asr-per | policy-nbr | client-oid | type | copay-amt |
|---|---|---|---|---|---|---|
| 2117 | Feb09-9999 | Feb09-Jul09 | P861 | 8094 | HMO | $15 |
| 2117 | Feb09-Jul09 | Jul09-9999 | P861 | 8094 | HMO | $15 |
| 2117 | Jul09-9999 | Jul09-9999 | P861 | 8094 | HMO | $25 |

| pol-nbr | client-nbr | type | copay-amt |
|---|---|---|---|
| P861 | C772 | HMO | $25 |

} 303

| obj-id | eff-per | asr-per | policy-nbr | client-oid | type | copay-amt |
|---|---|---|---|---|---|---|
| 2117 | Feb09-9999 | Feb09-Jul09 | P861 | 8094 | HMO | $15 |
| 2117 | Feb09-Jul09 | Jul09-9999 | P861 | 8094 | HMO | $15 |
| 2117 | Jul09-9999 | Jul09-Jan10 | P861 | 8094 | HMO | $25 |
| 2117 | Jul09-Jan10 | Jan10-9999 | P861 | 8094 | HMO | $25 |
| 2117 | Jan10-9999 | Jan10-9999 | P861 | 2715 | HMO | $25 |

| pol-nbr | client-nbr | type | copay-amt |
|---|---|---|---|
|  |  |  |  |

} 303

| obj-id | eff-per | asr-per | policy-nbr | client-oid | type | copay-amt |
|---|---|---|---|---|---|---|
| 2117 | Feb09-9999 | Feb09-Jul09 | P861 | 8094 | HMO | $15 |
| 2117 | Feb09-Jul09 | Jul09-9999 | P861 | 8094 | HMO | $15 |
| 2117 | Jul09-9999 | Jul09-Jan10 | P861 | 8094 | HMO | $25 |
| 2117 | Jul09-Jan10 | Jan10-9999 | P861 | 8094 | HMO | $25 |
| 2117 | Jan10-9999 | Jan10-Jul10 | P861 | 2715 | HMO | $25 |
| 2117 | Jan10-Jul10 | Jul10-9999 | P861 | 2715 | HMO | $25 |

511
*Database-Metadata*

| db-id | prcrsr-data-model-info | target-db-info |
|---|---|---|
| 23 | ---------- | ---------- |

FIG. 45a

513
*Table-Metadata*

| db-id | tbl-id | prcrsr-tbl-nm | prcrsr-tbl-typ | gen-tbl-nm |
|---|---|---|---|---|
| 23 | 1 | Client_P | non-temp | Client_G |
| 23 | 2 | Policy_P | non-temp | Policy_G |

| gen-tbl-typ | gen-tbl-oid-typ | gen-tbl-pk-typ | gen-tbl-sk-pk-col-nm |
|---|---|---|---|
| bitemp canonical | sk | tui | [null] |
| bitemp canonical | sk | tui | [null] |

FIG. 45b

515
*BK-Column-Metadata*

| db-id | tbl-id | bk-col-seq-nbr | bk-col-nm |
|---|---|---|---|
| 23 | 1 | 1 | client-nbr |
| 23 | 2 | 1 | policy-nbr |

*TFK-Metadata*

| parent-db-id | parent-tbl-id | child-db-id | child-tbl-id | tfk-seq-nbr | min-card | max-card | del-rule |
|---|---|---|---|---|---|---|---|
| 23 | 1 | 23 | 2 | 1 | 0 | M | set null |

*TFK-Column-Metadata*

| parent-db-id | parent-tbl-id | child-db-id | child-tbl-id | tfk-seq-nbr | tfk-col-seq-nbr | tfk-col-nm |
|---|---|---|---|---|---|---|
| 23 | 1 | 23 | 2 | 1 | 1 | client-oid |

*TUI-Column-Metadata*

| db-id | tbl-id | tui-col-seq-nbr | tui-col-nm | eff-tp-flg | asr-tp-flg |
|---|---|---|---|---|---|
| 23 | 1 | 1 | obj-id | 0 | 0 |
| 23 | 1 | 2 | eff-per | 1 | 0 |
| 23 | 1 | 3 | asr-per | 0 | 1 |
| 23 | 2 | 1 | obj-id | 0 | 0 |
| 23 | 2 | 2 | eff-per | 1 | 0 |
| 23 | 2 | 3 | asr-per | 0 | 1 |

*Non-Key-Metadata*

| db-id | tbl-id | nk-seq-nbr | prcrsr-col-nm | gen-col-nm |
|---|---|---|---|---|
| 23 | 1 | 1 | type | type |
| 23 | 1 | 2 | copay-amt | copay-amt |
| 23 | 2 | 1 | name | name |
| 23 | 2 | 2 | type | type |

*Database-Metadata*

| db-id | prcrsr-data-model-info | target-db-info |
|---|---|---|
| 7 | ---------- | ---------- |

*Table-Metadata*

| db-id | tbl-id | prcrsr-tbl-nm | prcrsr-tbl-typ | gen-tbl-nm |
|---|---|---|---|---|
| 7 | 1 | Supplier-P | effective | Supplier-G |

| gen-tbl-typ | gen-tbl-oid-typ | gen-tbl-pk-typ | gen-tbl-sk-pk-col-nm |
|---|---|---|---|
| bitemp canonical | sk | tui | [null] |

*Business-Key-Column-Metadata*

| db-id | tbl-id | bk-col-seq-nbr | bk-col-nm |
|---|---|---|---|
| 7 | 1 | 1 | snbr-bk |
| 7 | 1 | 2 | eff-tp |

FIG. 50c

521
TUI-Column-Metadata

| db-id | tbl-id | tui-col-seq-nbr | tui-col-nm | eff-tp-flg | asr-tp-flg |
|---|---|---|---|---|---|
| 7 | 1 | 1 | supp-sk-id | 0 | 0 |
| 7 | 1 | 2 | eff-tp | 1 | 0 |
| 7 | 1 | 3 | asr-tp | 0 | 1 |

FIG. 50d

523
Non-Key-Metadata

| db-id | tbl-id | nk-seq-nbr | prcrsr-col-nm | gen-col-nm |
|---|---|---|---|---|
| 7 | 1 | 1 | supp-nm | s-nm |
| 7 | 1 | 2 | supp-typ | s-typ |

FIG. 50e

525
Precursor-Time-Period-Metadata

| db-id | tbl-id | tp-typ | tp-one-col-nm | tp-from-col-nm |
|---|---|---|---|---|
| 1 | 1 | effective | supp-ver-beg-ts | [null] |

| tp-to-col-nm | tp-open-closed-cnvntn |
|---|---|
| [null] | closed-open |

FIG. 50f

MANAGEMENT OF TEMPORAL DATA BY MEANS OF A CANONICAL SCHEMA

CROSS REFERENCE TO RELATED APPLICATION

This application is a continuation-in-part of U.S. patent application Ser. No. 12/803,600, filed Jun. 29, 2010, the entirety of which is hereby incorporated by reference herein.

FIELD OF THE INVENTION

This is an invention related to the management of temporal data in relational databases.

BACKGROUND AND INTRODUCTION TO THE INVENTION

Temporal data is data that keeps track of changes over time. It is data, more precisely, that keeps track of changes along either one or two temporal dimensions.

One of these temporal dimensions is called "valid time" by computer scientists. In valid time, modifications to data in a database reflect changes happening in the world around us, and that we wish to keep track of. The second of these two temporal dimensions is called "transaction time" by computer scientists. Transaction time keeps track of when data is initially entered into a database. In addition, transaction time keeps track of modifications to data in a database that do not reflect anything that is happening in the world around us. Instead, these modifications are made to adjust the data in some way, independent of what is happening to what the data represents. For the most part, these adjustments are made to correct mistakes found in the data.

Attempts to manage temporal data that varies in valid time may be found in many business applications. Research into temporal data that varies in both valid time and transaction time has been ongoing in the computer science community for several decades. Although there is still no de jure SQL standard for managing temporal data, DBMS vendors have begun to add support for temporal data to their DBMSs and related products.

Before proceeding, we will introduce some needed terminology. We prefix most of our definitions of terms with "(def)".

(def) temporal data: data that keeps track of changes over time.

(def) temporal table: a table that contains temporal data.

(def) temporal database: a database that contains at least one temporal table.

(def) temporal dimension: a semantic interpretation given to points in time and periods of time. Points in time and periods of time that belong to different temporal dimensions cannot be compared; they are incommensurable. Points in time and periods of time in the same temporal dimension can be compared as to their relative positions along the timeline which that temporal dimension interprets. For example, one time period may end before another time period begins, or may overlap that other time period, or may be contained within that other time period, or may end at the same time as that other time period, and so on.

(def) non-temporal table, conventional table: a non-temporal table, which we will also call a "conventional table", is a table whose rows stand for statements about what we currently assert the things those rows represent are currently like. Each row describes what the object it represents is currently like; in other words, it describes the current state of that object. Also, by its presence in the table, each row represents the assertion that the statement made by that row is true. If we believed that the statement were not true, we would remove the row from the table.

In a conventional table, anything that is represented by a row in that table is represented by only one row. A conventional table contains no history about the things which its rows represent. It does not contain any history about erroneous data that was later corrected. It also contains no data about the future, i.e. about what the things its rows represent may be like at some future point in time.

(def) conventional database: a database all of whose tables are conventional tables.

(def) object: anything that can be distinguished from other instances of its type, and that can change over time. So, for example, specific customers, products, employees and invoices are all objects. A relationship represented by a row in an associative table, such as a table relating customers to salespersons, is also an object. An event is not an object, because once an event has taken place, it is over and cannot change.

(def) type of object: the kind of thing something is. A type of object is represented, in a database, by a table. Each instance of that type is represented, in a conventional database, by a row in that table.

(def) statement: a description of something. In a natural language, a statement is made by writing or uttering a declarative sentence in a "normal" context, i.e. a context in which it is understood that by writing or uttering that sentence, one is also willing to affirm that what it says is true.

Each row in a table makes a statement about the object it represents. For example, consider a row in a non-temporal table of customers, where the columns of the table consist of a customer number primary key, a customer last name, and a customer status code, and the row consists of the values, respectively, "C123", "Jones" and "VIP". This row makes the statement "There exists a customer with customer number 'C123', last name 'Jones' and status code 'VIP'". The presence of this row in its non-temporal table is the assertion that this statement is true.

(def) uni-temporal data: data that tracks changes in one and only one of the two temporal dimensions.

(def) valid time, effective time: the temporal dimension that computer scientists call "valid time", we will call "effective time". As stated above, in valid time, modifications to data in a database reflect changes happening in the world around us, and that we wish to keep track of.

(def) uni-temporal version data, uni-temporal version table: uni-temporal data that tracks changes in effective time we will call "uni-temporal version data", and we will call temporal tables that contain such data "uni-temporal version tables".

(def) version: a row in a uni-temporal version table is a version of the object it represents. Sometimes, we will use the word "versioned" instead of "version" in these expressions.

(def) transaction time, assertion time: the temporal dimension that computer scientists call "transaction time" is semantically a proper subset of the temporal dimension that we will call "assertion time". As stated above, in transaction time, modifications to data in a database do not reflect anything that is happening in the world around us. Instead, these modifications are made to adjust the data in some way, usually in order to correct mistakes found in the data. We allow data to be associated with future periods of assertion time, and it is this association which extends the semantics of assertion time beyond the semantics of transaction time. But except in this context, we do not allow data to be associated with future periods of assertion time. When we do not, "assertion time" and "transaction time" are equivalent terms; all instances of the one are instances of the other. See also the later section entitled Fundamental Concepts: Transaction Time and Assertion Time.

(def) uni-temporal assertion data, uni-temporal assertion tables: uni-temporal data that tracks changes in assertion time we will call "uni-temporal assertion data", and we will call temporal tables that contain such data "uni-temporal assertion tables".

(def) assertion: a claim that a statement is true. A row in a uni-temporal assertion table is an assertion of the statement made by that row, about the object it represents.

In the phrases "uni-temporal version" and "uni-temporal assertion", "uni-temporal" may be unnecessary, and so we may sometimes drop it.

(def) bi-temporal data, bi-temporal table: data that tracks changes in both temporal dimensions. We will call tables that contain bi-temporal data "bi-temporal tables". Rows in bi-temporal tables are both versions and assertions.

bitemporal, bi-temporal: we note that, in the prior art, the term "bitemporal" is sometimes used instead of the term "bi-temporal".

We proceed now to a review of the prior art.

2000: Developing Time-Oriented Database Applications in SQL.

R. T. Snodgrass. *Developing Time-Oriented Database Applications in SQL* (Morgan-Kaufmann, 2000).

This book, written by the leading researcher in the field of temporal data management, explains how to support temporal data management using Database Management Systems (DBMSs) and SQL current at the time of publication of the book. It describes an implementation of the basic concepts of temporal data management, an implementation which includes three kinds of temporal table. The first kind is called a "valid-time state table", and is the way that the invention described in this book manages temporal data which keeps track of changes in valid time. The second kind is called a "transaction-time state table", and is the way that the invention described in this book manages temporal data which keeps track of changes in transaction time. The third kind is called a "bitemporal table", and is the way that the invention described in this book manages temporal data which keeps track of changes in both valid time and in transaction time.

This book is an invaluable source of SQL code fragments that illustrate the complexity of managing bi-temporal data and, in particular, that illustrate the complexity of writing entity integrity and referential integrity constraints against temporal data. It constitutes a reduction to then-current practice of the underlying concepts of temporal data management.

We will refer to these temporal concepts, and the reduction to practice as described in this book, as the "baseline model of temporal data management" (or, for short, the "baseline temporal model"). It constitutes the invention on which our own invention is claimed to be an improvement.

Our invention is an improvement on the baseline temporal model in several ways. First, our invention uses a single canonical schema to express all temporal data. This schema is a bi-temporal schema, and so all temporal tables in our invention are bi-temporal tables. In our invention, therefore, temporal data which changes only in valid time, or temporal data which changes only in transaction time, are not kept track of by means of tables with different schemas, tables which use only one of the two temporal dimensions. With our invention, either kind of uni-temporal data can be maintained as bi-temporal data for which one of the time periods is not specified on maintenance transactions and instead takes on a default value. With our invention, either kind of uni-temporal table can be manifested as a queryable object by defining a uni-temporal view on the underlying bi-temporal table.

Our invention, in contrast to the baseline temporal model, also enforces entity integrity and referential integrity constraints on temporal data at the time that data is being maintained. It does so by means of insert, update and delete transactions. Consequently, in contrast to the baseline temporal model, a temporal database maintained by our invention will never contain temporal data that violates these constraints.

Our invention, in contrast to the baseline temporal model, also provides a surrogate-valued unique identifier of the objects represented by rows in tables. This provides a common syntax for uniquely identifying those objects, which is the same in all temporal tables in the database. With this common syntax which, in our preferred embodiment is a single surrogate-valued column, the primary keys of all temporal tables will be syntactically identical. This syntactic identity of the primary keys of all temporal tables simplifies the program code required to manage all forms of temporal data.

Our invention, in contrast to the baseline temporal model, also expresses all temporal data requirements as metadata. It thereby avoids the need to express those requirements in relational logical data models, or in entity-relationship logical data models, or in physical data models. It replaces a design specification in data models with a declarative specification in metadata.

Our invention, in contrast to the baseline temporal model, also extends the concept of transaction time to cover data which exists in future transaction time. We call maintenance transactions that specify future transaction time "deferred transactions", and we call the rows that result from applying them to a temporal database "deferred assertions". With deferred assertions, we eliminate the need to maintain separate datasets of transactions which are not yet ready to be applied to their target tables.

2002: Temporal Data and the Relational Model.

C. J. Date, Hugh Darwen, Nikos Lorentzos. *Temporal Data and the Relational Model*. (Morgan-Kaufmann, 2002).

While the main focus of our patent application, and also of the baseline temporal model, is row-level management of bi-temporal data, the main focus of Date, Darwen and Lorentzos' book is row- and column-level management of uni-temporal data. While the main focus of our patent application, and of the baseline temporal model, is on implementing temporal data management with current DBMSs and current SQL, the main focus of this book is on describing language extensions that contain new operators for manipulating versioned data. On both these counts, then, this book is essentially orthogonal to this patent application. We include it here because of the prominence of its authors.

2004: Oracle 10 g Flashback Queries and Workspace Manager.

Oracle 10 g extended the flashback queries of Oracle 9i to retrieve all the versions of a row between two transaction times, and allowed tables and databases to be rolled back to a previous transaction time, discarding all changes after that time.

However, Oracle's 10 g flashback queries, like Oracle's earlier 9i flashback queries, are queries based on restoring data as of a past point in time, and then rolling forward to a designated later point in time. Like 9i flashback queries, 10 g flashback queries do not address the problems involved in creating and maintaining temporal data.

With 10 g Workspace Manager, Oracle began to address the issues involved in creating and maintaining temporal data.

The Oracle 10 g Workspace Manager includes valid-time support, transaction-time support, support for bi-temporal tables, and support for referential integrity relationships between temporal tables.

Our invention, in contrast to this work, manages all temporal data with only one kind of temporal table, that being a bi-temporal table, and it provides a method of managing all temporal data in a single table for each type of object represented, e.g. of managing all temporal data about customers in one customer table. When this is not done, as it is not done in any of Oracle's products or patents or patent applications of which we are aware, then in order to respond to a query about specific objects, as data located in one or two temporal time periods describes those objects, it may be necessary to assemble, or "re-constitute" (to use Oracle's own terminology) the requested data out of a repository of "raw material". This process is, conceptually, the same as the decades-old process of re-constituting desired data by restoring a database backup, and then using a transaction log to roll forward to a desired point in time.

Our invention, in contrast to this work, also eliminates the need to manage datasets which are collections of transactions not yet ready to be applied to production database tables. Oracle's workspaces are precisely such collections of transactions, and they are managed as datasets which are distinct from the production tables to which those transactions are intended to later be applied.

2005: Database System that Provides for History-Enabled Tables.

United States Patent Application 20070130226

Filed: Dec. 1, 2005

This prior art describes techniques for history enabling a table in a database system so that past versions of rows of the history-enabled table are available for temporal querying. The table is history enabled by adding a start time column to the table and creating a separate history table for the historical data. The start time field's value in a row of the history-enabled table indicates when the contents of the row last changed. The rows of the history table are copies of rows of the history-enabled table that have been deleted or updated. The rows include end time fields whose values indicate when the row was updated or deleted.

This prior art describes the management of data by associating it with only one time period. But first of all, if this time period were clearly valid time, or clearly transaction time, then it would describe only a method of managing uni-temporal data, whereas our invention is a method of managing bi-temporal data which fully subsumes the management of uni-temporal data.

Secondly, however, this prior art does not distinguish changes to data which were made to reflect changes to the objects represented by rows in a table, from changes to data made to correct errors in that data. It thus fails to distinguish valid time from transaction time, simply using transaction time as its single temporal dimension. It does not support either temporal dimension because it indiscriminately supports both.

Also, even if this prior art did describe a method for managing a uni-temporal history of changes to a table, it does not describe any method for managing data which exists in future effective time, or data which exists in future assertion time.

1997: An IBM Insurance Application Architecture Certified Bi-Temporal Database.

This database, designed and implemented by one of the authors of this patent application (Weis) supports the management and querying of bi-temporal tables. However, to carry out any modification to those bi-temporal tables, each of the physical transactions required to complete the modification must be "hand-written". Thus a single modification, e.g. a request to extend the effective start date of an insurance policy back to the beginning of the calendar year, might easily require half-a-dozen or more physical transactions, submitted to the DBMS in a specific sequence, and constituting an atomic unit of work. Errors in writing sets of these transactions have occurred frequently even though only experienced DBAs and SQL coders are used to write these transactions.

Our invention, in contrast to this work, permits modifications to temporal data to be expressed as single insert, update or delete statements which we call "temporal transactions". Our Asserted Versioning Framework (or, for short, "AVF"), shown as 111 in FIG. 1, accepts these temporal transactions and translates them into the multiple physical insert, update and delete statements which carry out the modification. This eliminates the frequent errors which appear when temporal modifications must be hand-written as sets of physical transactions.

2007-2009: The "Time and Time Again" Series.

This is a bi-monthly series of articles written by the authors of this patent application (Johnston and Weis). The series began in the May 2007 issue of *DM Review magazine* (now *Information Management*), and ran continuously in *DM Direct* (now *Information Management Direct*), up to the time of our preliminary patent application which was filed on Jun. 24, 2009.

One of the implementations in this patent application introduces the concept of an episode as a managed object, i.e. as an abstract data type, defined and manipulated by our invention. Episodes are first discussed in this prior art in Part 4, published in June 2007. But this and later discussions of episodes in this series of articles describe episodes in the context of a single temporal dimension, not in the context of bi-temporality.

In particular, in Part 19 (February 2008), we do provide a clear statement that episodes are the parent managed objects in temporal referential integrity relationships. We say that temporal referential integrity "prevents a child row from being effective before or after the continuous time range of an episode of the parent object." This is a true statement about what the temporal referential constraint is, but nowhere in this series do we describe a process for implementing the constraint checking.

For these two reasons, we conclude that the use of episodes, in a bi-temporal context, to enforce temporal referential integrity is both novel and unobvious with reference to this prior art.

2008: Presentation Made to the Manhattan Erwin User's Group.

This is a presentation made on June $3^{rd}$ to the ERwin User's Group in Manhattan. It contains no material not presented in the "Time and Time Again" prior art described above.

2009: Oracle 11 g Workspace Manager.

The Oracle 11 g Workspace Manager is Oracle's current implementation of support for the management of temporal data that is not yet ready to apply to a database. It is a way of supporting what we call "pending transactions".

(def) pending transactions: collections of transactions that have been written but not yet submitted to the DBMS to be applied to a database.

Oracle's workspaces are hierarchical collections of pending transactions which can be modified, by means of insert, update, and delete transactions, without modifying the table from which they may have been originally extracted, and to which they will eventually be applied if they are not discarded.

However, this method of managing pending transactions creates many problems of its own. In particular, by distributing temporal data across different kinds and instances of physical and logical datasets, it separates this category of temporal data from other uni-temporal or bi-temporal data which exists in database tables. Thus, once a workspace is approved as containing data that the business wishes to include in those tables, IT technical personnel must begin by manipulating those datasets, and must note and resolve any inconsistencies that may have been introduced into the data.

Only after this work has been done will those technical personnel be able to move the designated data into the appropriate database tables. The latency incurred between the approval of designated workspace data, and its availability to the business user as rows in production tables, may thus be a matter of hours or even days.

In our invention, all temporal data is contained in one place, that being the temporal database tables managed by this invention. This includes the results of immediately applying all database transactions instead of managing some transactions in separate datasets. Those results are stored as rows in those tables, but the rows which correspond to pending transactions are not accessible to normal queries until the future point in assertion time associated with them becomes current. In some cases, these pending transactions create and modify data that will not become current for perhaps decades or centuries. This data will never become current "by accident", i.e. by the mere passage of time. Instead, it will not become current unless and until it is explicitly approved to become current. Once approved, it is "moved up" from that decades or centuries from now period of assertion time, to a point in assertion time that may be only a few seconds from the present moment. This "move up" of this approved data is a matter of changing a date (or timestamp) on one or more rows already in the database table they belong to. Thus, once approved, the latency involved in changing the status of those rows to current data, accessible to normal queries, is a matter of seconds or milliseconds. Moreover, even prior to that approval, our invention makes it possible to retrieve that pending data, alone or in combination with other temporal data in the same production tables, using SQL queries that a business user can write.

Oracle's version tables are one kind of uni-temporal table. They are what we call uni-temporal assertion tables. Their valid-time tables are another kind of uni-temporal table, the kind we call uni-temporal version tables. Together with bi-temporal tables, this means that there are three categories of temporal table in Oracle databases that must be managed, even if we do not count workspaces of pending transactions. In our invention, all temporal data is managed in bi-temporal tables, and those bi-temporal tables share a common canonical schema, thereby simplifying the maintenance and querying of that data and those tables.

2009: Temporal Relational Database Management System.

United States Patent Application 20090248727
Filed: Dec. 2, 2008.

This patent application describes a method for managing changes in both data values and in database schemas. The basic approach is to store a history of changes in a transaction log in which each transaction is associated with points in time in several temporal dimensions, including valid time and transaction time. Then, whenever a query is submitted to the DBMS, the DBMS "re-constitutes" both the schemas which interpret the data values, and the data values themselves, from the transaction log. By specifying different points in time or periods of time in these queries, the DBMS is able to support bi-temporal data.

Our invention does not address the problem known as "schema evolution", and so does not attempt to manage changes to database schemas.

The method described in this patent application, of storing data values as transactions, and then producing result sets for queries by processing an appropriate subset of transactions in response to each query, is not used in our invention.

Instead, our invention stores the results of transactions in the tables they update, and therefore our invention does not have to dynamically "re-constitute" the data requested by a query. It stores the results of transactions whose data describes the past, present or future states of the objects represented by the data in those tables. In this way, it supports valid time. It also stores corrections to data already entered, but keeps a record of the corrected data also. In this way, it supports transaction time.

In one of our implementations, our invention also accepts transactions which would otherwise have to be stored and managed in what are usually called "batch files", "batch tables" or other collections of transactions which the business has written but is not yet ready to apply. By accepting these transactions as soon as they are written, and storing their results in the tables which are their targets, our invention eliminates the substantial costs of managing such collections of transactions. By associating the results of those transactions with a future period of time in the temporal dimension we call "assertion time" and which is a semantic extension of the temporal dimension which computer scientists call "transaction time", those results remain effectively invisible to normal queries, but will automatically become visible when enough time has passed that their transaction times become current.

BRIEF SUMMARY OF THE INVENTION

Our invention, which we call the "Asserted Versioning Framework" (or, for short, the "AVF"), is an improvement on the baseline model of temporal data management. The improvement consists in using a schema, i.e. a DBMS catalog entry which defines a table in a database, which is identical for all temporal tables, except for the business data in those tables. We call this schema a "canonical schema" for managing temporal data.

(def) canonical schema: the bi-temporal schema of this invention which is used for all temporal tables.

This schema is a bi-temporal schema, so the AVF does not have any physical uni-temporal tables to manage, thus simplifying its codebase. These tables replace conventional tables; they are not in addition to conventional tables, further simplifying the codebase of the AVF. Temporal transactions can specify only an effective-time period, so they appear to be doing only uni-temporal work. However, all rows already present in the target table when a temporal transaction is processed, and that are affected by that transaction, are copied and transformed into rows which appear to be entries in an internal "semantic logfile", even though they continue to reside in that same table. In this way, a bi-temporal history of modifications to the table is preserved, even though the temporal transactions appear to be specifying only uni-temporal modifications. Temporal transactions do not have to specify any time periods at all, in which case they appear to be modifying conventional, non-temporal tables.

From the point of view of queries, a uni-temporal table is a view on a bi-temporal table, one which includes only one of the two kinds of time periods present in the underlying table. From the point of view of queries, a conventional non-temporal table is a view on a bi-temporal table from which all columns specific to the canonical schema have been dropped, and which always presents only rows which are current in both temporal dimensions.

In one implementation, we define an extension to what computer scientists call "transaction time", and what we call "assertion time". This extension supports future time periods in this second temporal dimension. With this extension, our invention also eliminates the need to store, in either batch transaction datasets, or in "workspaces", or in other-named repositories of maintenance transactions, those transactions which their authors are not yet ready to apply to the database. Instead, with our invention, all transactions are immediately applied to the database. If we are not yet willing to claim that the rows of temporal data resulting from any of these transactions make a true statement about the objects they represent, we specify a future assertion-time period on the transaction, and the row or rows that are created by the transaction are assigned that future time period, and will not be interpreted as making true statements, or statements otherwise good enough to be used for their intended purposes, about the objects they represent unless or until that future time period becomes a current time period.

In another implementation, our invention also eliminates the need to express requirements for temporal data in a data model. Instead, those requirements are expressed in metadata, and it is from a combination of a non-temporal data model and that metadata that a temporal database is generated.

In a referential integrity relationship among temporal tables, while the child object is a single row, the parent object is a set of possibly many rows. In another implementation, our invention defines this set of possibly many rows as an abstract data type, and enforces temporal referential integrity by means of this new data type.

It is well-known that an important way to improve the performance of a search in an index is to begin the search as far down the tree structure of the index as possible. It is also well-known that one way to do this is to use match predicates as extensively as possible, since the node in the index tree at which direct matching stops and sequential searching begins will be the node located by the first range predicate used after all match predicates have been applied. In another implementation, this invention provides a mean for improving the search for data which is current in effective time or which is current in assertion time by utilizing match predicates that eliminates most data which is not current in those temporal dimensions.

From the point of view of the incremental amount of work required by technical personnel to manage temporal data, perhaps the most important distinction between this invention and the prior art is that this invention supports the full semantics of bi-temporal data—even extending that semantics, as Dr. Richard Snodgrass acknowledges—with a single type of table schema, and without requiring the deployment of any additional datasets either within production databases or outside them. If a database contains one non-temporal table of customer data, then with this invention, full bi-temporal support is extended to customer data by modifying that one table to include customer data from the past or the future in either or both of two temporal dimensions. With no additional tables or other datasets to manage, this method of supporting temporal data requires much less additional work on the part of technical personnel than does the prior art.

BRIEF DESCRIPTION OF THE DRAWINGS

FIG. 11: a sample Policy table prior to applying a temporal insert transaction.

FIG. 12: the sample Policy table after applying the temporal insert transaction.

FIG. 14: the sample Policy table after a temporal update transaction.

FIG. 16a: a sample Client table before a temporal delete transaction.

FIG. 16b: the sample Client table after a temporal delete transaction.

FIG. 16c: the sample Policy table after a cascaded temporal delete transaction.

FIG. 18: a SQL CREATE VIEW statement that dynamically presents, as a queryable object, the assertion-time (transaction time) history of data about all objects that are currently in effect (valid). This is an example of a uni-temporal assertion table manifested as a view over a temporal table.

FIG. 19: a SQL CREATE VIEW statement that dynamically presents, as a queryable object, rows representing all currently asserted (current in transaction time) statements about the effective-time (valid time) past, present or future states of the objects referred to by those statements. This is an example of a uni-temporal version table manifested as a view over a temporal table.

FIG. 20a: a SQL CREATE VIEW statement that dynamically presents, as a queryable object, rows representing all currently asserted (current in transaction time) and currently effective (current in valid time) statements about clients. This is an example of a non-temporal table manifested as a view over a temporal table.

FIG. 20b: a SQL CREATE VIEW statement that dynamically presents, as a queryable object, rows representing all currently asserted (current in transaction time) and currently effective (current in valid time) statements about policies. This is an example of a non-temporal table manifested as a view over a temporal table.

FIG. 21: a CREATE VIEW statement that dynamically presents, as a queryable object, the otherwise identical non-temporal Policy table corresponding to the temporal Policy table. This is the view that, provided over each temporal table, supports temporal upward compatibility for queries.

FIG. 23: the extended canonical schema 623. This is the extension of the canonical schema to record episodes.

FIG. 24: an extended canonical schema temporal table with the same contents as the canonical schema temporal table shown in FIG. 11.

FIG. 25: an extended canonical schema temporal table with the same contents as the canonical schema temporal table shown in FIG. 12, and resulting from applying the same temporal transaction as the one resulting in the table shown in FIG. 12.

FIG. 26: an extended canonical schema temporal table with the same contents as the canonical schema temporal table shown in FIG. 14, and resulting from applying the same temporal transaction as the one resulting in the table shown in FIG. 14.

FIG. 27: an extended canonical schema temporal table with the same contents as the canonical schema temporal table shown in FIG. 16c, and resulting from applying the same temporal transaction as the one resulting in the table shown in FIG. 16c.

FIG. 28: the deferred assertion canonical schema 624. This is the extension of the canonical schema to support deferred transactions and deferred assertions.

FIG. 30a: a sample Client table, using the deferred assertion canonical schema, showing a client with a seven-month gap in effectivity.

FIG. 30b: a sample Policy table, using the deferred assertion canonical schema, showing a deferred assertion created several months before it will become a current assertion, which will make the policy once again effective, after a lapse of one year.

FIG. 31: the same sample Policy table shown in FIG. 30b, showing the results of a temporal deferred update transaction.

FIG. 32a: a sample Policy table, identical to that shown in FIG. 30b, except that the deferred assertions exist in far future assertion time.

FIG. 32b: the same sample Policy table shown in FIG. 32a, showing the results of a temporal deferred update transaction.

FIG. 32c: the same sample Policy table shown in FIG. 32b, showing the results of moving the unlocked deferred assertions backwards into near future assertion time, and also moving the locked deferred assertions into negative assertion time so that they will never be asserted.

FIG. 32d: the same sample Policy table shown in FIG. 32c, showing the results of moving the locked deferred assertion backwards into near future assertion time, and also moving the unlocked deferred assertions into negative assertion time so that they will never be asserted.

FIG. 33: a 600 canonical schema table using a multi-column object identifier ("OID"), and time period datatypes. This table's name is Customer_G, as identified in the 513 Table Metadata in FIG. 38b, and as shown in the data model diagram in FIG. 37.

FIG. 34: a 600 canonical schema table using a single-column surrogate-valued object identifier, and using time period datatypes for effective time and assertion time. This table's name is Salesperson_G, as identified in the 513 Table Metadata in FIG. 38b, and as shown in the data model diagram in FIG. 37.

FIG. 35: a 600 canonical schema table using a multi-column object identifier, and time period datatypes. This table's name is Cust_Slsprsn_Xref_G, as identified in the 513 Table Metadata in FIG. 38b, and as shown in the data model diagram in FIG. 37.

FIG. 37 is not a logical data model diagram because it depicts temporal foreign key relationships instead of foreign key relationships.

FIG. 38a: a 511 Database Metadata table containing metadata describing a preliminary data model, including physical table definitions of its precursor tables, and also describing the target database for the tables to be generated, including the DBMS and release for which the database is valid.

FIGS. 38a, 45a, and 50a are three different 511 Database Metadata tables, one for each of three different target databases used in the examples in these figures. In an alternative embodiment, there may be only one set of metadata tables, since db-id values segregate all metadata by target database.

FIG. 38b: a 513 Table Metadata table containing metadata describing the three generated tables shown in FIG. 37, and their precursor tables shown in FIG. 36.

FIG. 38c: a 515 Business Key Column Metadata table containing one row for each column of each business key of each of the three generated tables.

FIG. 38d: a 517 Temporal Foreign Key Metadata table containing one row for each foreign key in the precursor table of each generated table.

FIG. 38e: 519 Temporal Foreign Key Column Metadata table containing one row for each column of each temporal foreign key of each of the three generated tables.

FIG. 38f: a 521 Temporal Unique Identifier Metadata table, containing one row for every column of the temporal unique identifier for every generated table.

FIG. 38g: a 523 Non-Key Metadata table containing one row for each non-key column in each generated table.

FIG. 39: a 600 canonical schema table with a 782 non-PK temporal unique identifier and with a single surrogate-valued column (cust-id) used as a 622 non-temporal primary key. The 303 otherwise identical non-temporal table corresponding to this 600 canonical schema table is also shown.

FIG. 40: a 303 otherwise identical non-temporal Client table, and its corresponding 600 canonical schema Client table. The client referenced by temporal foreign key value 8094 in policy P861 in FIGS. 41-44 is represented by the first row in this 600 Client table. The client referenced by temporal foreign key value 2715 in policy P861 in FIGS. 43 and 44 is represented by the second row in this 600 Client table.

FIG. 41: a 303 otherwise identical non-temporal Policy table, as of February 2009, and its corresponding 600 canonical schema Policy table, after a non-temporal insert transaction occurred. In this embodiment, which does not support future assertions, the assertion-time period shows that the transaction took place on February 2009.

FIG. 42: a 303 otherwise identical non-temporal Policy table, as of July 2009, and its corresponding 600 canonical schema Policy table, after a non-temporal update transaction which occurred on July 2009.

FIG. 43: a 303 otherwise identical non-temporal Policy table, as of January 2010, and its corresponding 600 canonical schema Policy table, after a non-temporal update transaction which occurred on January 2010.

FIG. 44: a 303 otherwise identical non-temporal Policy table, as of July 2010, and its corresponding 600 canonical schema Policy table, after a non-temporal delete transaction which occurred on July 2010.

FIG. 45a: a 511 Database Metadata table for describing a Client/Policy example.

FIG. 45b: a 513 Table Metadata table for the Client/Policy example from FIG. 45a.

FIG. 45c: a 515 Business Key Column Metadata table for the Client/Policy example from FIG. 45a.

FIG. 45d: a 517 Temporal Foreign Key Metadata table for the Client/Policy example from FIG. 45a.

FIG. 45e: a 519 Temporal Foreign Key Column Metadata table for the Client/Policy example from FIG. 45a.

FIG. 45f: a 521 Temporal Unique Identifier Column Metadata table for the Client/Policy example from FIG. 45a.

FIG. 45g: a 523 Non-Key Metadata table for the Client/Policy example from FIG. 45a.

FIG. 50a: a 511 Database Metadata table for the mapping shown in FIG. 49.

FIG. 50b: a 513 Table Metadata table for the mapping shown in FIG. 49. Note that this mapping is from an effective-time table, not from a non-temporal table.

FIG. 50c: a 515 Business Key Column Metadata table for the mapping shown in FIG. 49.

FIG. 50d: a 521 Temporal Unique Identifier Column Metadata table for the mapping shown in FIG. 49.

FIG. 50e: a 523 Non-Key Metadata table for the mapping shown in FIG. 49.

FIG. 50f: a 525 Precursor Time Period Metadata table for the mapping shown in FIG. 49.

REFERENCE NUMERALS IN DRAWINGS

Figure 1:
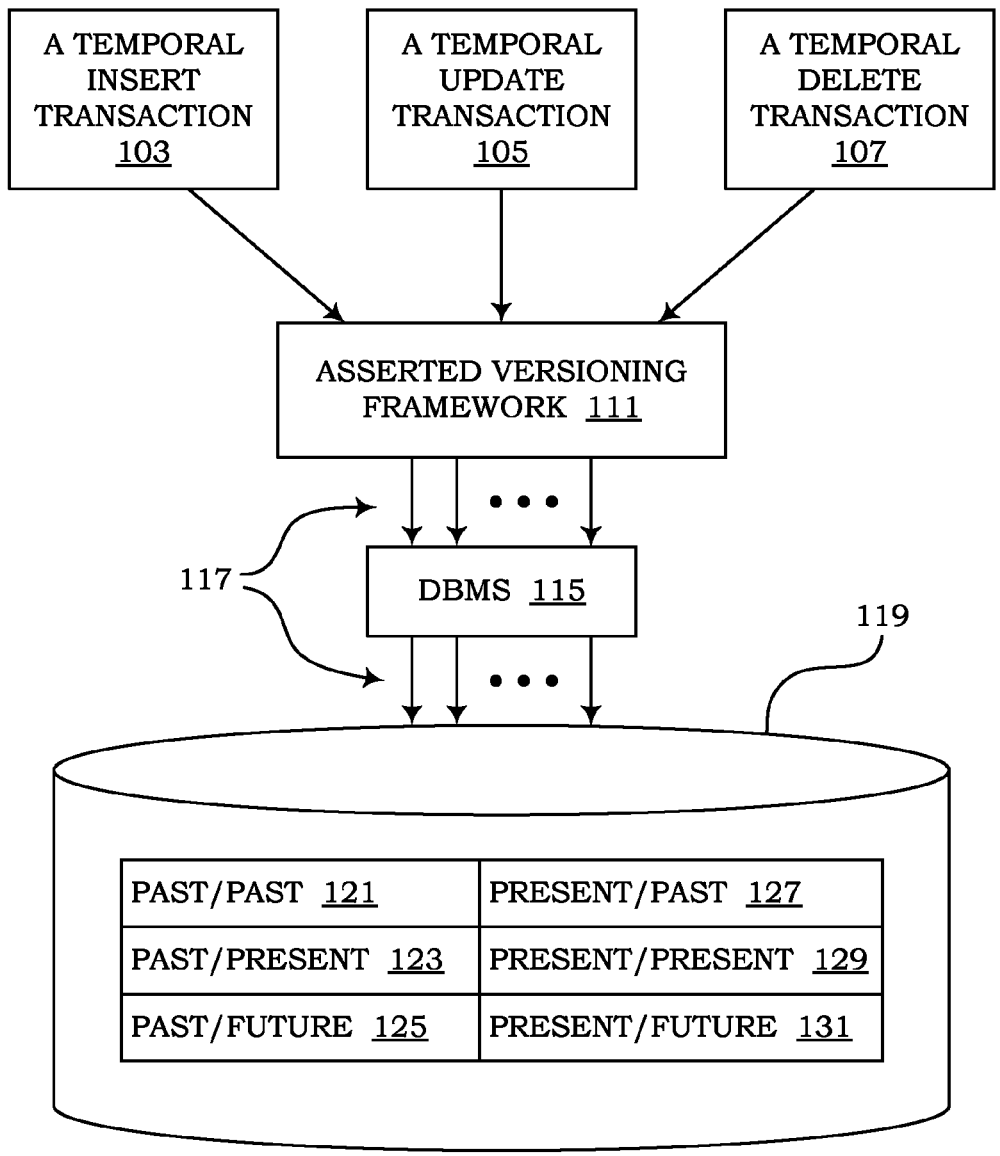
FIG. 1: the architectural context of the invention, in one embodiment, showing its role in translating an as-written insert 103, update 105 or delete 107 transaction against a canonical schema temporal table 119 into the possibly many physical transactions which the DBMS must apply to the database in order to complete the as-written transaction, and also showing the different categories of temporal data—121, 123, 125, 127, 129, 131—that reside in temporal tables.
Figure 2:
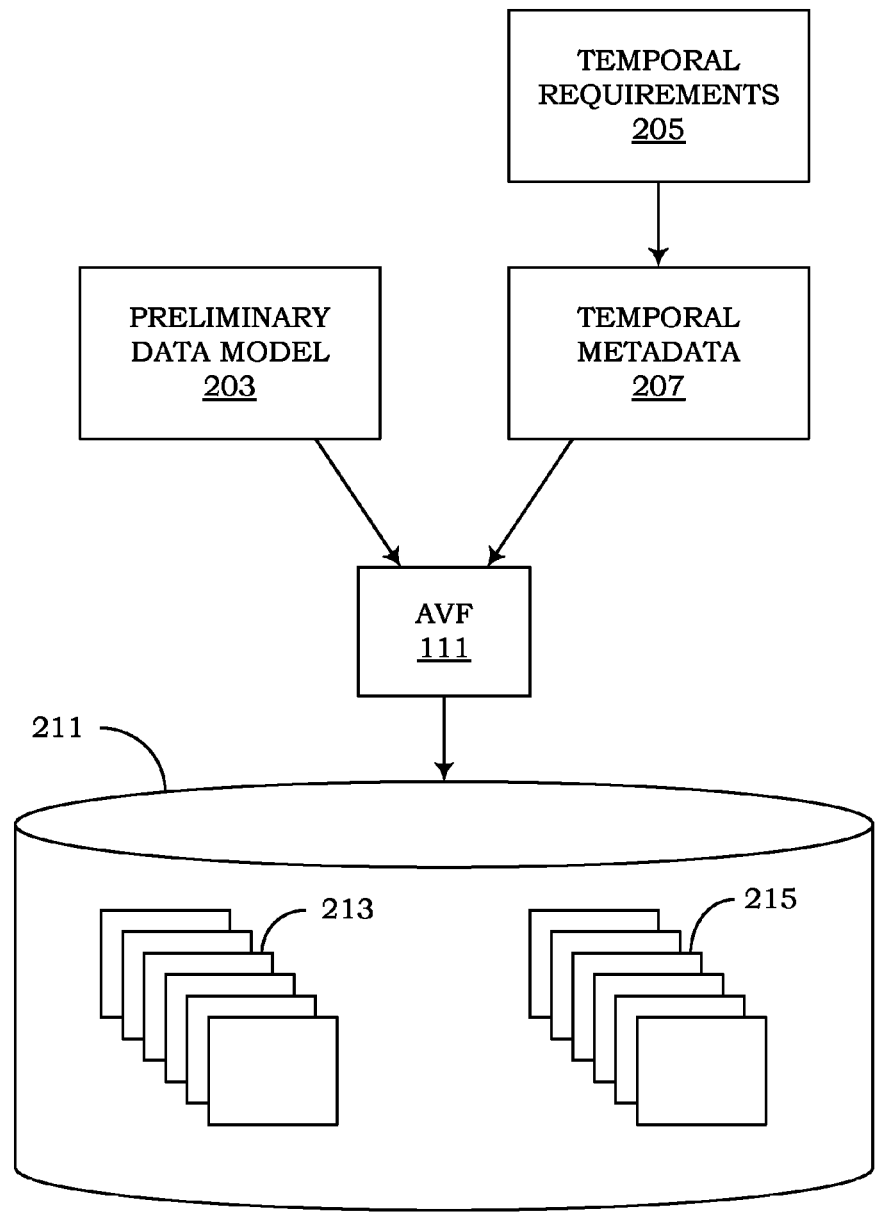
FIG. 2: a method for generating a temporal database 211 from a non-temporal data model 203, called a "preliminary data model", and temporal metadata 207. All temporal requirements are expressed in the metadata, and the invention uses that metadata, together with the preliminary data model, to generate a temporal database.

103 a temporal insert transaction
105 a temporal update transaction
107 a temporal delete transaction
111 the Asserted Versioning Framework
112 the deferred assertion Asserted Versioning Framework
115 a DBMS
117 transactions corresponding to one temporal transaction
119 a canonical schema temporal table
120 a deferred assertion canonical schema temporal table
121 past assertion time and past effective time
123 past assertion time and present effective time
125 past assertion time and future effective time
127 present assertion time and past effective time
129 present assertion time and present effective time
131 present assertion time and future effective time
133 future assertion time and past effective time
135 future assertion time and current effective time
137 future assertion time and future effective time
202 precursor table
203 preliminary data model
205 temporal requirements
207 temporal metadata
211 a temporal database
213 temporal tables
215 non-temporal tables
303 an otherwise identical non-temporal table
305 an otherwise identical table
501 precursor table metadata
502 name of table containing the object identifier
503 temporal foreign key metadata
505 business key metadata
506 object identifier metadata
507 foreign key to temporal foreign key mapping metadata
511 Database Metadata table
513 Table Metadata table
515 Business Key Column Metadata table 517 Temporal Foreign Key Metadata table
519 Temporal Foreign Key Column Metadata table
521 TUI-Column Metadata table
523 Non-Key Metadata table
525 Precursor Time Period Metadata table
600 canonical schema common to all temporal tables
601 object identifier, OID
603 effective begin date
605 effective end date
607 assertion begin date
609 assertion end date
613 business key
615 temporal foreign key
617 business data
618 episode begin date
619 row create date
621 primary key=601+603+607
622 non-temporal PK
623 extended canonical schema
624 deferred assertion canonical schema
701 edit transaction
703 supply temporal defaults
705 define target space
707 match to target rows
709 supply OID
710 check for TRI blocks
713 for each TFK, validate TRI
715 insert the new row
753 withdraw rows partially inside target space
755 cut rows partially inside target space
757 replace cuts outside target space
759 supercede cuts inside target space
761 withdraw rows fully inside target space
763 supercede rows fully inside target space
769 recursively delete or set null TRI child rows
780 effective-time period
781 assertion-time period
782 non-PK temporal unique identifier
790 Episode table
791 episode primary key (PK)
792 epis number (episode number)
793 episode effective-time period
794 episode assertion-time period
798 FK relationship
900 TFK relationship
901 creation of generated tables from precursor tables
902 a precursor table
903 a generated table
904 entity or table

DETAILED DESCRIPTION OF THE INVENTION

We begin by providing prima facie evidence that our various embodiments are useful, novel and unobvious. A book we have written and which is soon to be published—*Managing Time in Relational Databases: How to Design, Update and Query Temporal Data* (Morgan-Kaufmann, 2010)—describes an invention which is the amalgamation of various embodiments in this patent application and is incorporated by reference herein in its entirety. An endorsement from Dr. Richard Snodgrass, the author of the TSQL proposals to the SQL standards committee, and a leading researcher in the field of managing temporal data, appears on the outside back cover of our book. This endorsement states that "The authors present an original and comprehensive conceptual approach called Asserted Versioning, which includes support for bi-temporality and is a significant advance in the theory and practice of managing time-varying data."

We have already introduced and defined several important concepts, including the concepts of temporal data, temporal tables, temporal databases, temporal dimensions, uni-temporal data, uni-temporal tables, uni-temporal assertion tables, uni-temporal version tables, bi-temporal data, bi-temporal tables, non-temporal (conventional) data, and non-temporal (conventional) tables. We will now define several additional concepts required by the following discussion of the invention, and also clarify the conventions we use to represent time periods. Then we describe the architectural context of this invention. We define what we call the "baseline model of temporal data management" (or, for short, the "baseline temporal model"). After those discussions, the remainder of this detailed description will be organized as a discussion of various embodiments.

Foundational Concepts: Production Tables.

(def) production table: a production table is where we keep data that we, the enterprise that creates and maintains that data, are willing to say is our best and most accurate data about the things the data represents. In production tables, as we will explain below, each row makes a statement that we are willing to assert is a true statement or, if a statement about the future state of an object, and as such a statement which we cannot yet assert as being either true or false, is nonetheless a statement on the basis of which business decisions may be made.

Unless otherwise indicated, all references to tables, including uni-temporal, bi-temporal and non-temporal tables, are first and foremost to production tables, and all references to databases, including to conventional and to temporal databases, are first and foremost to production databases. While this invention manages non-production tables as well as production tables, its principal business value lies in its management of production tables and production databases.

Foundational Concepts: Tables and Types, Rows and Instances, Columns and Properties or Relationships.

Types and instances are one of the most basic ways we organize knowledge. There are different types of things, and there are instances of each type. We will use the term "object" to refer to an instance of a type.

Tables in databases represent the types of things we are interested in—types such as clients, policies, employees, organizational structures, and so on. Rows in conventional tables represent instances of these types. These instances are the individual objects we are interested in—objects such as specific clients, specific policies, and so on.

Columns in these tables represent types of properties of objects, or types of relationships those objects have to other objects. In each row, each of its column instances represents the specific instance of that property type or of that relationship type which the object represented by that row has. For example, one health insurance policy may have a policy type of PPO, while another may have a policy type of HMO. One health insurance policy may have an "owned by" relationship to client C123, while another may be owned by client C789, and so on.

Foundational Concepts: Object Identification and Reference.

In the three canonical schema used by this invention—the canonical schema 600 (FIG. 9), the extended canonical schema 623 (FIG. 23), and the deferred assertion canonical schema 624 (FIG. 28)—an object is uniquely identified by means of an object identifier (OID) 601.

In a relational database, a referential integrity relationship between two non-temporal tables is implemented by means of a foreign key. A temporal referential integrity relationship between two temporal tables, as explained further in the section Fundamental Concepts: Temporal Referential Integrity, below, is implemented by means of a temporal foreign key 615. We will sometimes use the acronym "TRI" to stand for "temporal referential integrity", and will sometimes use the acronym "TFK" to stand for "temporal foreign key".

Foundational Concepts: Statements, Versions, and Assertions.

Statements are made by declarative sentences. In databases, each row in a table stands for what logicians call an existentially quantified statement. These are statements which can be expressed in English in the form "There exists an X such that . . . ". For example, "There exists a customer such that the last name of that customer is 'Jones'". As represented in a conventional customer table, this statement is true if and only if there is a row in the customer table with the value "Jones" in its last name column.

A version of an object may be thought of as a timeslice of the life history of an object. The timeslice is uniquely identified by designating an object and a period of time. For example, the statement "During the month of August 2010, there existed a customer such that the customer's last name was 'Jones'" is an existentially quantified statement about a version of an object.

Ignoring self-contradictory or otherwise nonsensical statements, all statements must be capable of having a truth value. Many statements actually do have truth values; that is, many statements are, in fact, true or false. But some statements, according to widely-accepted interpretations in logic, lack a truth value. On these interpretations, for example, the statement "The Atlanta Braves will win the 2028 World Series", as made now, and as made any time prior to the 2028 World Series, lacks a truth value.

This introduces the distinction between a statement and its assertion. With this distinction, we can say that an assertion is a claim that a statement is true.

In a conventional table, it is tacitly understood that by putting a row into a production table in a database, we are asserting that that row makes a true statement. For as long as that row remains in that table, we continue to assert as true the statement made by that row.

This is also true of rows which represent versions. Consider the row which represents the statement "During the month of August 2008, there existed a customer such that the customer's last name, at that time, was 'Jones'". For as long as that row remains currently asserted in a temporal table, we will assert that it makes a true statement, i.e. the statement that, throughout the month of August 2008, that customer's last name was "Jones".

But sometimes we discover, after the fact, that we were mistaken, and that certain rows do not make true statements. If we wish to retain the information that our tables did contain such mistakes, how will we indicate that? One way is to associate another time period with the rows in our tables. This time period will represent when we asserted, assert or will assert that a row makes a true statement. If that row is a row in a versioned table, then that row will have two time periods associated with it. The first time period will designate a period of time in the life history of the object represented by the row. The second time period will designate a period of time during which we once asserted, presently do assert, or may in the future come to assert, that the row makes a true statement.

(def) state: the state of an object is what the object is like at a point in time or during a period of time. In a conventional table, the state of an object is described by the business data on the one row representing that object. The point in time is understood to be the present moment. The period of time is understood to be an open time period, and so the row is understood to represent the current state of the object which will continue to be the state of the object unless or until the row is deleted or updated. In a table which supports valid time (effective time), rows representing different states of the same object may concurrently exist in the table, provided the table never contains more than one row which is currently asserted to describe the state of an object at any point in valid time (effective time).

Fundamental Concepts: Transaction Time and Assertion Time.

Valid time keeps track of changes to data which are made in order to keep up with changes to the objects represented by that data. Transaction time keeps track of when data was first placed in a table. But it also keeps track of changes to data which do not reflect changes to the objects represented by that data. It does so by associating a later period of transaction time to a row which represents the same object during all or part of the same period of valid time. In a series of such rows, the row with the latest transaction time is understood to contain correct data, and the other rows are understood to contain mistaken data.

This description of valid time and transaction time also applies to effective time and assertion time. We permit rows to be associated with future periods of assertion time, the difference between transaction time and assertion time is only one of interpretation. Transaction time is a physical description of this temporal dimension. Assertion time is a semantic description.

One can establish the correlation between the physical and the semantic description by realizing that every row in a table makes a statement which describes the state of some object during some period of time. In a conventional table, that state of the object is its current state, what it is like currently. The presence of a row in a conventional table is the assertion that the row makes a true statement. When the first temporal dimension is added to an otherwise conventional table, it remains true that the presence of a row in the table is the assertion that the row makes a true statement. In this case, the true statements are statements about the past, present, or future states of objects, not just the state they are in at the current moment in time.

When the second temporal dimension is added, it is no longer true that each row in the table is asserted, or understood, to make a true statement. In a series of rows about the same object and the same first period of time, as described above, only the row whose second time period is a current time period is asserted, or understood, to make a true statement. The other rows are mistakes, and are understood to be mistakes, and so we are no longer willing to assert that they make true statements. Their second time period ends on the same clock tick that the row containing the corrected data begins.

This second time period changes what it means for a row to be present in a table. Without it, the presence of a row is the assertion that the row makes a true statement. With it, rows may remain in tables even though they no longer have the status of representing assertions of the truth of the statements they make.

Thus, until we consider the implementation that extends assertion time to include future assertion-time periods, transaction time and assertion time are equivalent, and will always be managed in the same way. The difference, at this point, lies solely in interpretation. As for valid time and effective time, the difference between them is purely terminological.

A Note on the Representation of Time Periods.

We begin with some necessary terminology.

(def) clock tick: a clock tick is the smallest unit of time that can be used for the begin date or end date of a time period. For example, if a date datatype is used for the begin dates and end dates, and the level of granularity chosen for time periods is that of one day, then two clock ticks are adjacent, and have no gaps between them, if and only if they represent successive days.

(def) time period: an interval of time with a known begin point in time.

(def) closed time period: a time period with a known end point in time.

(def) open time period: a time period with an unknown end point in time.

A clock tick designates a known position along a timeline. A time period always consists of at least one clock tick.

We use the "closed-open" convention for representing time periods with delimiting points in time. In this convention, the beginning point in time, which we call a "begin date", is included in the time period it delimits, but the ending point in time, which we call an "end date", is the next point in time after the last point in time included in the time period it delimits.

Thus, for example, using a calendar month level of granularity, an effective begin date of March 2010 and an effective end date of April 2010 represent a time period consisting of a single clock tick. To take another example, an effective begin date of March 2010 and an effective end date of August 2010 represent a "closed time period" lasting five months, those months being March, April, May, June and July of 2010. An effective begin date of March 2010 and an effective end date of 9999-"9999" representing the highest temporal value which a specific DBMS can recognize—represent an "open time period" of unknown duration.

In all the figures used in this patent application, we use a calendar month as our chosen level of granularity. Thus, the temporal columns which are part of our canonical schema show, as sample data, dates in the format "xxx99", where "xxx" stands for "Jan", "Feb" . . . "Dec", and indicates a month of the year, and "99" stands for a year in the current century. Thus, "May12" stands for the month of May 2012, and is the clock tick that comes immediately after the clock tick of "Apr12" and immediately before the clock tick of "Jun12". We use this form of abbreviation in order to fit sample rows of data across one line of a printed page. It is an artifact of this convention that dates in the last century, or in prior or later centuries, cannot be represented. This restriction is only an artifact, and is not part of this invention. More commonly, time periods in temporal databases would be defined at the timestamp level of granularity, or at least at the level of calendar days.

Foundational Concepts: Temporal Entity Integrity.

Temporal entity integrity is similar to the relational constraint of entity integrity. We will sometimes use the acronym "TEI" to stand for the phrase "temporal entity integrity".

However, while entity integrity is defined over non-temporal tables, we define TEI over temporal tables. Entity integrity is the constraint that no two rows concurrently present in a non-temporal table may represent the same object. It is usually enforced by associating each object with a unique identifier which is used as the primary key of the table, and then by enforcing a unique index over that primary key.

(def) TEI is the constraint that requires that a temporal database is always in a state in which no two rows in the same temporal table have the same unique object identifier in both shared assertion time and shared effective time. This unique object identifier is called an OID, and is defined below in the section Canonical Schema of the Invention.

(def) shared time: defined as follows. The assertion time that is shared among assertion-time periods AT1, AT2, . . . ATn is the assertion-time period consisting of all the clock ticks that are in AT1 and AT2, . . . and ATn. The effective time that is shared among effective-time periods ET1, ET2, . . . ETn is the effective-time period consisting of all the clock ticks that are in ET1 and ET2, . . . and ETn.

Semantically, a database in which there are no TEI violations is a database in which there is no point in time on which the database makes two or more assertions about the same object as that object was, is, or will be during the same point in effective time.

The means by which TEI is enforced is explained in the sections in which we discuss temporal insert, temporal update and temporal delete transactions.

Foundational Concepts: Temporal Referential Integrity.

A preliminary concept for temporal referential integrity must first be defined. It is the concept of existence dependency.

(def) existence dependency: an object X is existence-dependent on an object Y if and only if X cannot exist unless Y also exists. For example, a water molecule cannot exist without both hydrogen and oxygen atoms. An invoice cannot exist without a customer.

Both referential integrity and temporal referential integrity are relationships between pairs of tables. In both types of relationship, we will call the table referred to the "parent table", and the table referring to it the "child table". We will sometimes use the acronym "TRI" to stand for the phrase "temporal referential integrity".

TRI is similar to referential integrity. However, while referential integrity is defined over non-temporal tables, we define TRI over temporal tables. Referential integrity is the constraint that if a database contains a table representing the type of object of which X is an instance, and also contains a table representing the type of object of which Y is an instance, the types and the tables not necessarily distinct, then whenever the database contains a row representing X, it must also contain a row representing Y. The row representing X is called the "child row" in the relationship, and the row representing Y is called the "parent row".

(def) TRI is the constraint that requires that a temporal database is always in a state in which the value in every TFK matches the OID of every row in a set of one or more rows such that the assertion-time period of each row in the set is identical to or fully contains the assertion-time period of the row containing the TFK, and the logical union of the effective-time periods of each row in the set contains no gaps in effective time, and is identical to or fully contains the effective-time period of the row containing the TFK.

We also point out that while the "child" in a TRI relationship is a row, the "parent" is not a row. It is a set of one or more rows, as just defined.

Semantically, this results in a database in which, for any two objects between which there is an existence dependency, and for which there is a table representing the types to which the objects belong, the database will never assert the existence of the dependent object in a given period of effective time unless it also at the same time asserts the existence of the object it is dependent on in an effective-time period that is identical to or fully contains the effective-time period of the dependent object.

The means by which TRI is enforced is explained in the sections in which we discuss temporal insert, temporal update and temporal delete transactions.

Foundational Concepts: an Otherwise Identical Non-Temporal Table.

For every prior art valid time table, transaction time table or bi-temporal table, it is possible to define a corresponding otherwise identical non-temporal table. The correspondence is intuitively clear. The temporal table corresponds to the non-temporal table, but with the addition of one or two time periods.

In this invention, for every temporal table it is also possible to define a corresponding otherwise identical non-temporal table. But unlike the prior art, the temporal tables managed by this invention are all bi-temporal, and all conform to a common canonical schema. In addition, the temporal tables in this invention replace the primary key of the otherwise identical non-temporal table with a surrogate-valued object identifier, and retain the primary key column or columns of the otherwise identical non-temporal table as non-key columns. In addition, the temporal tables in this invention replace foreign keys in otherwise identical non-temporal tables with surrogate-valued temporal foreign keys. Consequently, the correspondence of a temporal table managed by this invention, and an otherwise identical non-temporal table, is less intuitively clear than it is in the prior art.

This correspondence may be demonstrated by describing how a temporal table managed by this invention can be mapped into its otherwise identical non-temporal table. We begin with the schema-level mapping.

Figure 17A:
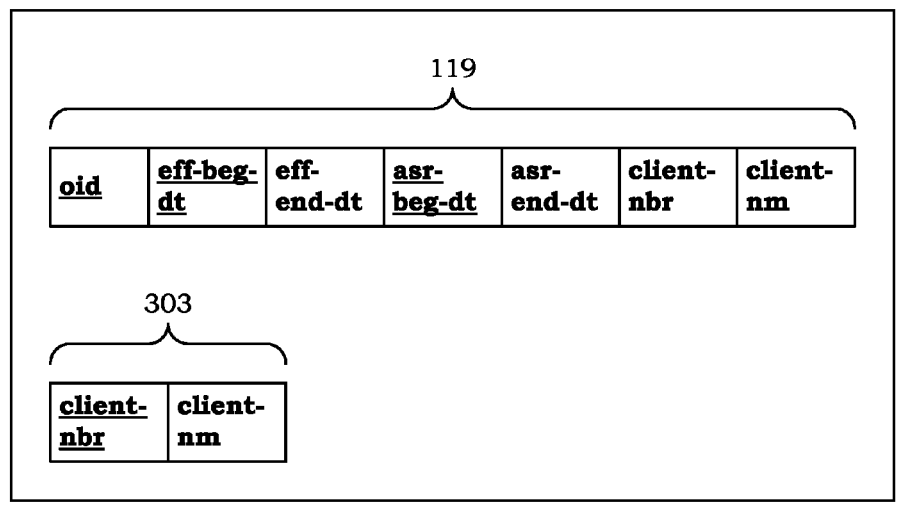
FIG. 17a: a canonical schema temporal table 119, and an otherwise identical non-temporal Client table 303.

FIG. 17a shows a temporal Client table 119 using the canonical schema 600 and an otherwise identical non-temporal Client table 303. We will describe a mapping from the temporal to the non-temporal table. First, we drop all columns that are part of the canonical schema used by the temporal table. These are the first five columns of the temporal table 119. Next, by means of metadata 505, we identify the column client-nbr as the primary key of the corresponding non-temporal table. Finally, because the column client-nm is not mentioned in any of the metadata 505-507, we identify it as a non-key column of the corresponding non-temporal table. All columns in the temporal table 119 have been accounted for, and the schema-level mapping for this table is complete.

Figure 17B:
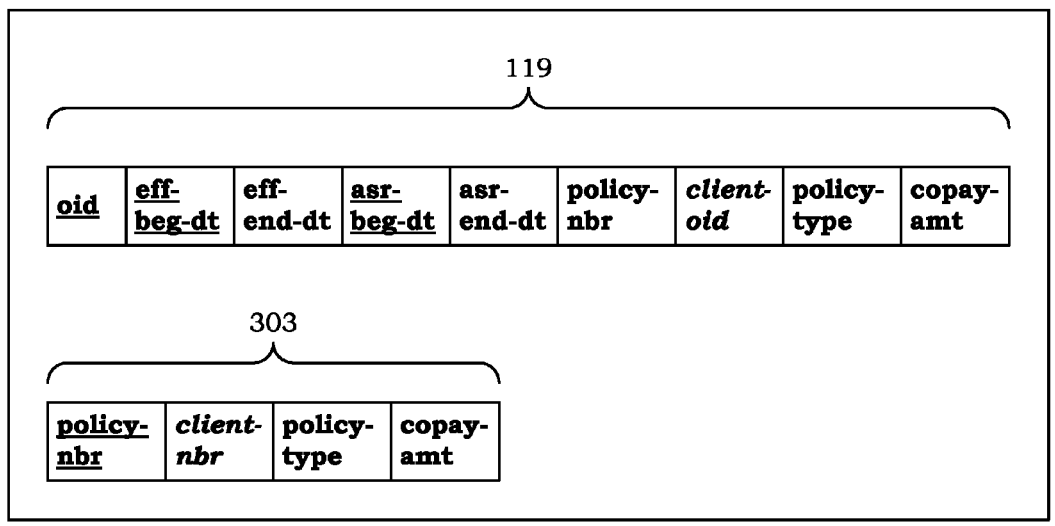
FIG. 17b: a canonical schema temporal table 119, and an otherwise identical non-temporal Policy table 303.

FIG. 17b shows a temporal Policy table 119 using the canonical schema 600 and an otherwise identical non-temporal Policy table 303. We will describe a mapping from the temporal to the non-temporal table. First, we drop all columns that are part of the canonical schema used by the temporal table. These are the first five columns of the temporal table 119. Next, by means of metadata 505, we identify the column policy-nbr as the primary key of the corresponding non-temporal table.

Then, by means of metadata 503, we identify the column client-oid as a temporal foreign key which references the Client table. This means that in the corresponding non-temporal table, there must be a foreign key which references the non-temporal Client table. By means of metadata 507, we know that the column name for that foreign key is client-nbr.

Finally, because the columns policy-type and copay-amt are not mentioned in any of the metadata 505-507, we identify them as non-key columns of the corresponding non-temporal table. All columns in the temporal table 119 have been accounted for, and the schema-level mapping for this table is complete.

But the equivalence of a temporal table and an otherwise identical non-temporal table must be an equivalence in content, and not just in schemas. In terms of content, only some of the rows in a temporal table have a corresponding row in their otherwise identical non-temporal table. Those are the rows whose assertion-time periods and effective-time periods are both current. Therefore, for all those rows, an otherwise identical non-temporal table (or view) can be populated by means of the following steps.

For each of those currently asserted and currently effective rows in the temporal table, the column or columns which metadata designates as the business key is used to populate the primary key column or columns of the non-temporal table. Next, for each temporal foreign key, if any, the row whose object identifier matches the value in the temporal foreign key, and whose assertion-time periods and effective-time periods are both current, is retrieved, and the column or columns making up the business key of that row are used to populate the column or columns making up the foreign key in the non-temporal table. Finally, for all other columns in the temporal table, their values are moved to the row in the non-temporal table.

The content-level mapping is now complete.

Architectural Context of the Invention.

FIG. 1 shows the architectural context of the invention. Reference characters 103, 105 and 107 designate temporal transactions.

(def) temporal insert transaction, temporal update transaction, temporal delete transaction: insert, update, or delete transactions, as written by their authors, and whose targets are temporal tables.

Reference character 111 designates the Asserted Versioning Framework, which we also refer to as the "AVF". It is the computer program code which is part of our invention, and which translates each temporal insert, update or delete transaction into one or more physical transactions which it then submits to a DBMS 115, which immediately applies those transactions to their target canonical schema temporal table 119.

(def) canonical schema temporal table: a temporal table that uses the canonical schema 600.

(def) physical transaction: by a "physical transaction", we mean a SQL insert, update or delete transaction which the AVF submits to a DBMS.

The AVF manages each set of physical transactions corresponding to a single temporal transaction as an atomic and isolated unit of work. As these transactions update the database that contains the production tables, the AVF also enforces the semantic constraints specific to temporal data, those being the constraints of TEI and TRI.

Reference characters 121, 123, 125, 127, 129 and 131 represent the six categories of bi-temporal data recognized in the baseline temporal model. Using our terminology of "assertion time" and "effective time" instead of the standard computer science terminology of, respectively, "transaction time" and "valid time", each of the categories 121, 123, 125, 127, 129 and 131 are named by a pair of terms separated by a slash ("/"), in which the first term designates a time period in assertion time and the second term designates a time period in effective time. Thus, for example, the category named "past/future" 125, represents the category of bi-temporal data whose rows represent statements which we no longer assert to be true statements, and which are so designated by having assertion-time periods that have already ended. The statements represented by these rows are statements about future versions of the objects they each represent, i.e. statements about what the objects they each represent would be like at a specified future period of effective time.

Here and elsewhere, a period of time is designated as "past", "present" or "future" relative to the current moment in real time, i.e. relative to right now.

In an alternative embodiment, the AVF is incorporated into a DBMS. In that embodiment, the temporal transactions 103, 105 and 107 would be submitted directly to the DBMS 115.

The Baseline Model of Temporal Data Management.

The various embodiments in this patent application are for improvements over what we call the baseline model of temporal data management. We define this baseline model as consisting of the concepts and the reduction to practice expressed in [Snodgrass, 2000].

The Baseline Temporal Model Plus a Canonical Schema.

Our first embodiment is for a canonical schema used by all temporal tables in a temporal database managed by the AVF 111 and for a means by which requests to modify the data stored in these temporal tables can be satisfied.

Canonical Schema of the Invention.

Figures 9, 10:
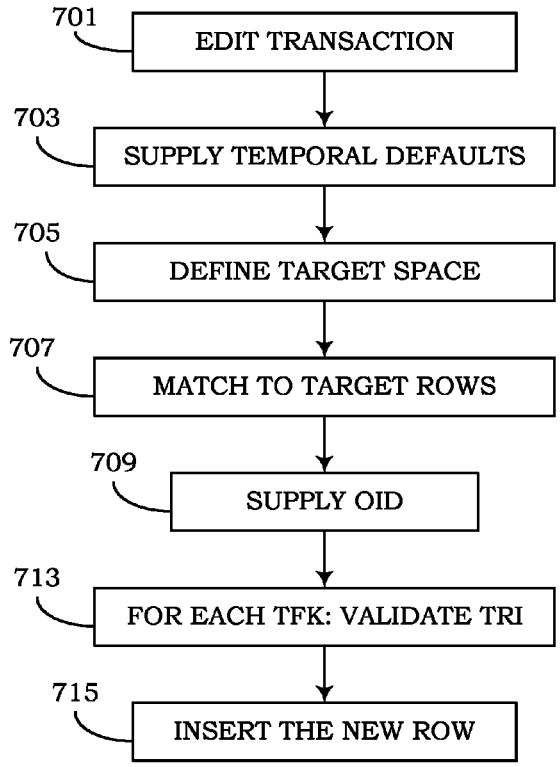
FIG. 9: the canonical schema 600 of the invention. All temporal tables using this canonical schema have columns 601-609, and all temporal tables use temporal foreign keys 615 to represent temporal referential integrity relationships.
FIG. 10: the sequence of steps for processing a temporal insert transaction.

Our first embodiment references "a schema common to all (the) temporal tables". This schema is the set of columns used by this invention to record and to manage all temporal data. In each table, there will be additional columns which represent the data specific to the kind of object represented by the table, data which we have called and will call "business data", and which are shown in FIG. 9 as the two columns 617. Thus, a customer table will have columns describing customers, a product table will have columns describing products, and so on. But if both tables are temporal tables, then both tables will use an identical set of columns to represent the temporal features of that data.

FIG. 9 shows the canonical schema 600 common to all temporal tables in temporal databases managed by this invention. Reference character 601 designates the object identifier, which we also refer to as the "OID".

(def) OID: a unique identifier for an object. In our preferred embodiment, it is a single surrogate-valued column. In another embodiment, the object identifier might consist of more than one column.

Whenever the AVF concludes that a temporal insert transaction contains data that describes an object that is not already represented by a row in the target table for that transaction, the AVF creates a new OID and attaches it to the transaction. Whenever the AVF concludes that a temporal insert transaction contains data that describes an object that is already represented by a row in the target table for that transaction, the AVF attaches the OID from that row in the target table to the transaction. In this way, to the extent permitted by the quality of the data on the transactions and in the database, the AVF insures that across all assertion time and all effective time, all rows representing the same object will have the same OID.

The temporal table shown in FIG. 9 is a table of health insurance policies. The sample row shown in FIG. 9 represents an insurance policy whose OID is 2117.

Effective-time periods and assertion-time periods are each represented, in our preferred embodiment, by a begin date and an end date. However, these "dates" might also be timestamps, or any other time-valued column of data. The dates used in all examples in this patent application are calendar months. In our notation, "May10" stands for the calendar month "May 2010". The month Jun10 therefore comes right after the month May10; there is no temporal gap between them. In another embodiment, a single column with a PERIOD datatype might be used instead to represent each time period. But because there is no consistent implementation of a PERIOD datatype across all the major commercial DBMSs available today, we use begin and end dates as our preferred embodiment of time periods.

Columns 603 and 605 are, respectively, the effective begin dates and effective end dates for this sample table. Columns 607 and 609 are, respectively, the assertion begin dates and assertion end dates for this sample table.

The sample row shown in FIG. 9 has an effective-time period of [Mar10-9999]. In this notation, which is also used for assertion-time periods, the first date within the brackets is a begin date and the second date is an end date. The statement made by this row describes what the object it represents is like beginning on March 2010, and what it will continue to be like unless or until the row is withdrawn. This follows from the fact that "9999" stands for the highest date the DBMS managing the database can recognize. Because it is the highest date, any date on or after March 2010 will be included in that period, and on any of those dates, this row will be current in effective time or, for short, "current in effect" or "currently effective".

(def) withdraw: to "withdraw" a row in a temporal table is to alter it so that it appears to reside in a "semantic logfile" which physically exists within the temporal table itself.

(def) semantic logfile: rows in a semantic logfile are all and only those rows no longer asserted to make true statements, and they are so designated by changing their assertion end dates to the date on which the assertion ceases to be made. Thus, a "semantic logfile" is not a physical structure within a temporal table. It is just the set of rows whose assertion end dates are in the past. It is the set of rows which, in FIG. 1, comprise all and only those rows in the categories 121, 123 and 125.

The sample row shown in FIG. 9 has an assertion-time period of [Mar10-May10]. This means that, in the months of March and April 2010, the statement made by this row was asserted to be a true statement describing what the object it represents was like, and was assumed to remain like unless or until other modifications are made to the database, during its effective-time period of [Mar10-9999]. It also means that, beginning in May 2010, the row was no longer asserted to make a true statement, and never again will be used to make a true statement. Beginning in May 2010, the row became part of that table's semantic logfile.

In a temporal table, the primary key of a row in that table consists of, semantically, a unique object identifier, an assertion-time period and an effective-time period. No two rows in a temporal table may have the same OID, identical or overlapping assertion-time periods, and identical or overlapping effective-time periods. Given this semantics of time periods as components of primary keys, and given our representation of time periods as pairs of dates, we represent time periods in the primary keys of temporal tables, in this embodiment, by using their begin dates only. Therefore, the primary key 621 of the canonical schema 600 is the combination of columns 601, 603 and 607.

By managing these pairs of dates as time periods, the AVF guarantees that we can represent a time period in a primary key by using just one of the dates that delimit the time period. For example, as far as the DBMS is concerned, the table shown in FIG. 9 could contain a second row which is identical to the row shown except that its effective begin date is Aug10. The values in the primary key columns of those two rows would be different, and so the DBMS would consider the primary key uniqueness constraint to be satisfied. However, the AVF would prevent that second row from being added to the table because the AVF would recognize that the two time periods [Mar10-9999] and [Aug10-9999] overlap. This overlap is a TEI violation.

Figures 6, 7, 8:
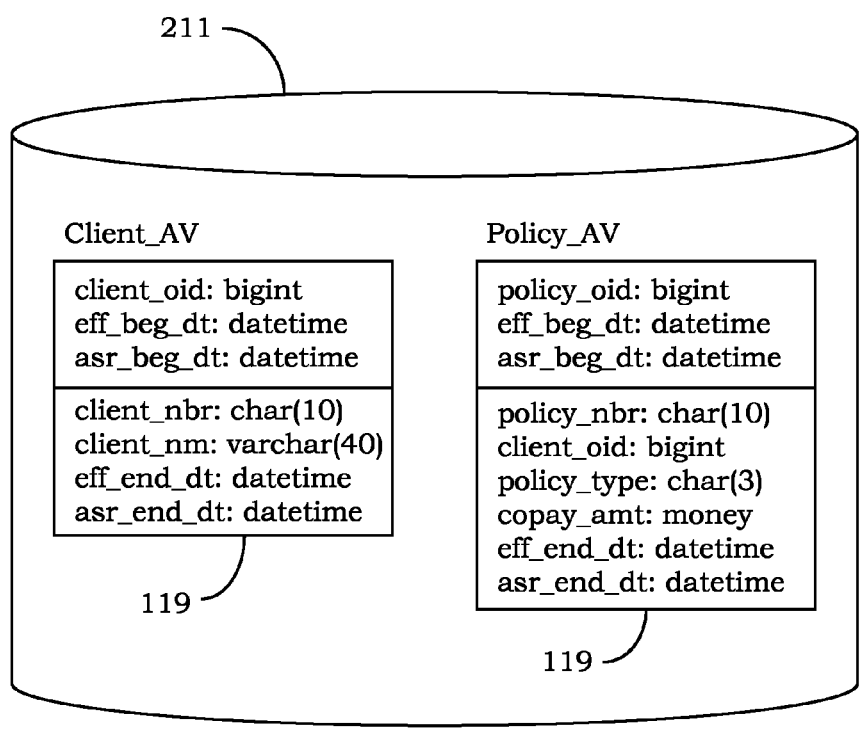
FIG. 6: business key metadata 505. Each row identifies one column of the business key for each temporal table. Each column corresponds, in sequence, to a column of the primary key of the precursor table from which the temporal table is generated.
FIG. 7: foreign key to temporal foreign key mapping metadata 507. Each row maps each temporal foreign key to the one or more columns that represent, in sequence, the corresponding conventional foreign key in the corresponding precursor table 202 in the preliminary data model 203.
FIG. 8: a temporal database 211. Shows the temporal database generated by the AVF 111 from the preliminary data model 203 and the metadata 501-507.

(def) business key: the non-key columns in a temporal table which correspond to the primary key columns of the precursor table corresponding to this temporal table. Column 613 is the business key of an object represented by a row in a temporal table. If the temporal table previously existed as a non-temporal table, it is also the primary key of that otherwise identical non-temporal table. The one or more columns making up the business key of a temporal table are identified by metadata 505, as shown in FIG. 6.

Column 615 of FIG. 9 is a TFK. As explained later in this description, by means of temporal foreign key metadata, shown as item 503 in FIG. 5, the AVF knows which temporal table is referenced by each TFK. The row of sample data in FIG. 9, which shows a Policy table, indicates that the insurance policy is related to, i.e. is owned by, a client whose OID is 8094. (The Client table referenced by this TFK is not shown.)

(def) business data: data which describes a property or a relationship of an object. In FIG. 9, the table shown also contains two columns of business data, indicates as items 617. The business data in the sample row in FIG. 9 says that the indicated insurance policy has a policy type of HMO and a copay amount of $15.

(def) atemporal data: data in a canonical schema other than the object identifier and the two time periods.

In our preferred embodiment, all temporal transactions are managed with Instead Of triggers. In this embodiment, any temporal update or temporal delete transaction may provide any selection criteria in a WHERE clause, and the AVF 111 will update or delete rows for as many objects as satisfy those selection criteria. The deferred assertion Asserted Versioning Framework AVF-D 112 (FIG. 29), described in another implementation, will do so also. In the following descriptions of how temporal transactions are processed, however, we will describe them as though only one object was specified on each transaction. Processing multiple objects in one transaction is simply a matter of the AVF 111 or the AVF-D 112 AVF looping through all objects until all have been processed.

In an alternative embodiment, all temporal transactions are submitted to the AVF 111 or AVF-D 112 by means of a proprietary Application Programming Interface (API). In this alternative embodiment, a temporal transaction will insert, update, or delete data for only one object at a time.

A Temporal Insert Transaction.

All references, below, to "transactions", unless explicitly indicated otherwise, refer to temporal insert transactions until the section A Temporal Update Transaction is reached.

Step 701.

As submitted, a temporal insert transaction must specify (i) a target temporal table, (ii) a business key, (iii) any required TFKs, and optionally, (iv) an OID, (v) additional TFKs, and (vi) any other business data that may be required. As shown in FIG. 10, the AVF begins processing temporal transactions by insuring that all required data is present and is syntactically correct. Temporal foreign key metadata 503 is associated with every table. If this metadata indicates that there are one or more TFKs on the table which are required (indicated by a value of "Yes" in the req-fig column of 503), then the AVF will reject the transaction unless it includes values for those required TFKs. Temporal foreign key metadata 505 may also be associated with every table. It specifies the columns which make up the business key for the table. If an effective-time period is supplied on the transaction, the AVF checks that the end date on the time period is greater than the begin date.

Step 703.

As shown in FIG. 10, the AVF next supplies any default data required by the transaction. The AVF will supply a default assertion-time period for the transaction which is always [Now( )-9999]. A "basic temporal insert" does not specify any time periods. In that case, the AVF will supply a default effective-time period of [Now( )-9999].

(def) Now( ): this notation is used to indicate the current moment in time at which a transaction is being applied to the database.

An assertion-time period may never be specified on a temporal transaction submitted to the AVF and will always default to [Now( )-9999].

A temporal insert which is not a basic temporal insert may also be submitted to the AVF. On a non-basic temporal insert, all or part of an effective-time period is explicitly supplied with the transaction. If only an effective begin date is supplied, the AVF uses 9999 for the effective end date. If only an effective end date is supplied, the AVF uses the value of Now( ) for the effective begin date. This effective-time period may be any past, present or future time period. A present or future time period may be open, in which case it has a 9999 end date. A present or future time period may also be closed, in which case it has a non-9999 end date. Past time periods are always closed.

Step 705.

As shown in FIG. 10, the AVF defines a bi-temporal "target space" based on the effective-time period and assertion-time period of the transaction.

(def) target space: a range of assertion time together with a range of effective time, specified by a temporal transaction.

If each temporal dimension is represented as one axis on a Cartesian graph, then a transaction's target space may be represented as a rectangle on that graph, and the bi-temporal extent of any row in a temporal table may also be represented as a rectangle on that graph.

(def) target point: a target space is made up of target points. Because this is a two-dimensional space, each point is uniquely identified by a pair of coordinates. One coordinate is a clock tick in assertion time. The other coordinate is a clock tick in effective time.

Each row in a temporal table exists in a space defined by its pair of time periods. Each row "occupies" all of the points in that space.

(def) occupied space, occupied points: we will call the space associated with each row its "occupied space", and the points in its occupied space "occupied points".

Note that a point in either target space or occupied space corresponds to a pair of points in time, one of which is a point in assertion time and the other of which is a point in effective time.

Step 707.

As shown in FIG. 10, the AVF attempts to match the transaction to rows already in the target table. It searches for rows which match the business key specified on the transaction. If it finds such rows, the AVF checks among them to see if even one of them has even a single occupied point that matches a target point for the transaction.

If an OID is supplied on the transaction, the AVF will attempt to find a row already in the target table with the same OID and the same business key. If it does not find one, it rejects the transaction.

If the AVF finds such a row, it will reject the transaction. For example, if the transaction specifies a target space of effective time [Jan12-9999] and assertion time [Jul11-9999], then a row for the same object, whose effective-time period is [Mar11-Feb12] and whose assertion-time period is [Mar11-9999], will cause the transaction to be rejected.

Step 709.

If the AVF does not find any such matching rows, it may still find a match to a row representing the same object, but a row whose occupied space is entirely outside the transaction's target space. If such a match is found, the AVF assigns the OID from the matching row in the target table to the transaction, and otherwise assigns a new OID.

At this point, the AVF has confirmed that applying the transaction to the database will not violate TEI, because no row already in the target table and representing the same object occupies any points within the transaction's target space.

Step 713.

Before a temporal table can be generated, metadata is created for it. If a temporal table contains a TFK, that fact is specified as metadata 503 in FIG. 5, along with a designation of the table referenced by the TFK, and also an indicator stating whether the TFK is optional or required. If no TFK is specified on the transaction, and there is no TFK defined as required for the target table, then the transaction is passed to the DBMS, which creates a new row in the temporal table for that transaction. Otherwise, the value provided for each TFK on the temporal insert transaction must pass the TRI check.

In one embodiment, the TRI check works as follows. Every TFK contains an OID value. For every TFK value supplied on the transaction, the AVF identifies a set of rows in the parent table which each have an OID which matches the OID value in the TFK, and which each have at least one occupied point which matches at least one point in the target space for the transaction.

(def) parent occupied space, parent occupied points: we call the space occupied by the set of these parent table rows the "parent occupied space" corresponding to the transaction, and the points in that space "parent occupied points".

(def) points matching points: we say that a point in one space matches a point in another space if and only if the two points have the same temporal coordinates, i.e. occur at the same point in assertion time and the same point in effective time.

If for every point in the transaction's target space there is a matching point in the parent occupied space, then the transaction passes the TRI check, and otherwise does not. If the transaction passes all TRI checks, then the transaction is applied to the target table.

In another embodiment, the AVF matches rows in the parent table to transactions by assembling sets of effective-time periods from rows in the parent table that (i) entirely include the assertion-time period of the transaction, and (ii) that include at least one effective-time clock tick specified on the transaction. It then sequences the effective-time periods it has assembled, and looks for a contiguous set of time periods that have no gaps between them, and that together include the entire effective-time period specified on the transaction.

FIG. 11 shows a temporal table which contains two rows in a Policy table. As indicated by column 613, the business key for the Policy table, both rows represent insurance policy P861. The two rows describe that policy as it existed throughout 2008. From January to July of that year, as shown by the first row in FIG. 11, the policy was an HMO policy with a $10 copay. As shown by the second row in FIG. 11, the copay was increased to $15 in July, and thereafter the policy remained unchanged through the end of the year.

FIG. 12 shows the same temporal table after a temporal insert transaction was applied to it on March 2010. After a gap of fourteen months, policy P861 has been re-instated, as a PPO policy with a $15 copay. All three of the rows shown in FIG. 12 exist in the shared assertion time of [Mar10-9999]. All three have the same OID. But they do not exist in any shared effective time. If they did, that would be a TEI violation.

All three rows contain a TFK (615) of 8094. Because these three rows have passed TRI checks, the AVF knows that there is a set of rows in the Client table which have (i) an OID of 8094, (ii) an assertion-time period which began on or before January 2008 and which has an assertion end date of 9999, and (iii) an effective-time period which began on or before January 2008 and has an effective end date of 9999. Of course, since there is a fourteen-month gap during which policy P861 was not in effect, the set of rows in the Client table may also include that gap, or any smaller gap inside the same fourteen-month period of time.

The steps 701-715, shown in FIG. 10, do not necessarily represent the sequence of steps taken by the program code in this invention. They are intended to illustrate one way in which program code could be written to manage temporal insert transactions. Other embodiments of the transformations described by these steps are possible, and based on the description of these steps, one skilled in the art could design and build other such embodiments.

A Temporal Update Transaction.

All references, below, to "transactions", unless explicitly indicated otherwise, refer to temporal update transactions until the section A Temporal Delete Transaction is reached.

Figure 13:
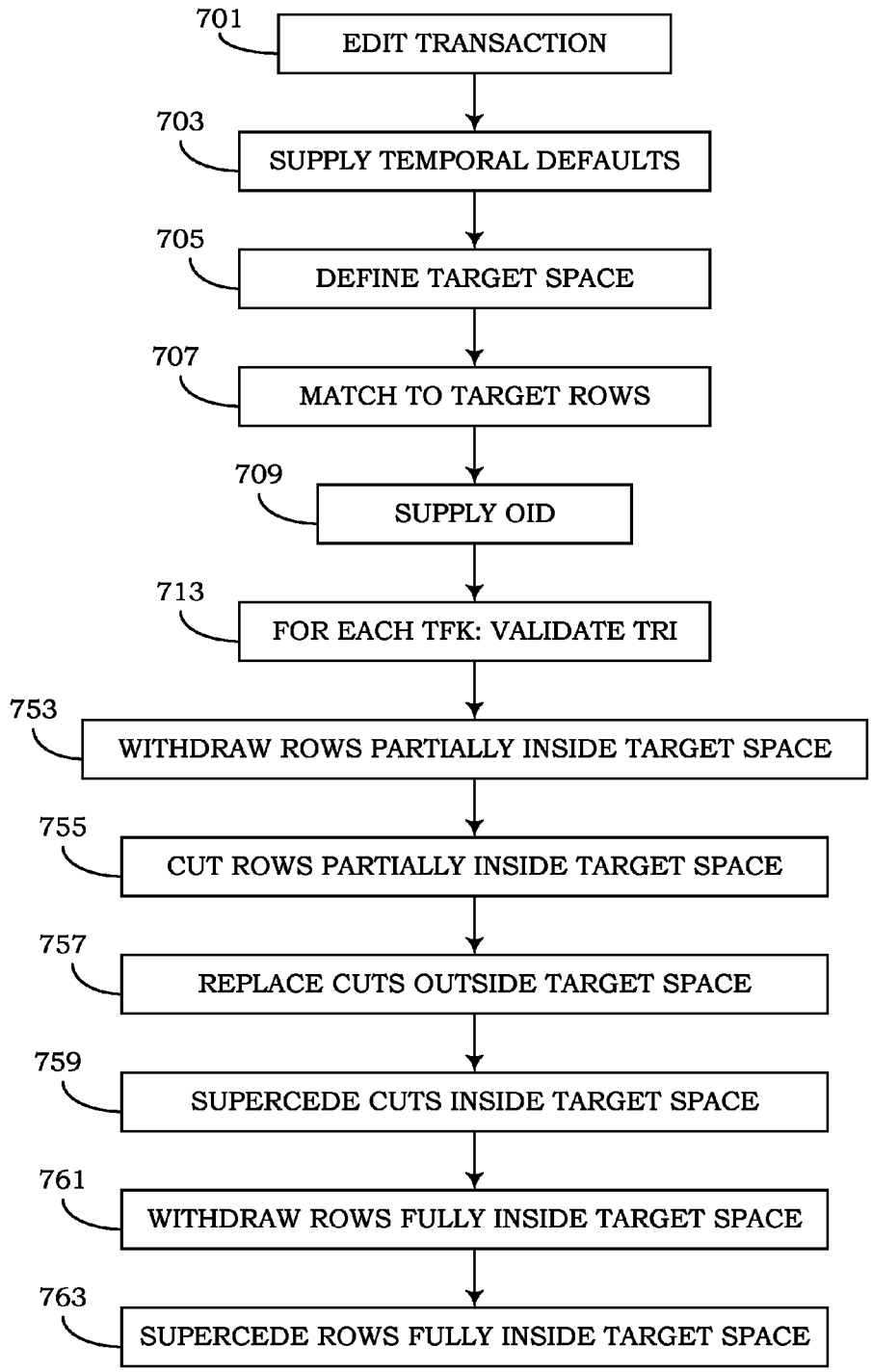
FIG. 13: the sequence of steps for processing a temporal update transaction.

Steps 701, 703 and 705 of FIG. 13.

As submitted, a temporal update transaction must specify (i) a target temporal table, (ii) selection criteria, and whatever business data is to be updated. The selection criteria may include a business key, an OID, or both. If it does, only data representing the one object thus selected will be updated. Otherwise, the temporal update transaction may update data representing several objects.

As shown in steps 701, 703 and 705 in FIG. 13, the AVF edits the transaction, supplies temporal defaults, and defines the target space for the transaction just as it does for a temporal insert transaction discussed above with reference to FIG. 10.

A temporal update may or may not be a basic transaction. If it is, then no effective-time period is supplied with the transaction, and the AVF uses the default effective-time period [Now( )-9999].

Step 707.

Then, as shown in FIG. 13, in step 707 the AVF attempts to match the transaction to rows already in the target table which all represent one object and which have met the selection criteria from the transaction. As explained earlier, if rows representing multiple objects meet the selection criteria, then the processing done by the AVF is equivalent to looping through those objects and processing them one at a time.

If the AVF does not find such a row, it will reject the transaction. For example, if the transaction specifies a target space of effective time [Jan12-9999] and assertion time [Jul11-9999], then a row for the same object, whose effective-time period is [Mar11-Feb12] and whose assertion-time period is [Mar11-9999], will cause the transaction to be accepted. Also, to take another example, a row whose occupied space is wholly contained within the transaction's target space will cause the transaction to be accepted.

Step 709.

If a transaction was not supplied with an OID, then the AVF will assign the OID from a matching row in the target table to the transaction.

Step 713.

If one or more TFK values are supplied on the temporal update transaction, then the AVF carries out a TRI check on each of them.

If the temporal update transaction is not rejected, then the AVF continues to process it. All work done from this point forward, until the transaction is complete, is done as an isolated and atomic unit of work.

Step 753.

As shown in FIG. 13, the AVF begins by withdrawing target rows which partially overlap the target space. These are rows (i) whose assertion-time periods end in "9999", and thus include the assertion-time period of the transaction, and whose effective-time periods (ii) share at least one clock tick with the effective-time period of the transaction, and also (iii) include at least one effective-time clock tick that is not included within the effective-time period of the transaction.

To withdraw a row is to change its assertion end date to the assertion begin date specified on the transaction. That point in time is always the point in time at which the transaction is being processed. Semantically, this means that from Now( ) on, the withdrawn row will no longer be asserted as making a true statement about the object it represents.

Step 755.

Next, the AVF "cuts" the row or rows withdrawn as part of the transaction.

(def) cut: to cut a withdrawn row is to create a set of rows which are identical to the withdrawn row except that (i) each row in the set is given the assertion-time period specified on the transaction, (ii) either one or two rows in the set has an effective-time period identical to the part of the withdrawn row's effective-time period that lies outside the transaction's target space, and (iii) one row in the set has an effective-time period identical to the part of the withdrawn row's effective-time period that lies inside the target space. In this invention, the assertion-time period specified on the transaction is always [Now( )-9999].

Step 757.

The AVF then physically inserts the one or two rows in the set of rows whose effective-time period lies outside the target space into the target table. These rows are said to "replace" the part or parts of the withdrawn row that were outside the target space of the transaction. These rows are given the assertion-time period specified on the transaction.

Step 759.

Next, the AVF applies the business data, and any temporal foreign keys, from the transaction to the remaining row in the set of rows. It then physically inserts this updated row into the target table, assigning it the assertion-time period from the transaction. This updated row is then said to "supercede" the part of the withdrawn row that was inside the target space of the transaction. For example, if the temporal transaction specified an insurance policy type of PPO, then the policy type in the superceding row is overwritten with that value.

Step 761.

Next, the AVF withdraws all rows which do not exist in past assertion time, but which have the same OID as the OID on the transaction, and whose effective-time periods are fully contained within the effective-time period of the transaction.

Step 763.

Next, the AVF makes a copy of those withdrawn rows, assigns them the assertion-time period specified on the transaction, and updates all data other than the two time periods on those rows with the corresponding data from the transaction. If any temporal foreign keys were specified on the transaction, the AVF also updates the temporal foreign keys on those rows with the values from the transaction. It then physically inserts those new rows, which are rows which supercede their corresponding withdrawn rows.

As already noted, all the physical updates and physical inserts required to complete a temporal update transaction are managed by the AVF as an atomic and isolated unit of work. If any of those physical transactions fails, the AVF will direct the DBMS to undo any earlier physical transactions that are part of that unit of work.

FIG. 14 shows the same temporal table as that shown in FIG. 12, but after a temporal update transaction has been applied to the table on September 2010. The first three rows in FIG. 14 are the same rows shown in FIG. 12. The temporal update transaction was processed on the clock tick of September 2010. The transaction either specified an effective-time period of [Sep10-9999] or, more likely, specified no effective-time period at all. In the latter case, the transaction was a "basic temporal update", and the AVF used the default value of [Sep10-9999] for the effective-time period. We may assume that by means of either an OID, a business key, or both, the AVF was able to match the transaction to the third row in the target table.

We may assume that the only business data supplied on the transaction was a new copay amount, because that is the only business data that the transaction changed. Therefore, there were no TRI checks to be performed by step 713 for this transaction.

Next, the AVF withdrew the one matching row it found, that being the third row in the target table shown in FIG. 14. It withdrew the row by physically overwriting its assertion end date of 9999 with the clock tick on which the transaction was being processed, that being September 2010. This was done in step 753.

Next, the AVF completed step 755. The result was to physically insert into the table the fourth and fifth rows shown in FIG. 14. In step 757, the AVF used the fourth row to replace the part of the withdrawn row that was outside the target space of the transaction. In step 759, the AVF updated the fifth row with the business data from the transaction, and thus superceded the part of the withdrawn row that was inside the target space of the transaction.

No other rows in the target table were wholly or partially within the target space of the transaction, and so the transaction was complete at that point in time. The atomic and isolated unit of work was complete, and all locks used in the process were released.

The steps 701-763, shown in FIG. 13, do not represent the sequence of steps taken by the program code in this invention. They are intended to illustrate one way in which program code could be written to manage temporal update transactions. Other embodiments of the transformations described by these steps are possible, and based on the description of these steps, one skilled in the art could design and build other such embodiments.

A Temporal Delete Transaction.

All references, below, to "transactions", unless explicitly indicated otherwise, refer to temporal delete transactions until the section Support for Uni-Temporal and Non-Temporal Data as Abstractions is reached.

As submitted, a temporal delete transaction must specify (i) a target temporal table, and (ii) selection criteria. The selection criteria may include a business key, an OID, or both. If it does, only data representing the one object thus selected will be deleted. Otherwise, the temporal delete transaction may delete data representing several objects.

As shown in steps 701, 703 and 705 in FIG. 13, the AVF edits the transaction, supplies temporal defaults, and defines the target space for the transaction just as it does for a temporal insert transaction.

A temporal delete specifies that, for the object it represents, no rows may remain asserted in the target table anywhere within the assertion-time period and the effective-time period specified on the transaction. A basic temporal delete has no effective-time period supplied with the transaction, and so the AVF associates the default effective-time period [Now( )-9999] with the transaction. The result will be to withdraw any rows in current assertion time which have even a single effective-time clock tick within that period of time. A non-basic temporal delete will have an effective-time period supplied with the transaction, or else it will supply a begin date only or an end date only. In the former case, the AVF uses 9999 for the end date; in the latter case, it uses the value of Now( ) for the begin date. For example, a non-basic temporal delete might specify an effective-time period of [Apr09-Dec15]. The result of that delete will be that no currently asserted rows will remain in the target table that represent the indicated object, and whose effective-time periods fall anywhere within that range of time.

A temporal delete requires that, for any row whose occupied space lies partially within the transaction's target space and partially outside that target space, the AVF withdraw that row and replace the part of the row which lies outside that target space. We note that if the row's effective-time period begins before the effective-time period on the transaction, and also ends after the effective-time period on the transaction ends, that the AVF will insert two replacement rows for the withdrawn row, one on either side of the transaction's specified effective-time period.

The AVF then withdraws all rows which, within in the assertion time specified on the transaction, have effective-time periods which lie completely within the effective-time period specified on the transaction. The result is that, from the assertion begin date specified on the transaction on into the future, until and unless later temporal insert transactions repopulate all or part of those withdrawn representations of the object, the target table will not assert any representation of the object within that period of effective time.

If a conventional transaction deletes a row in a table which is the parent table in a referential integrity relationship, the DBMS must insure that the result of the transaction does not leave any "dangling references" to that row from the child table. In other words, it must not leave any rows in the child table which have foreign keys pointing to the row in the parent table that were deleted.

As is well-known to those skilled in the art, a relational DBMS has three ways to prevent dangling references being created by a delete transaction. One way is to restrict the delete transaction as long as there are any child rows that would be left with dangling references. A second is to remove the dangling references in the child rows by setting the foreign keys in those rows to null. The third is to cascade the delete of the parent row or rows, deleting all the child rows that point to it.

The third option, of course, is recursive, because if a child row is deleted, and it is also a parent row to some other row, then deleting it would leave a dangling reference to it. Once again, the DBMS has three options to avoid the dangling references.

To illustrate the multi-table effect of a temporal delete transaction, we consider an example in which two tables are involved. The parent table is a Client table, as shown in FIG. 16a. We will assume that a temporal delete transaction is being processed on December 2010, and that it specifies that client C457 was in fact not a client of our company during the months of July through October of 2010. This is obviously a retroactive transaction, correcting a mistake in the database.

FIG. 16b shows the same temporal table as that shown in FIG. 16a, but after a temporal delete transaction has been applied to the table on December 2010. This temporal delete specified that client C457 should be removed from the four months of July through October of 2010. Therefore, from this point in assertion time, which is December 2010, the table must not contain an assertion that client C457 was in effect during any of those four months.

Steps 701, 703, 705, 707, 709.

Figure 15:
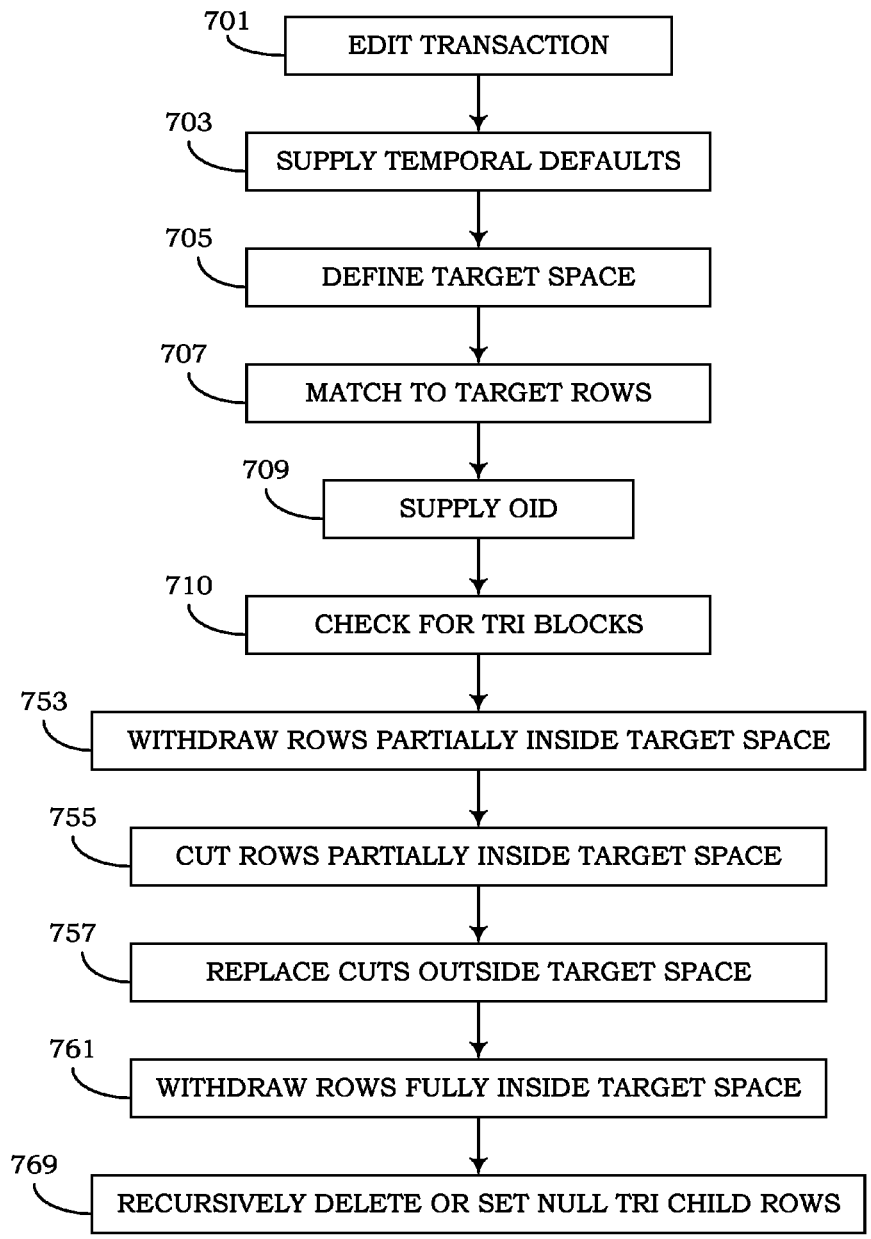
FIG. 15: the sequence of steps for processing a temporal delete transaction.

As shown in FIG. 15, in steps 701, 703, 705, 707, and 709, the AVF edits the delete transaction (701), supplies temporal defaults (703) and defines the target space (705). It then matches rows in the target table to the target space (707). As with a temporal update transaction, the AVF requires that there is at least one row representing an object selected by the transaction, and that occupies at least one point that matches a point in the transaction's target space.

If there is no such row, the AVF rejects the transaction. However, the one row for client C457, as shown in FIG. 16a, meets this criterion, and so the AVF accepts the transaction. If no OID was supplied on the temporal delete transaction, then in step 709, the AVF attaches the OID from the matching row to the transaction.

Step 710, Client Table.

Next, the AVF checks to see if any child rows to client C457 also exist within the transaction's target space. It looks at the temporal foreign key metadata 503, shown in FIG. 5. The metadata indicates that the Client table is a parent table in a TRI relationship, and that a temporal delete against that table should be cascaded to the Policy table. Since the metadata does not specify that the temporal delete should be restricted, and since there are no other tables for which the Client table is a parent table in a TRI relationship, the AVF continues to process the transaction.

In our preferred embodiment this metadata is used to create static scripts that perform these operations, but in another embodiment this metadata could be evaluated dynamically at run time.

Step 753, Client Table.

The temporal delete transaction specified an effective-time period of [Jul10-Nov10]. In this invention, the transaction defaulted to an assertion-time period of [Now( )-9999], with Now( ) being the clock tick of December 2010. There is only one row for client C457, and some of its occupied points match points in the target space of the transaction, while others do not. Therefore, the AVF begins by withdrawing that one client row. As shown in FIG. 16b, it does this by overwriting the 9999 assertion end date on the row, changing the rows assertion-time period to [Jan08-Dec10]. In other words, as soon as this transaction is complete, that row will no longer be asserted to make a true statement.

Step 755, Client Table.

In this example, the target space is wholly contained within the occupied space of the one row for client C457. Therefore, the cut operation, step 755, results in three rows. Two are outside the target space, and one is inside the target space.

Step 757, Client Table.

Next, the AVF inserts into the target table the two rows resulting from the cut operation which are outside the target space of the transaction. The middle row is discarded, and is not added to the target table, because it represents the effective-time period specified on the delete transaction. The two rows added in this step are shown as the second two rows in FIG. 16b.

Step 761, Client Table.

There are no other rows for client C457 within the target space of the transaction, so there is no work for this step to do.

The AVF has already determined that this temporal delete transaction should cascade to any dependent tables, and that there is one such table, that being the Policy table. Since steps 701-709 have already been applied to the temporal delete transaction, they do not need to be invoked a second time, and so the temporal delete transaction, as applied to the Policy table, begins with step 710.

Step 710, Policy Table.

By referencing the temporal foreign key metadata 503, the AVF determines that the Policy table is not a parent table in any TRI relationship. If it were a parent table in a TRI relationship, and if the metadata said that a temporal delete to that table should be restricted as long as there were any TRI dependents on the data about to be deleted, then the AVF would have to direct the DBMS 115 to undo the physical updates that had already been made as part of carrying out this temporal delete transaction.

Step 753, Policy Table.

The temporal delete transaction specified an effective-time period of [Jul10-Nov10], and defaulted to an assertion-time period of [Now( )-9999], with Now( ) being the clock tick of December 2010. There are two rows in the Policy table whose TFKs reference client C457 (by containing the OID value of 8094), and which each have some occupied points which match points in the target space of the transaction, and some occupied points which do not. These are the fourth and fifth rows shown in FIG. 14 and also FIG. 16c. FIG. 14 shows these rows before the temporal delete transaction is applied to them. FIG. 16c shows these rows after the transaction is applied. These two rows are withdrawn by overwriting their assertion end dates with the current clock tick. As shown in FIG. 16c, the result is to change the assertion-time period on these rows to [Sep10-Dec10]. In other words, as soon as this transaction is complete, those two rows will no longer be asserted to make true statements.

Step 755, Policy Table.

In this example, the cut operation cuts the first withdrawn row into two rows, and also cuts the second withdrawn row into two rows. The two rows resulting from the cut of the first withdrawn row have effective-time periods of [Mar10-Jul10] and [Jul10-Sep10]. The two rows resulting from the cut of the second withdrawn row have effective-time periods of [Sep10-Nov10] and [Nov10-9999].

Step 757, Policy Table.

Next, the AVF inserts into the target table the two rows resulting from the cut operation which are outside the target space of the transaction. They are (i) the first row in the first pair of rows, and (ii) the second row in the second pair of rows. These rows are given the assertion-time period specified on the transaction, which is [Now( )-9999], and appear in FIG. 16c as the last two rows in the table.

Step 761, Policy Table.

The other two rows produced by step 755 are discarded, because they fall entirely within the target space of the transaction.

The transaction is now complete. Prior to December 2010, currently asserted rows in the database stated that there was a client C457 in effect during the months of July, August, September and October of 2010, and also that this client owned a policy P861 which was in effect during that time, and which in July and August had a copay of $15, and in September and October had a copay of $20. Starting on the clock tick of December 2010, there are no currently asserted rows making any of these statements. By a natural extension of the Closed World Assumption to this database, we can say that, starting in December 2010, the database states that there was no such client and no such policy in effect during those four months of 2010.

Support for Uni-Temporal and Non-Temporal Data as Abstractions.

Improvements are to add to the functionality of some embodiments the ability to support queries for either kind of uni-temporal data, and queries for non-temporal data, without exposing to the authors of those queries the complexities of the canonical schema 600, or the complexities of a table which may contain rows which exist in any of the temporal categories past/past 121, past/present 123, past/future 125, present/past 127, present/present 129 or present/future 131, as shown in FIG. 1.

Some embodiments already makes it possible for the authors of maintenance transactions to write insert, update, and delete transactions against the canonical schema 600 without being exposed to the complexities of the canonical schema 600 or the complexities of the contents of those tables. When no temporal parameters are expressed on temporal transactions, it appears to the authors of those transactions that they are writing transactions against the otherwise identical non-temporal table. When effective time is expressed on temporal transactions, it appears to the authors of those transactions that they are maintaining simple uni-temporal version tables. Yet in both cases, the AVF is supporting changes in assertion time as well, and by that means is able to present, as queryable objects, either otherwise identical non-temporal data as it physically existed at any point in time, or uni-temporal version data as that data existed at any point in time.

So together with these encapsulation capabilities for maintenance transactions, the encapsulation capabilities of additional embodiments mean that by means of the AVF and its universal canonical schema, the complexities of managing and querying bi-temporal data as though it were non-temporal data are eliminated, and the complexities of managing and querying bi-temporal data as though it were uni-temporal versioned data are also eliminated.

Nowhere in the prior art is it proposed that valid time data, transaction time data and non-temporal data can be managed and queried as abstractions on temporal data which is physically implemented only in bi-temporal tables. But this is one of the features of our invention. We continue our discussion of this implementation using our terminology of "effective time" and "assertion time". As explained earlier, effective time is equivalent to valid time, and until we begin to discuss deferred assertions, assertion time functions exactly as transaction time does.

The Management of Uni-Temporal and Non-Temporal Data as Abstractions.

The invention manages effective-time data, assertion-time data and non-temporal data as abstractions on the bi-temporal data stored in the tables which conform to its canonical schema.

The AVF does this by means of the temporal transactions it supports, and the bi-temporal data into which it maps the results of carrying out those transactions. Assertion-time periods cannot be specified on the temporal transactions, and so the role of assertion-time periods in tracking changes to data which do not correspond to changes in the objects represented by that data is transparent to the user of the invention. But every time a temporal transaction changes the data which describes the state of an object during a period of effective time, the AVF preserves the before-image of that data as a withdrawn assertion. And so when users of the database write temporal transactions, even though they do not specify assertion time on those transactions, the AVF does manage those transactions so as to keep a complete record of all uni-temporal assertion-time data in its canonical tables.

Valid-time periods can be specified on the temporal transactions. When they are, the data on the transaction is interpreted as describing the state of the object designated by the transaction only during that valid-time period. In this way, data describing past, present and future states of objects can be entered into the database at any time, and the database always contains the most current description of the state of an object at any point in valid time. When two or more rows of data in a canonical table both contain a description of the state of an object at a given point in valid time, the most current description of that state of the object is the one provided by the row which is most recent in transaction time. And so when users of the database write temporal transactions, the AVF does manage those transactions so as to keep a complete record of uni-temporal valid-time data in its canonical tables. And to those users, it will seem as though they are maintaining uni-temporal valid-time tables.

It is not necessary to specify valid-time periods on the temporal transactions. If a valid-time period is not specified on a temporal transaction, we refer to it as a "basic" temporal transaction. Basic temporal transactions make it appear that it is a conventional, non-temporal table that is being maintained, because of the implicitly understood semantics of conventional tables. Those semantics are that every row in a conventional table, at each point in time, represents (i) the assertion that, at that point in time, that row makes a true statement, and (ii) the assumption that, at that point in time, that row describes the then-current state of the object it represents. The only way to remove that assertion of that description from a conventional table is to delete the row in question.

Every basic temporal insert or update results in a row with these same semantics. Every basic temporal delete results in the same semantics by withdrawing one or more currently asserted rows into past assertion time. Inserts, updates and deletes of data describing a specific object, as basic temporal transactions, will seem to be inserting, updating and deleting the one row of data in a conventional table that represents that object. However, what in fact is happening is that the AVF is keeping track of the bi-temporal history of that object and of the data that describes it.

The Querying of Uni-Temporal and Non-Temporal Data as Abstractions.

Some embodiments complement the management of temporal transactions just described by providing views corresponding to each of the two kinds of uni-temporal table, and also by providing a view over each canonical table which corresponds, in both schema and content, to an otherwise identical non-temporal table.

Figure 22:
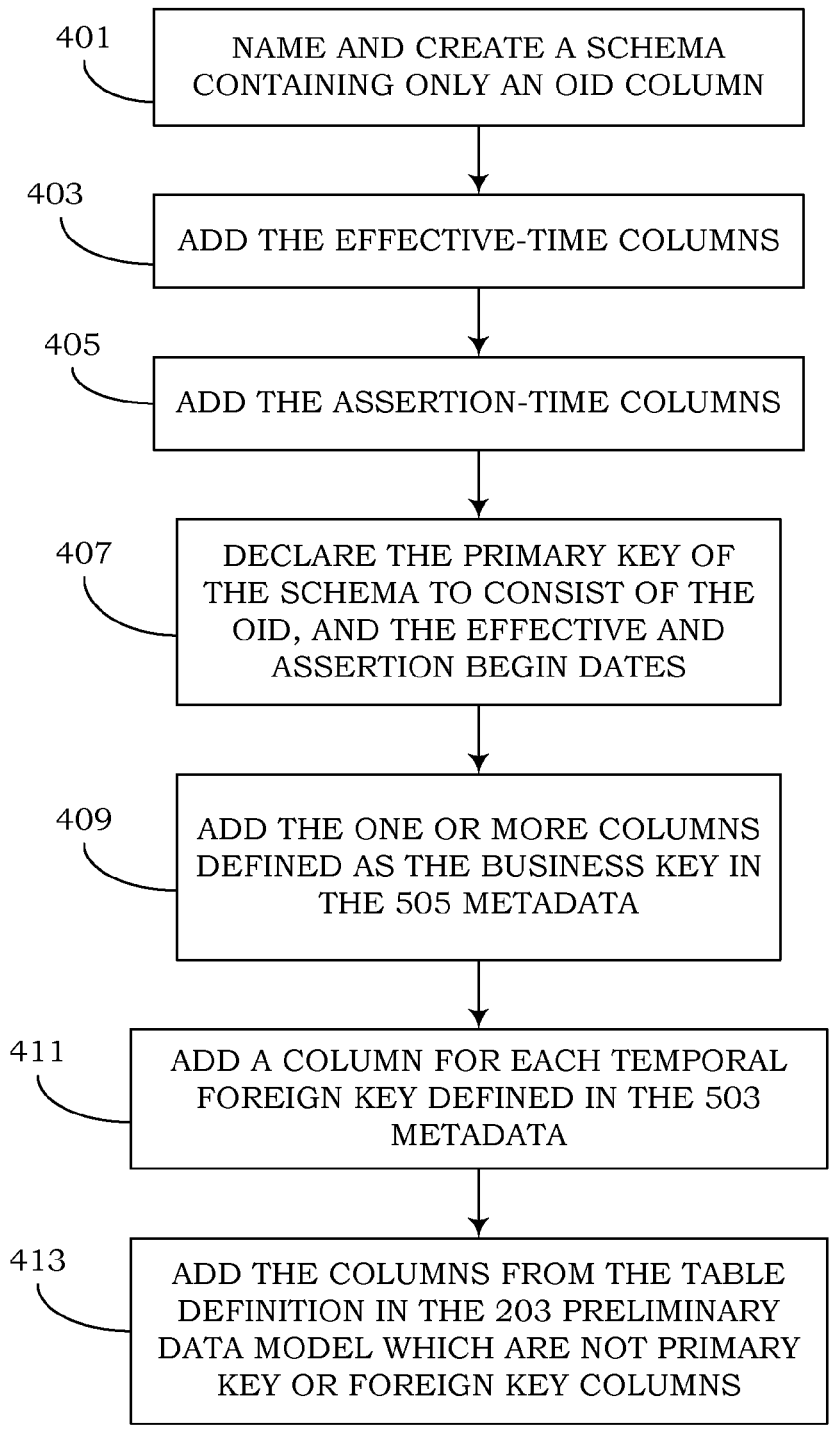
FIG. 22: the sequence of steps for generating temporal tables from a preliminary data model together with metadata expressing the temporal features of those tables.

FIGS. 20, 21 and 22 show different views of the Policy table shown in FIG. 16c and in other figures. As already explained, the notation "Now( )" is our DBMS-agnostic way of designating the current moment in time, and the notation "9999" is our DBMS-agnostic way of designating the highest temporal value a specific DBMS can recognize. Note that in FIGS. 20, 21, 22, 23, the physical names of the two temporal tables are Client_AV and Policy_AV.

FIG. 18 shows one particular transaction-time view. It is a dynamic view, one that is always current because "Now( )" is a variable. As will be apparent to one skilled in the art, this view will always present all and only those rows from the Policy_AV table whose effective-time period is current. Some of these rows may be past assertions about those objects in their current effective-time periods. Other rows may be current assertions about those objects in their current effective-time periods. This view thus constitutes a "semantic log-file" of any changes to data that describes the current state of objects represented in the table.

FIG. 19 shows one particular valid-time view. It is also a dynamic view. As will be apparent to one skilled in the art, this view will always present all and only those rows from the Policy_AV table which are currently asserted to make true statements. It thus constitutes a record of all statements which we currently claim are true about what the objects represented in the table used to be like, are currently like, and will in the future be like (to the best of our knowledge).

FIG. 20 shows one particular valid-time view. It is also a dynamic view. As will be apparent to one skilled in the art, this view will always present all and only those rows from the Policy_AV table which are currently asserted to make true statements, and which are statements describing the current state of the objects they represent. The contents of this view thus correspond, row for row, at each moment in time, with the contents of an otherwise identical non-temporal table.

FIG. 21 shows the view by means of which this invention supports the temporal upward compatibility of queries originally written against non-temporal tables. It will be clear to one skilled in the art that such a view must have (i) the same name as the original non-temporal table, (ii) exactly the same set of columns as the columns in the original non-temporal table, (iii) the same name for each column as the corresponding column in the original non-temporal table, and (iv) the same set of rows, at each moment in time, that would have been contained in the temporal table if it had remained a non-temporal table.

The section entitled Foundational Concepts: an Otherwise Identical Non-Temporal Table, describes an algorithmic process by which a temporal upward compatibility view could be automatically generated for each temporal table using the canonical schema and the metadata of this invention.

In FIG. 21, we show such a view for the Policy table. We assume, in this view, that "Policy" is the name of the original non-temporal table of policies, and that "Client_AV" is the name of the temporal table of clients shown in FIG. 16a and elsewhere. In FIG. 17b, reference character 303 designates the schema of the original non-temporal Policy table. It should be apparent to one skilled in the art that the view statement shown in FIG. 21 defines the same identical schema.

The view V_Policy_Non_Temp_Curr, which is shown in FIG. 20, restricts the rows from the Policy_AV table which will appear in the view to those rows which are current in both valid time and transaction time. Since the Policy view, shown in FIG. 21, selects its rows from this view shown in FIG. 20, and since the Policy view does not filter out any rows, it should be apparent to one skilled in the art that the view statement shown in FIG. 21 will result in a view which, at each moment in time, contains all and only those rows from the temporal table that are current in both valid time and transaction time.

Support for the Generation of Temporal Tables from Precursor Tables Plus Metadata.

This is for an improvement on previously-described implementations.

We begin by defining some necessary terminology.

(def) physical data model: we use this term as it is understood by data modelers throughout the Information Technology profession. Paradigm examples are the physical data models produced by the ERwin data modeling tool.

(def) non-temporal physical data model: a physical data model none of whose tables include valid time or transaction time, and none of whose tables include effective time or assertion time.

(def) preliminary data model: a non-temporal physical data model from which, together with temporal metadata, this invention will generate a temporal database.

(def) precursor table: a table in preliminary data model from which, together with temporal metadata, this invention will generate a temporal table.

(def) temporal table generated by this invention: a temporal table generated from a precursor table, together with temporal metadata, by this invention.

(def) Asserted Versioning Framework Script/Code: program procedure or program code logic that is generated and executed statically, or executed dynamically, using temporal metadata that enforces temporal constraints and manages the temporal data defined in this invention as temporal transactions are applied to them.

For each precursor table in a preliminary data model, this invention generates a temporal table by carrying out the following steps, as shown in FIG. 22. We will describe the generation of the Policy canonical schema temporal table 119, shown in FIG. 8 from the Policy precursor table 202 shown in FIG. 3.

Step 401.

The invention names and creates a schema which conceptually, at this point, contains only an OID column. As determined by the metadata 501, the name of that schema is Policy_AV. The OID is the column policy-oid.

We note that here, and elsewhere in this patent application, including in some of the Figures, column names contain hyphens, but in others of the Figures, the same column names contain underscores in place of hyphens. As physically implemented, of course, column names must not contain hyphens.

Step 403.

The two columns of the Policy canonical schema temporal table 119 eff-beg-dt and eff-end-dt are next added to the schema. In another embodiment, a single column using a PERIOD datatype could be used.

Step 405.

The two columns of the Policy canonical schema temporal table 119 asr-beg-dt and asr-end-dt are next added to the schema. In another embodiment, a single-column using a PERIOD datatype could be used.

Step 407.

In this embodiment, the effective-time period is represented in the primary key of every temporal table by means of the eff-beg-dt only, and the assertion-time period is represented in the primary key of every temporal table by means of the asr-beg-dt only. In other embodiments, the end dates could be used instead, or both the begin and end dates. In another embodiment in which each time period is represented by a single-column using a PERIOD datatype, those two columns would be part of the primary key.

Step 409.

As directed by the metadata 505 shown in FIG. 6, the AVF next adds the column policy-nbr to the schema.

Step 411.

Figures 3, 4, 5:
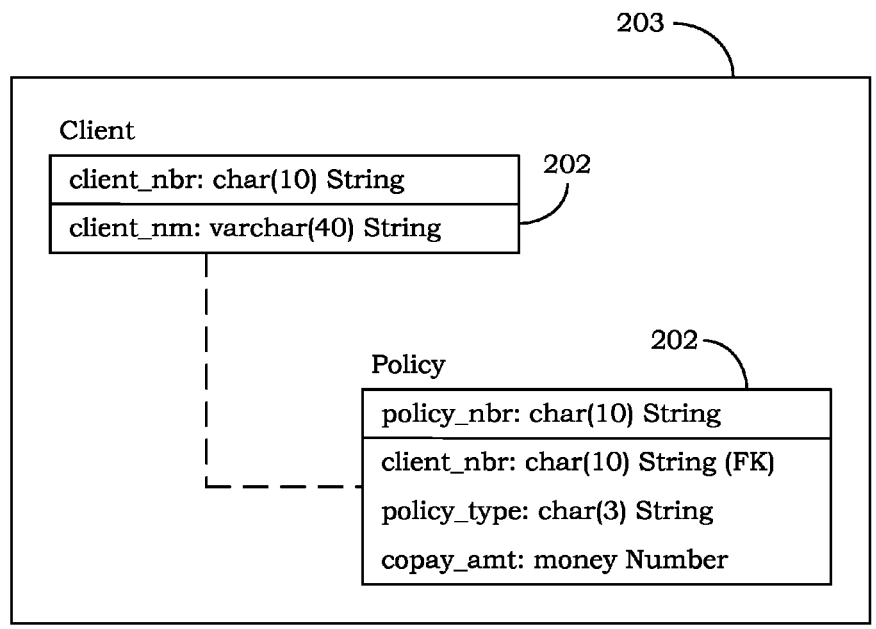
FIG. 3: a preliminary data model 203. This figure shows the precursor tables 202 from which, together with metadata, the invention will generate temporal tables.
FIG. 4: precursor table metadata 501, with one entry for every table in the preliminary data model from which the invention will generate a temporal table.
FIG. 5: temporal foreign key metadata 503, with one entry for every temporal foreign key. Each entry identifies the table in which the temporal foreign key occurs, the name of the temporal foreign key column, and the table to which the temporal foreign key refers. It also indicates whether the temporal foreign key is optional or required, and whether the presence of affected dependent rows should restrict the delete, cause the delete to set referring temporal foreign keys to null, or cascade the delete.

As directed by the metadata 503 shown in FIG. 5, the AVF next adds the column client-oid to the schema.

Step 413.

The AVF now reviews the schema of the precursor table 202 in the preliminary data model 203, as shown in FIG. 3. The primary key column has already been represented in the temporal schema by the business key column. The foreign key column has already been replaced by a temporal foreign key column. The remaining columns are policy-type and copay-amt, and the AVF now adds them to the schema for the temporal table.

An Additional Role for Temporal Metadata.

A temporal table has now been generated from the combination of a precursor table in a preliminary data model, and temporal metadata. When this has been done for every precursor table listed in the metadata 501, the generation of all temporal tables in the temporal database is complete.

However, we note that the temporal metadata is not only used by the AVF to generate temporal tables from precursor tables. It is also used in the management of those temporal tables, as temporal transactions are applied to them.

The metadata 501 allows the AVF to translate temporal transactions which name otherwise identical non-temporal tables into physical transactions which name the temporal tables which physically exist in the database.

The metadata 503 is a declarative specification of all temporal foreign keys in the database, naming the temporal foreign key column, indicating whether each one is optional or required, and indicating how each one is to be treated when involved in a temporal delete transaction.

The business key metadata 505 identifies the column or columns in each temporal table which correspond to the primary key column or columns in the corresponding otherwise identical non-temporal table. This is important for creating the view which supports temporal upward compatibility for queries against an earlier non-temporal form of the table. One reason this metadata is important is that these columns will appear in the view in place of the primary key columns of the temporal table. A second reason this metadata is important is that the values for these columns are in fact the values which will populate the foreign key columns in the view which supports temporal upward compatibility for the temporal tables which reference the temporal tables in which these columns are the business key columns.

The metadata 507 which maps foreign keys to temporal foreign keys is also important for creating the view which supports temporal upward compatibility for queries against an earlier non-temporal form of the table, because these foreign key columns will appear in the view in place of the temporal foreign key columns of the temporal table. These foreign key columns are the columns that will be populated by the values from the business key columns of the temporal table to which the temporal foreign keys replaced by these foreign keys refer.

Benefits of Generating Temporal Tables from Precursor Tables and Temporal Metadata.

This aspect adds to various implementations the ability to express requirements for temporal data as metadata, and thus to avoid the need to design specifically temporal tables, columns, keys, etc. in any kind of data model including a relational logical data model, an entity-relationship data model or a physical data model. It also adds to the various implementations the ability to automatically generate temporal tables from precursor tables and the temporal metadata associated with them.

This invention has several important benefits. First, it eliminates the work involved in expressing temporal requirements in data models. The amount of work can be substantial, as is shown in Chapter 11 in the book by Dr. Richard Snodgrass (Snodgrass, 2000). This chapter takes fifty-five pages to explain how to express temporal data requirements in data models.

Second, this invention means that existing data models which do not express temporal requirements do not have to be modified whenever one or more non-temporal tables in a database are converted to temporal tables. This preserves the business value of existing data models, which can remain unchanged as the databases they describe evolve over time to contain an increasing number of temporal tables and a smaller number of non-temporal tables.

Third, this invention means that there are no differences in how the same temporal requirements are implemented by different project teams designing solutions for different subsets of the tables in one or more databases. The process of generating one or more temporal tables of a database from a preliminary data model together with metadata means that this invention guarantees that all temporal tables will have the same canonical schema, and therefore can be maintained with the same codebase and with the set of transactions without regard to ad hoc differences reflecting different approaches by different design teams to solving the same set of requirements, and can also be referenced in queries without needing to elaborate those queries to overcome such ad hoc differences.

Fourth, this invention eliminates the complex, custom code that application programs would otherwise require to properly maintain temporal data. All the complexities of maintaining temporal data are isolated in the AVF. The work of application programs is simply to accept temporal transactions as input, and pass them on to the AVF.

Support for Episodes.

This aspect is for an improvement on the previously-described embodiments.

This aspect differs from the previously-described embodiments by the addition of a user-defined managed object which we call an episode, and by extending the AVF to use episodes to manage temporal tables.

(def) A managed object is the representation, in data, of a specific object or of a specific type or concept.

A table is a managed object representing a type such as customers or products. A row in a conventional table is a managed object representing an instance of a type such as a specific object or a specific product.

(def) AVF-E: (def) the extension of the AVF to use episodes to manage temporal tables.

The series of steps by which the AVF-E manages temporal transactions, and the data in extended canonical schema tables which result from those transactions, is the same series of steps by which the AVF manages temporal transactions, and the data in canonical schema tables which result from those transactions, except that the AVF-E manages episode begin dates and uses them in carrying out temporal referential integrity checks. The management and use of episode begin dates replaces the processes that the AVF uses to dynamically create and utilize occupied spaces and points, and parent occupied spaces and points.

The managed object we call an episode is a set of rows. It is managed by means of one column added to our canonical schema. That is the column designated by reference character 618 in FIG. 23. With the addition of this column, our canonical schema 600 becomes our extended canonical schema 623.

(def) An episode is a set of rows in a temporal table which have (i) the same OID, (ii) a shared period of assertion-time, (iii) effective-time periods which do not overlap and which, in effective-time chronological sequence, do not contain any gaps between any adjacent pairs of those rows, and (iv) for which there is no other row which has (iv-a) the same OID, (iv-b) an assertion-time period which is identical to or which overlaps the shared assertion-time period of the rows in the set, and (iv-c) an effective-time period which is effective-time contiguous with the effective-time period of either the effective-time earliest or latest row in the set.

Within any period of assertion time, every episode is uniquely identified by an OID and a point in effective time. That point is the earliest point in effective time of all the rows in the set. It is represented by the episode begin date 618, and in our preferred embodiment, the value in that column will be identical to the value in the effective begin date 603 of that earliest row in that set. All the rows which belong to the same episode have the same episode begin date.

We will first describe episodes in terms of how they are managed, and then in terms of how they are used.

The Management of Episodes.

The shared assertion time of a set of rows is the largest assertion-time period included in the assertion-time periods of all the rows in the set. In the two rows shown in FIG. 24, that shared assertion time is the assertion-time period of [Jul08-9999].

Both the AVF and the AVF-E, which is the extended version of the AVF 111 shown in FIG. 1, will guarantee that, within shared assertion time, no two rows in any set of rows with the same OID will have identical or overlapping effective-time periods. This guarantee is provided by enforcing the constraint of temporal entity integrity. It follows that none of the rows in an episode will have identical or overlapping effective-time periods.

However, within shared assertion time, and among rows with the same OID, there may be temporal gaps between any two effective-time adjacent pairs of those rows. Each such gap defines the end of one episode of the object represented by that OID, and also defines the beginning of another episode of the object represented by that OID. This follows from component (iv) of the definition of an episode, provided above.

An episode can be added to a temporal table by a temporal insert transaction. It can also be created by a temporal delete transaction which removes a period of effective time from within the effective time of an existing episode. By doing so, the temporal delete transaction creates a gap in effective time, and as the previous paragraph explains, such a gap defines the boundary between two adjacent episodes. There is no other way to add an episode to a temporal table.

An episode can be removed from a temporal table by a temporal delete transaction, or by a temporal insert transaction which merges two episodes into one episode. There is no other way to remove an episode from a temporal table.

(def) "next to": two points in time, in the same temporal dimension, are "next to" one another if and only one follows the other without any gap in time between them. It is important to emphasize, however, that because of the closed-open convention used to represent time periods in this embodiment, if two time periods are next to one another, then the end date of the earlier one will have the same value as the begin date of the later one.

A temporal insert transaction results in a new episode if and only if there is no row for the same object already in the target table whose effective end date in time is next to the new row's effective begin date, and also no row for the same object already in the target table whose effective begin date is next to the new row's effective end date. In this case, the new row's episode begin date is given the same value as its effective begin date. Here and elsewhere, we sometimes leave out the phrase "within shared assertion time", but that phrase should always be understood to apply. In any comparison of points or periods in effective time, the comparison always takes place within shared assertion time. Rows which do not share any assertion time cannot be compared; they are incommensurable.

Effective begin dates, effective end dates, assertion begin dates and assertion end dates are the means by which, in this embodiment, individual effective-time periods and individual assertion-time periods are defined. In another embodiment, these time periods might be defined by single columns with a PERIOD datatype.

Regardless of the embodiment, time periods always have a known begin point in time, and always last for at least one clock tick. Closed time periods also have a known end point in time. Open time periods are assigned, as an end point in time, the latest point in time which the DBMS can represent. In another embodiment, open time periods might be designated by using NULL, or by using any other special value which will be managed and interpreted as representing the latest possible point in time.

If the effective begin date of a new row created by a temporal insert transaction is next to the effective end date of another row with the same OID, then the new row extends the episode that the other row belongs to forwards in effective time. In that case, the new row is given the episode begin date of that other row, indicating that it has become part of that episode.

If the effective end date of a new row created by a temporal transaction is next to the begin date of another row with the same OID, then the new row extends the episode that the other row belongs to backwards in effective time. In that case, the new row is given its own effective begin date as its episode begin date. In addition, the row it is next to, and all other rows in that other row's episode, are withdrawn and are replaced with rows whose episode begin date matches the effective begin date of the new row just inserted, whose assertion-time periods are the same as the assertion-time period of the new row, and whose effective-time periods, business keys and other business data are otherwise unchanged. The new row, and all these replacement rows, then belong to the same episode.

If the new row created by the temporal insert transaction is next to both an earlier row for the same object and a later row for the same object, then both of the "next to" conditions are satisfied, and the result is that the new row merges two previously distinct episodes into a single episode. In that case, the new row is given the episode begin date of the earlier row it is next to. Next, the later row the new row is next to, and all the other rows in that later row's episode are withdrawn and replaced, as described in the previous paragraph. All the rows in the two episodes, and the new row which has merged them, are now part of the earlier of the two episodes that have been merged by this transaction.

A temporal delete transaction always specifies an object, and has an effective-time period. If no time period is supplied with the transaction, the default time period of [Now( )-9999] is added to the transaction. Otherwise, a past, present or future effective-time period may be supplied with the transaction.

A temporal delete transaction withdraws rows from a designated period of effective time by ending the assertion-time periods of those rows within that period of effective time. It does this by changing the assertion end dates of those rows to the value of Now( ) at the time the transaction takes place. If necessary, a temporal delete transaction will withdraw a row which is partially within the designated effective-time period of the transaction, and replace the part of the row that was outside that effective-time period. This is similar to a "cut" done as part of a temporal update transaction, but whereas the cut creates two rows which together correspond to the withdrawn row, this process only creates the one row which corresponds to the part of the withdrawn row that is outside the target space of the transaction.

Rows whose effective-time periods are entirely outside the effective-time range of a delete transaction's target space are unaffected by the delete transaction. It follows that episodes, all of whose rows are entirely outside the effective-time range of a delete transaction's target space, are unaffected by the delete transaction.

Conversely, episodes, all of whose rows are entirely within the effective-time range of a delete transaction's target space, are temporally deleted. They are withdrawn by having their assertion end dates set to the value of Now( ) when the transaction is carried out.

If a row in the target table with the same OID has an effective-time period which falls partially inside the effective-time period of the temporal delete transaction and partially outside that effective-time period, then the row is withdrawn, and a replacement row is created, in current assertion time, for the part of the withdrawn row that was outside the transaction's effective-time period.

If the replacement row is for the effective-time later part of the withdrawn row, then it is the first row in a new episode, and its episode begin date is set to its own effective begin date. In addition, every effective-time later row that was part of the original episode with that withdrawn row is also withdrawn, assigned an assertion-time period of [Now( )-9999], and given the episode begin date of that first replacement row.

If the replacement row is for the effective-time earlier part of the withdrawn row, then it is the last row in the episode it still belongs to, and its episode begin date remains the same as it was before the transaction.

If the effective-time period on a temporal delete transaction begins after the effective-time period of the first row in an episode, and ends before the effective-time period of the last row in an episode, then the temporal delete transaction splits the episode into two episodes. The episode begin date for the later of the two new episodes is set to the effective-begin date of the effective-time earliest row in that new episode.

FIG. 24 shows the same contents, in an extended canonical schema temporal table, as FIG. 11 shows in a canonical schema temporal table. Note that because the two rows in the table are next to one another, they belong to the same episode. Both belong to the episode for OID 2117 which began on January 2008.

FIG. 12 showed the results of completing a temporal insert transaction against a temporal table that uses the canonical schema. FIG. 25 shows the results of completing the same temporal insert transaction against a temporal table that uses the extended canonical schema. Note that since the new row created by the insert transaction is not next to the next earlier row in effective time for that OID, the new row begins a new episode, one with an episode begin date of March 2010.

FIG. 14 showed the results of completing a temporal update transaction against a temporal table that uses the canonical schema. FIG. 26 shows the results of applying the same temporal update transaction against a temporal table that uses the extended canonical schema. Note that the result of the update did not change any episodes. As already explained, temporal updates do not and cannot alter episodes.

FIG. 16c showed the results of completing a temporal delete transaction against a temporal table that uses the canonical schema. FIG. 27 shows the results of applying the same temporal delete transaction against a temporal table that uses the extended canonical schema. As described above, this temporal delete transaction split an episode, the episode for OID 2117 which began on March 2010. Because it split the episode, it introduced a temporal gap into the episode. Consequently, the original episode ended at that temporal gap, and a new episode began immediately after that temporal gap. Now, in current assertion time, the March 2010 episode ends on June 2010, and a new episode for OID 2117 begins on November 2010.

In another scenario, the effective-time period on a temporal delete transaction may align with the effective-time periods of currently asserted rows in the target table with the same OID. In this case, all the rows within the effective-time period of the transaction are withdrawn. If the effective-time latest withdrawn row is not the effective-time last row in an episode, then the remaining rows in that episode constitute a new episode, with a new episode begin date. So all those rows are withdrawn and replaced by rows with assertion-time periods of [Now( )-9999], episode begin dates equal to the effective begin date of the effective-time earliest row in the new episode, and are otherwise identical to the withdrawn rows.

The Use of Episodes.

Episodes improve the performance of temporal referential integrity checks. This is because episodes are the parent managed objects in a temporal referential integrity relationship. In checking temporal referential integrity, the AVF-E does not need to retrieve multiple rows in the parent temporal table for the relationship. It only needs to retrieve the one row whose OID matches the temporal foreign key value of the child row for which the integrity check is being carried out, and whose effective end date is equal to or greater than the effective end date of that child row. On that one parent row, the episode begin date indicates the start of the effective-time extent during which the object referenced by the temporal foreign key is, without any temporal gaps, represented. If the effective begin date of the row for which the check is being carried out is equal to or later than that episode begin date, then the row passes the temporal referential integrity check, and otherwise does not.

In this way, by needing to retrieve only one row from the parent table, the AVF-E can carry out temporal referential integrity checks more efficiently than the AVF can, because the AVF uses the process in which the occupied space of possibly many parent rows must be consulted.

A Circa Flag.

This aspect is for an improvement on previously-described embodiments. The improvement is to substitute an approximately accurate match predicate for a range predicate.

(def) circa effective flag: the approximately accurate match predicate for effective time.

We will not provide figures to illustrate the use of the match predicate, but it constitutes a modification to the canonical schema 600. The match predicate is based on a column we call a circa effective flag. The column can take on one of two values, for example, "0" and "1".

A match predicate that will substitute, in an index, for a range predicate on effective time, cannot be guaranteed accurate at all times. For example, assuming our time periods are accurate to milliseconds, a row may have an effective-time period which will end in three milliseconds. This means that three milliseconds from now, that row will no longer be current. How is a flag to change its value at precisely that split-second moment in time?

The key insight is this. The flag doesn't have to be one-hundred percent accurate to be useful as a match predicate. We design these flags to distinguish between rows whose time periods are known to be in the past from rows whose time periods are not known to be in the past.

When the AVF creates a new row in a temporal table, the effective-time period of that row may be in the past, present or future. If it is in the past, we assign its circa effective flag a value of 0, and otherwise a value of 1.

During some maintenance processes, the AVF may create rows with an effective end date of Now( ). Whenever it does this, it will set the circa effective flag on those rows to 0, meaning that these rows are definitely known to not be currently effective rows.

A temporal transaction may create a current version or a future version of an object which has a non-9999 effective end date. Because the version is not in past effective time, the AVF will set its circa effective flag to 1. But as time goes by, future versions may become current versions, simply because of the passage of time. More to the point, current versions may become past versions, simply because of the passage of time. At the moment a current version slips into the past, its circa effective flag is incorrect. That flag will still be set to 1.

Periodically, an update statement should scan the database looking for rows with effective-time periods in the past but with circa effective flags still set to 1. For each of those rows, it will change their circa effective flag to 0. In this way, the flag will remain approximately correct as a way to distinguish non-current versions from current versions.

This means that queries looking for currently effective data should specify a circa effective flag of 1, as well as a current effective-time period. Temporal indexes that use the circa effective flag instead of an effective begin or end date will have substituted a match predicate for a range predicate. The match predicate will perform much better than the range predicate, and will start the search in the index at a node that will not have, under it, more than a small handful of rows whose effective-time periods are in the past.

Support for Deferred Assertions.

This aspect is for an improvement on previously-described embodiments. The improvement is to add to the functionality of the previous embodiments the ability to manage data which exists in future assertion time.

The improvement requires the addition of one column to the canonical schema 600. As shown in FIG. 28, that column is the row create date column 619, and the result is a new canonical schema shown as the deferred assertion canonical schema 624.

Figure 29:
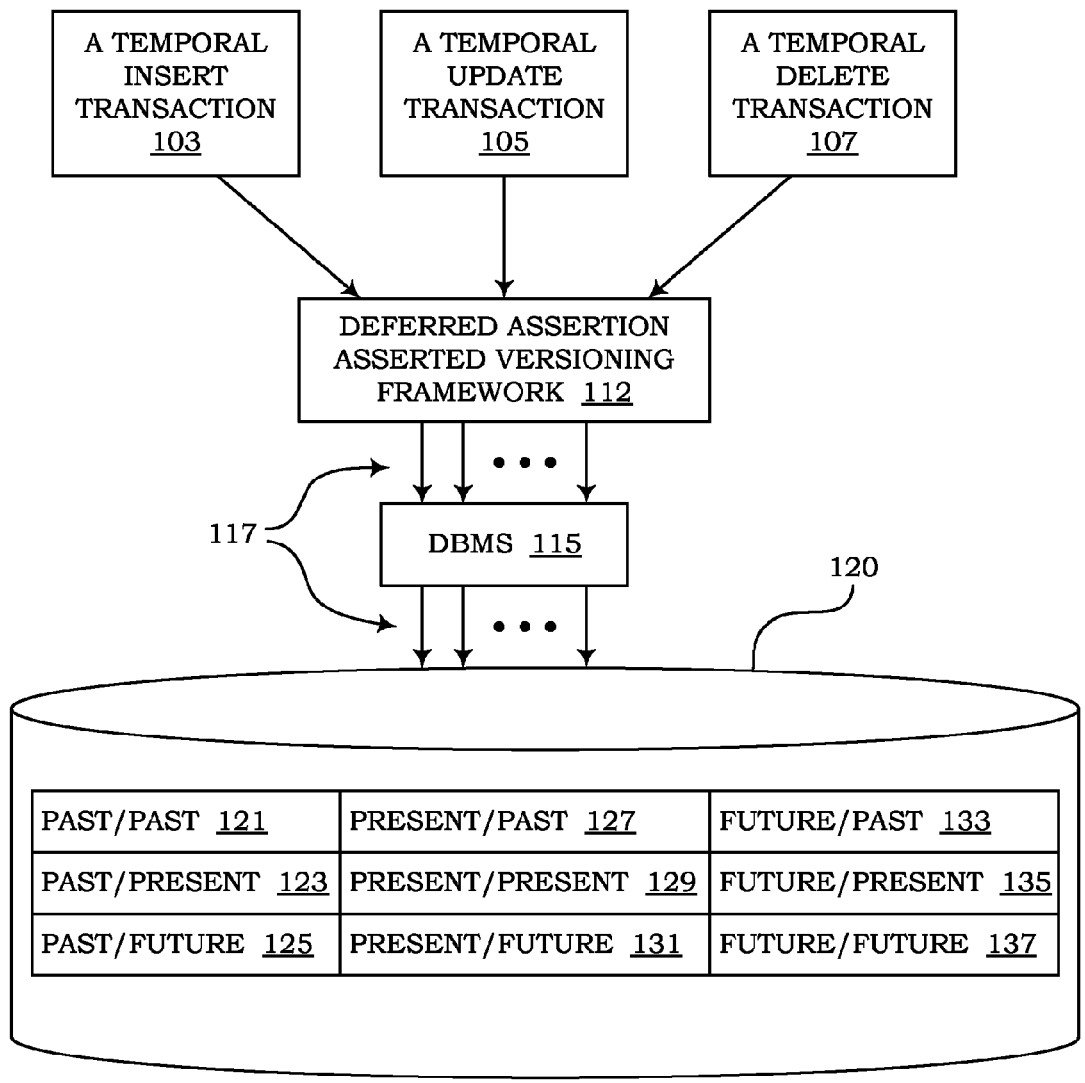
FIG. 29: the architectural context of the invention as extended to support deferred transactions and deferred assertions 133, 135 and 137, by using the deferred assertion Asserted Versioning Framework 112.

With the baseline temporal model, rows inserted into temporal tables begin to be asserted on the date they are physically inserted. This is also true of the AVF 111. With the AVF, assertion dates cannot be specified on temporal transactions, and a default assertion-time period of [Now( )-9999] is always used instead. However, with the deferred assertion Asserted Versioning Framework 112, as shown in FIG. 29, and its use of the deferred assertion canonical schema 624, temporal transactions may be submitted with an explicitly supplied future assertion begin date, and rows may be stored in deferred assertion canonical schema temporal tables 120. These rows will fall into one of three new temporal categories—as shown in FIG. 29, future/past 133, future/present 135 or future/future 137. This is because deferred assertions exist in future assertion time, and may be statements about the effective-time past, present or future of the objects represented by those assertions.

Because rows may now exist in a temporal table whose assertion begin date is not the same as the date on which those rows were physically created, we need the row create date column 619. This will always be the date on which each row is physically created. With this date, we can always recreate exactly what the contents of the table were at any point in time. This ability is the functional equivalent of a physical logfile. A parallel ability is to provide a date and to retrieve only those rows which were currently asserted on that date. This latter ability is the functional equivalent of a semantic logfile, a logfile of what the table asserted to be true at any point in time. It is because of deferred assertions that the physical logfile and semantic logfile functionalities are not identical.

(def) AVF-D: an acronym used as a shortened form of "deferred assertion Asserted Versioning Framework".

The deferred assertion canonical schema temporal table 120 is a temporal table that uses the deferred assertion canonical schema 624.

(def) deferred transaction: a temporal transaction that specifies a future assertion date.

(def) deferred assertion: a row in a deferred assertion canonical schema temporal table with a future assertion begin date.

When the AVF-D creates one or more future assertions as a result of a deferred transaction, those rows will have future assertion-time periods. Those rows will be physically part of the temporal table 120 than contains all other past, present and future assertions for the same object. As previously explained, rows with past assertion-time periods are not currently asserted to make true statements. They are merely records of statements we once asserted were true.

As for these rows with future assertion-time periods, they too are not currently asserted to make true statements. If enough time passes, and these rows are still in their tables 120, and their assertion-time periods become current because of the passage of time, then at that time they will become currently asserted. But until then, they are just a record of what we might eventually come to assert are true statements.

The Near Future and the Far Future.

Deferred transactions may specify any assertion begin date. Some transactions may be given an assertion begin date that is close enough to the present moment that the business will let the deferred assertions they create become current assertions simply by the passage of time. These deferred transactions correspond to transactions that would otherwise be collected together and applied at the end of the day, or perhaps at the end of the week. We will say that such deferred assertions exist in near future assertion time.

(def) near future assertion time: assertion-time periods that are close enough to the present moment that the authors of the deferred transactions that created them are willing to let those deferred assertions become current simply by means of the passage of time.

Other transactions may be given an assertion begin date that is in the distant future, for example, a date several decades from now. The reason for doing this is to avoid the possibility that these assertions might become current if they are ignored or forgotten for long enough. Consequently, these are assertions that will not become current, in any timeframe meaningful to a business, unless explicit action is taken to move them closer in assertion time to the present moment. We will say that such deferred assertions exist in far future assertion time.

(def) far future assertion time: assertion-time periods that are far enough away from the present moment that they will not become current assertions unless or until explicit action is taken to change their assertion time periods to time periods in near future assertion time.

The Business Value of Future Assertions.

One way of looking at rows with future assertion-time periods is to consider a temporal database which does not manage such rows. This might be a temporal database of canonical schema temporal tables 119, managed by the AVF 111. Or it might be a temporal database from the prior art, such as one managed by Oracle 11 g and its Workspace Manager.

With such databases, as with conventional databases, we often write transactions that we do not intend to apply to the database right away. Sometimes we intend to apply these transactions in the near future, perhaps at the end of the business day. The collections of these "near future" transactions are often called "batch transaction datasets" or "batch tables". But until they are submitted to the DBMS and applied to their target tables, the rows they contain are statements which are not yet currently asserted in our databases.

With the AVF-D and its deferred assertions, those transactions can be applied right away, and will not become currently asserted until the assertion begin date associated with them becomes current. By this means, this invention eliminates the need to manage external datasets which are collections of written but not-yet applied transactions. It avoids potential bottlenecks that might otherwise be encountered when a very large number of transactions, residing in such external datasets, must be added to the database at the same time.

At other times, we write transactions that we do not intend to apply to the database until a substantial amount of time has passed, for example weeks or months. We keep this data in a collection of tables separate from production databases. Sometimes we call these separate collections of data a "sandbox" area. When we use this term, our intention is usually to "play around" with the data, perhaps to try to develop a new bill of materials for an improved version of a product. If we are successful, and our work is approved, we will then move the data from the sandbox into the production bill of materials table.

But with the AVF-D and its deferred assertions, that "sandbox" bill of materials can exist alongside the "real" bills of materials in the production bill of materials table. By this means, this invention eliminates the need to manage sandboxes of data.

There is another reason we write transactions that we do not intend to apply to the database until a substantial amount of time has passed. It is to accumulate a collection of data from multiple sources. When the first components of the data we need arrive, we start to build the transactions that we will eventually apply to the database. But additional components are needed before those transactions are complete. Eventually, when all the components have arrived, and when all have been combined into complete insert, update and delete transactions, we can apply those transactions to the production database.

In such cases, we do not tend to call the physical datasets in which we accumulate and build our transactions "sandboxes" or "batch transaction tables". More commonly, we call them "staging areas" or "pending tables", places where we get ready for going to production.

But regardless of what we call them, these are all physical objects external to the database tables that they will, unless discarded, eventually update. In all these cases, the AVF-D eliminates the need to manage these external physical objects by permitting us to store batched transactions, sandbox data and staging area data in the same tables as the production data we currently assert as data which makes true statements about the objects represented in those tables. In eliminating these external datasets, this invention eliminates the cost of managing them, the latency involved in getting approved data from them into production tables, and the bottlenecks that may arise when large volumes of such data are approved all at once.

Managing Deferred Transactions and Deferred Assertions.

The series of steps by which the AVF-D manages temporal transactions, and the data in extended canonical schema tables which result from those transactions, is the same series of steps by which the AVF manages temporal transactions, and the data in standard canonical schema tables which result from those transactions, except that the AVF-D manages temporal transactions that may specify future assertion-time periods, and also manages the future assertions, called "deferred assertions", that result from them.

A Deferred Insert Transaction.

Step 701.

This step is identical to the step 701 which the AVF carries out when processing a temporal insert transaction, except that for the AVF-D, an assertion date may be specified on the transaction. If it is, the AVF-D checks that it is a future date.

We again emphasize that, although dates are being used to provide examples for this patent application, in another embodiment these dates might be timestamps or any other datatype that expresses points in time.

Steps 703 and 705.

These steps are identical to the steps 703 and 705 which the AVF carries out when processing a temporal insert transaction, except that the AVF-D will accept a future assertion begin date specified on the transaction. If one is supplied, it will assign the transaction the assertion-time period with that date as its begin date, and 9999 as its end date. Otherwise, the AVF-D will assign the transaction a [Now( )-9999] assertion-time period.

Step 707.

This step is identical to the step 707 which the AVF carries out when processing a temporal insert transaction.

Both the AVF 111 and the AVF-D 112 search a two-dimensional target space, and compare two-dimensional occupied spaces to that target space. And for both of them, the target space always extends, along its assertion-time axis, to 9999, the latest point in time the DBMS can represent. For the AVF, the target space always begins, along its assertion-time axis, at Now( ) i.e. at the moment in time at which the transaction is being processed. But for the AVF-D, when an assertion begin date is supplied on a transaction, the target space will begin, along its assertion-time axis, at some future point in time. However, for both the AVF and the AVF-D, the target space always begins, along its assertion-time axis, at the point in time specified by the assertion begin date of the transaction.

In a temporal database whose temporal tables are canonical schema temporal tables 119, there will be no occupied spaces that begin, along their assertion-time axis, in the future. But in a temporal table whose temporal tables are deferred assertion canonical tables 120, there may be rows whose occupied spaces begin, along their assertion-time axis, in the future.

Nonetheless, a target space is a target space, and an occupied space is an occupied space. And so the means by which the AVF 111 matches occupied spaces to target spaces is the same means by which the AVF-D 112 matches occupied spaces to target spaces.

Step 709.

This step is identical to the step 709 which the AVF carries out when processing a temporal insert transaction.

Step 713.

This step is identical to the step 713 which the AVF carries out when processing a temporal insert transaction.

FIG. 30*b* shows a temporal Policy table which is a deferred assertion canonical schema temporal table 120. It contains two rows, both describing insurance policy P861. The values of Now( ) for the transactions that created each row are shown in the row create dates.

Note that if these rows were contained in a canonical schema temporal table 119, there would be no row create date, and no need for one. Because of the rules by which the AVF 111 processes temporal transactions, the assertion begin date of all rows in tables 119 is the date on which those rows are physically created. But as the second row shown in FIG. 30 illustrates, in tables 120, the AVF-D may create rows whose assertion begin dates are later than the dates on which those rows are physically created.

The first row shown in FIG. 30*a* began to assert, on June 2008, that from that date up to February 2012, our company had a client C457 whose name was Jones. The second row shown in FIG. 30*a* asserts nothing at all when it is first created. But if it is not updated or deleted, then beginning on March 2012, it will become a current assertion on that date, stating that client C457, whose name is Jones, is re-instated beginning on September 2012, and will remain in effect until further notice.

The first row shown in FIG. 30*b* began to assert, on January 2011, that throughout 2011, policy P861 is an HMO policy with a thirty-dollar copay amount. The temporal referential integrity constraint for this row is satisfied by the first row shown in FIG. 30*a*.

The second row shown in FIG. 30*b* asserts nothing at all when it is first created. But if it is not updated or deleted, then beginning on July 2012, it will become a current assertion stating that throughout 2013, the policy will be a PPO policy with a fifty-dollar copay amount. The temporal referential integrity constraint for this row is satisfied by the second row shown in FIG. 30*a*.

A Deferred Update Transaction.

Steps 701, 703 and 705.

These steps are identical to the steps 701, 703 and 705 which the AVF carries out when processing a temporal update transaction, except that for the AVF-D, an assertion begin date may be specified on the transaction. If it is, the AVF-D checks that it is a future date.

Steps 707 and 709.

These steps are identical to the steps 707 and 709 which the AVF carries out when processing a temporal update transaction.

Step 713.

This step is identical to the step 709 which the AVF carries out when processing a temporal update transaction. It is interesting to note, however, that one of the ways in which a TRI check can fail in a temporal database managed by the AVF-D and consisting of deferred assertion canonical schema temporal tables 120 is not possible in a temporal database managed by the AVF and consisting of canonical schema temporal tables 119. For when deferred assertions may exist in temporal tables, it is possible that a TRI check will fail because the parent occupied space begins at a later point along the assertion-time axis than does the target space of the transaction. In other words, in such a situation, there may be a set of rows with an OID that matches the TFK on a transaction, and whose effective-time periods fully include the effective-time period on the transaction, but a set of rows at least one of which will not have an assertion begin date equal to or earlier than the assertion begin date of the transaction.

Step 753.

This step is identical to the step 753 which the AVF carries out when processing a temporal update transaction. But there is an interesting point of difference in the data that is managed.

Using the AVF 111, to withdraw a row is to change its assertion end date to Now( ), i.e. to the point in time at which the transaction is being processed. Semantically, this means that from Now( ) on, the withdrawn row will no longer be asserted as making a true statement about the object it represents.

However, using the AVF-D 112, to withdraw a row is to change its assertion end date to the assertion begin date specified on the transaction. Since, if specified, that date is a future date, this means that until that future date becomes current, the withdrawn row will remain currently asserted. It will retain its status as a row which we claim is making a true statement.

But in spite of this difference, the AVF and the AVF-D use the same process to withdraw a row. In both cases, the assertion begin date specified on the temporal transaction is used as the assertion end date for the withdrawal.

A temporal update, whether deferred or not, will always result in the AVF-D changing the assertion end date of the row or rows within the target space of the transaction to the assertion begin date of the transaction. When a temporal update is not a deferred transaction, that assertion date is the value of Now( ). And so as soon as the transaction is complete, the row or rows so updated will have been withdrawn into past assertion time.

But when a temporal update is a deferred transaction, that assertion date is a future date. And so as soon as the transaction is complete, the row or rows so updated will remain in current assertion time, but will be in an assertion-time period with a definite non-9999 end date.

(def) closed assertion-time period: an assertion-time period with a non-9999 end date.

Just as rows with past assertion-time periods cannot be the target of temporal update or temporal delete transactions, the AVF-D will manage all other rows with closed assertion-time periods in the same way. We will say that all rows with closed assertion-time periods are locked from transactions with an earlier transaction assertion date.

(def) locked: a row in a temporal table is locked if and only if it cannot be the target of any temporal transaction.

When the target of a deferred update transaction is a row in current assertion time, the result of the transaction is that the target row takes on a locked current assertion-time period. But a deferred update transaction may have as a target another deferred assertion. When it does, the result of the transaction is that the target row takes on a locked future assertion-time period.

It follows as a corollary that temporal update and delete transactions, whether or not deferred, can only have unlocked rows as their targets.

It is necessary to lock rows with closed current assertion-time periods and closed future assertion-time periods because this locking is a serialization mechanism. Conventional update or delete transactions are applied to the state of the database current when those transactions are applied. Non-deferred temporal update or delete transactions are also applied to the state of the database current when those transactions are applied.

But deferred temporal update or delete transactions leave their target rows in either current or future assertion time. And so if those target rows could, by means of later transactions, be again temporally updated or be temporally deleted, that would alter the state of the database to which those original deferred transactions were applied. But because the semantic validity of update and delete transactions depends on the state of the database to which they are applied, that cannot be allowed to happen. The way the AVF-D prevents that from happening is by means of the non-9999 assertion end date on all rows temporally updated or temporally deleted by means of deferred transactions, which the AVF-D interprets as functionally equivalent to a lock on those rows.

Steps 755 757, 759, 761 and 763.

These steps are identical to the steps 755, 757, 759, 761 and 763 which the AVF carries out when processing a temporal update transaction, keeping in mind that while the assertion begin date on a temporal transaction submitted to the AVF 111 is always Now( ) the assertion begin date on a temporal transaction submitted to the AVF-D 112 may be either Now( ) or some future point of time.

As already noted, all the physical updates and physical inserts required to complete a temporal update transaction are managed by the AVF-D as an atomic and isolated unit of work. If any of those physical transactions fails, the AVF-D will direct the DBMS to undo any earlier physical transactions that are part of that unit of work.

FIG. 31 shows the results of applying a deferred temporal update transaction, on May 2012, to the policy data shown in FIG. 30b. The transaction specified that, starting on September 2012, the database should assert that during the first half of 2013, policy P861 will have a copay amount of forty-dollars, and that during the second half of 2013, it will have a copay amount of fifty-dollars.

Until September 2012, the database will continue to assert that the policy will have a copay amount of fifty-dollars throughout 2013. And starting on May 2012, the second row shown in FIG. 31 is locked, and cannot be the target of any other temporal insert or temporal delete transaction.

No other rows in the target table were wholly or partially within the target space of the transaction, and so the transaction was complete at that point in time. The atomic and isolated unit of work was complete, and all DBMS locks used in the process were released.

Moving Assertions Around in Future Assertion Time.

In most cases, deferred assertions are moved from a far future to a near future period of assertion time. Doing this will reflect a business decision in which rows in far future assertion time have been reviewed, and a decision has been made to assert them. By bringing them into near future assertion time, a possibly large and inter-related group of such rows will then all become currently asserted at the same moment in time.

FIG. 32a shows the same data as that shown in FIG. 30b, but with the assertion date for the 2013 effective time year changed to 2090, a far future assertion date. FIG. 32b shows a deferred update to the 2013 effective time year, which is the same update as that made in near future assertion time and shown as FIG. 31. As with the near future update, this one also locks the row it is updating by setting that row's assertion end date to the same value as its own assertion begin date. In this example, that value is the far future date 2093.

FIG. 32c shows the results of moving the unlocked far future deferred assertions into near future assertion time. The third and fourth rows in FIG. 32b were the only unlocked deferred assertions. FIG. 32c shows those rows moved into near future assertion time by having their assertion begin dates physically updated from July 2093 to June 2012.

The physical update does destroy the information that when, originally entered, these rows were given an assertion begin date of 2093. In this embodiment of the management of deferred assertions, our design philosophy is that until deferred assertions become current assertions, they do not represent any statements that the business has committed itself to. For that reason, we do not believe that it is important to preserve such changes made to never yet made assertions.

If no changes were made to the second row in FIG. 32c, then, in one embodiment, that row would remain with an assertion time period of [Jul90-Jul93]. In that case, some eighty years from now, that row would, contrary to all intentions and expectations, become currently asserted. Also, the third and fourth rows, having been moved to the [Jun12-9999] assertion time period, also exist in the [Jul90-Jul93] assertion time period. Those two rows are rows for policy P861 for the 2013 effective-time period. But the second row is also a row representing the 2013 effective-time period of the same policy, and so if no changes were made to that row, the result would be a TEI conflict.

For this reason, the AVF-D must either remove the second row from assertion time so that there is no TEI conflict, or else block the move. If the move is blocked, then the AVF-D will return an error message. In that case, before the third and fourth rows could be moved, the second row would have to be removed from its earlier assertion time period. If the move is not blocked, then the move will "cross over" the second row, thereby introducing the third and fourth rows into the assertion period of the second row, creating a TEI conflict. To avoid the conflict, whenever such a move does "cross over" another deferred assertion for the same object in the same or in overlapping effective-time periods, the row or rows "crossed over" will have their assertion end dates set to the near future assertion time which is also being used as the assertion begin dates of the rows doing the "crossing over". The result is always to place the "crossed over" rows into negative assertion time.

In this example, when the third and fourth rows have been moved by being given a June 2012 assertion begin date, the second row is placed into "negative assertion time" by being given that same date as its assertion end date. That second row then exists in the assertion-time period of [Jul90-Jun12], i.e. in no assertion-time period at all. The TEI conflict has been avoided.

(def) negative assertion-time period: an assertion-time period whose end date is earlier than its begin date, created in the process of moving later deferred assertions for the same object and effective-time period "across" the assertion-time period of the row. This row could be deleted.

In the example just reviewed, we chose to currently assert the statements that policy P861 had a forty-dollar copay in the first half of 2013, and a fifty-dollar copay in the second half of the year. But the earlier deferred assertion stated that P861 had a fifty-dollar copay throughout all of 2013. If the business had decided to make that assertion represented by the second row current, rather than the assertions made by the third and fourth rows, how would that have been done?

In one embodiment of the AVF-D, nothing would have been done. The later deferred assertions would remain unaffected. In another embodiment, the same process would be used. In that case, the result would be the table shown in FIG. 32*d*. The second row would become currently asserted, and the third and fourth rows would be moved into negative assertion time.

Finally, we note that throughout the management of these far future deferred assertions, TRI constraints have remained satisfied. As FIG. 30*a* shows, the client referenced by the TFK of these policy rows was asserted to exist throughout the 2013 effective-time period, starting on March 2012.

A Circa Flag.

This aspect is for an improvement on previous embodiments. The improvement is to substitute an approximately accurate match predicate for a range predicate.

(def) circa assertion flag: the approximately accurate match predicate for assertion time.

We will not provide figures to illustrate the use of the match predicate, but it constitutes a modification to the deferred assertion canonical schema 624. The match predicate is based on a column we call a circa assertion flag. The column can take on one of two values, e.g. "0" and "1".

The circa assertion flag works for assertion time exactly like the circa effective flag works for effective time. It is used with the deferred assertion canonical schema 624 because it is only when deferred assertions may exist in a temporal table that we can have assertions in future time which may, because of the passage of time, become past assertions, and assertions in current time which have a non-9999 assertion end date and therefore may become past assertions. This is the precise situation that parallels the process in which a row currently in effect may, because of the passage of time, become a row in past effective time. In both cases, a periodic update process must scan the database, and correct the circa flags. In addition, the AVF can update the circa flag whenever an assertion end date is set to Now( ). In both cases, specifying the circa flag as well as the time period in a query will allow indexes that use the circa flag instead of the time period to perform a more efficient search of their index trees.

The present disclosure provides:
(1) a computer program product embedded in a computer readable medium for implementing a temporal database supporting valid time data, transaction time data, and bi-temporal data, wherein the improvement comprises:
  (1.1) a means for storing temporal data as rows in temporal tables in the temporal database, the tables all using the same canonical schema, the canonical schema comprising, in any order,
    (1.1.1) at least one surrogate-valued column which, in each row in a temporal table, designates the object identifier of the object which the row represents,
    (1.1.2) at least one time-valued column which, in each row in a temporal table, designates an effective-time period which indicates, if the effective-time period ended prior to the present moment, a period of time in the past during which the object represented by the row existed in the state described by the atemporal data in that row, and which indicates, if the effective-time period contains the present moment, a current period of time during which the object represented by the row exists in the state described by the atemporal data in that row, and which indicates, if the effective-time period begins after the present moment, a period of time in the future during which the object represented by the row will exist in the state described by the atemporal data in that row,
    (1.1.3) at least one time-valued column which, in each row in a temporal table, designates an assertion-time period which indicates, if the assertion-time period ended prior to the present moment, a period of time in the past during which the row was asserted to make a true statement about the object which it represents, as that object existed, exists or will exist during the effective-time period designated by that row, and which indicates, if the assertion-time period contains the present moment, a current period of time during which the row is asserted to make a true statement about the object which it represents, as that object existed, exists or will exist during the effective-time period designated by that row,
    (1.1.4) a business key comprising at least one column which, in each row in the temporal table, designates a unique identifier of the object which the row represents, the at least one column being identical to the at least one column of the primary key of an otherwise identical non-temporal table;
- (1.1.5) for each temporal referential integrity relationship between a child temporal table and a parent temporal table, a temporal foreign key comprising at least one column in the child temporal table which, in each row in the child temporal table, contains the OID value of at least one row in the parent temporal table;
- (1.2) a means for storing additional data in a temporal table, the additional data comprising zero, one or more business data columns such that each of the one or more business data columns in each row in the temporal table contains data which describes the state of the object represented by the row in which each of the one or more business data columns occurs;
- (1.3) a means for applying temporal insert, temporal update, and temporal delete transactions against the temporal database by storing the temporal data resulting from the temporal insert, the temporal update, and the temporal delete transactions as rows in one or more of the temporal tables contained in the temporal database;
- (1.4) a means for ensuring that the constraint of temporal entity integrity is enforced during the process of applying the temporal insert transactions, the temporal update transactions and the temporal delete transactions to the temporal database;
- (1.5) a means for ensuring that the constraint of temporal referential integrity is enforced during the process of applying the temporal insert transactions, the temporal update transactions and the temporal delete transactions to the temporal database;
- (1.6) whereby
  - (1.6.1) each statement about an object made by a row with an assertion-time period in the past and an effective-time period in the past, and
  - (1.6.2) each statement about an object made by a row with an assertion-time period in the past and an effective-time period in the present, and
  - (1.6.3) each statement about an object made by a row with an assertion-time period in the past and an effective-time period in the future, and
  - (1.6.4) each statement about an object made by a row with an assertion-time period in the present and an effective-time period in the past, and
  - (1.6.5) each statement about an object made by a row with an assertion-time period in the present and an effective-time period in the present, and
  - (1.6.6) each statement about an object made by a row with an assertion-time period in the present and an effective-time period in the future, is represented by one row in the same temporal table that contains all other rows making statements about the same object;
- (1.7) whereby the value of time-critical access to the statements about an object made by rows in the temporal database is maximized because SQL queries or other code which retrieve rows making the statements from the temporal database will have immediate access to the complete set of all the statements about the object without the need for technical personnel to assemble or otherwise pre-process sets of the rows making those statements from subsets of rows making those statements residing in multiple tables, or from subsets of rows making those statements residing in other datasets constituting logical or physical partitions of the temporal data.

The present disclosure further provides:
- (2) The computer program product of (1) above wherein a means for retrieving data from the temporal database comprises a view of a temporal table which includes the effective-time periods of the rows selected, but whose contents are restricted to rows which were asserted at some past point in time, or which are asserted at the current moment in time;
- (2.1) whereby business users may seem to be viewing uni-temporal version tables as the data in those tables existed at any specified point in time.

The present disclosure further provides:
- (3) The computer program product of (1) above wherein a means for retrieving data from the temporal database comprises a view of a temporal table which includes the assertion-time periods of the rows selected, but whose contents are restricted to rows which were, are, or will be currently in effect at a specified point in effective time,
- (3.1) whereby business users may seem to be viewing a semantic logfile of all modifications made to data which describes objects as those objects existed, exist, or will exist at some specified past, present, or future point in effective time.

The present disclosure further provides:
- (4) The computer program product of (1) above wherein a means for retrieving data from a temporal table comprises a view in which the view may have the same name as the corresponding otherwise identical non-temporal table, the columns are all and only those columns appearing on the otherwise identical non-temporal table, the columns being identical in name to the columns on the otherwise identical non-temporal table, and the content of the view dynamically changing so that, at all times, the content includes all and only those rows with current assertion-time periods and with current effective-time periods;
- (4.1) whereby temporal upward compatibility for all queries written against an earlier otherwise identical non-temporal table is supported, the temporal upward compatibility insuring that all the queries will produce the same result sets when run against the temporal table as they would have produced if they had been run against the otherwise identical non-temporal table; and.
- (4.2) whereby the program can have the ability to write SQL to retrieve data as of any given assertion point-in-time and any given effective point-in-time, and only retrieve no more than one row per object that was asserted and effective at those two points in time, those two points in time not necessarily different.

The present disclosure further provides:
- (5) The computer program product of (1) above wherein a means for creating temporal tables comprises, in any order:
- (5.1) a preliminary data model;
- (5.2) a first set of metadata which comprises a means for identifying one or more precursor tables in a preliminary data model, the first set of metadata comprising, for each identified precursor table, the name of the temporal table for which the precursor table is an otherwise identical non-temporal table;
- (5.3) a second set of metadata which comprises a means for identifying, for each temporal table generated from a precursor table designated in the first set of metadata, each temporal referential integrity relationship in which that temporal table is a child temporal table, and which comprises, for each of the temporal referential integrity relationships, in any order,
- (5.3.1) a means for identifying the at least one column which is the temporal foreign key which expresses that temporal referential integrity relationship,
- (5.3.2) a means for identifying the temporal table which is the parent temporal table for that temporal foreign key, the parent temporal table and the child temporal table not necessarily distinct,
- (5.3.3) a means for designating whether the temporal foreign key is optional or required, and
- (5.3.4) a means for designating whether a temporal delete transaction applied to one or more rows in the parent temporal table should be, if there are one or more rows in the child temporal table which are temporal referential integrity-related to the one or more rows in the parent temporal table about to be deleted and which are within the target space of that temporal delete transaction,
  - (5.3.4.1) restricted, or
  - (5.3.4.2) processed so that the temporal foreign key in the rows in the child temporal table which are temporal referential integrity-related to the one or more rows in the parent temporal table about to be deleted and which are within the target space of that temporal delete transaction are set null, or
  - (5.3.4.3) processed so that the temporal delete transaction is cascaded to the rows in the child temporal table which are temporal referential integrity-related to the one or more rows in the parent temporal table about to be deleted and which are within the target space of that temporal delete transaction, the cascade to apply recursively;
- (5.4) a third set of metadata which comprises a means for identifying, for each temporal table corresponding to a precursor table identified by the first set of metadata, the columns which comprise the business key of the temporal table, the columns having the same datatype and corresponding, one-for-one and in sequence, to the columns comprising the primary key of the corresponding precursor table;
- (5.5) a fourth set of metadata which comprises a means for defining a one-to-one correspondence between the at least one column which comprises a foreign key in a precursor table and the at least one column which comprises the corresponding temporal foreign key in the corresponding temporal table;
- (5.6) a means for generating the temporal database from the preliminary data model and the sets of metadata such that for each precursor table which is identified by the first set of metadata, the table generated in the temporal database is a temporal table for which the precursor table from which it has been generated is an otherwise identical non-temporal table;
- (5.7) whereby the extensive costs of expressing temporal data requirements in most data models are avoided; and
- (5.8) whereby no changes are required to the data models of databases some or all of whose tables are converted into temporal tables.

The present disclosure further provides:
(6) The computer program product of (1) above wherein a means for raising the level of abstraction at which temporal data is managed comprises:
- (6.1) a means for designating, on every row in a temporal table, the earliest point in effective time which that row shares with a set of other rows representing the same object in the assertion-time period shared with that row, such that the effective-time periods of the rows in that set constitute an unbroken series of points in effective time;
- (6.2) whereby in determining whether the constraint of temporal referential integrity will be satisfied by a temporal transaction, the invention can determine an unbroken extent of effective-time within the assertion-time period of any row, the unbroken extent of effective-time beginning with the first point in the unbroken series of points in effective time of the rows in the set, and in which that unbroken extent of effective time ends with the last point in the effective-time period of the row;
- (6.3) whereby the performance of the process by which temporal referential integrity is enforced is enhanced.

The present disclosure further provides:
(7) The computer program product of (1) above wherein a means for improving the performance of queries which utilize a temporal index and which request rows of data which exist in current effective time comprises:
- (7.1) a match predicate added to the temporal index, the match predicate having, for each row in the temporal table, one of two values, one of the two values indicating that the row is definitely known to have an effective-time period which is in the past, and the other of the two values indicating that the row is not definitely known to have an effective-time period which is in the past;
- (7.2) whereby the value of the temporal index to speed up the retrieval of rows of data which have an effective-time period which contains the present moment is enhanced by filtering out known past rows when looking for current rows, in comparison to otherwise identical indexes which employ one or more columns of data which can only be used as range predicates.

The present disclosure further provides:
(8) The computer program product of (1) above wherein a means for creating and maintaining rows in temporal tables which have assertion-time periods in the future comprises:
- (8.1) a means for applying deferred temporal insert, deferred temporal update, and deferred temporal delete transactions against the temporal database by storing the temporal data resulting from the deferred temporal insert, the deferred temporal update, and the deferred temporal delete transactions as deferred assertions in one or more of the temporal tables contained in the temporal database, the deferred assertions having an assertion begin date equal to a future point in assertion time specified on the deferred temporal transaction;
- (8.2) a means for extending the constraints of temporal entity integrity and temporal referential integrity to apply to temporal data existing in future assertion time;
- (8.3) a means for moving deferred assertions nearer in assertion time to the present moment;
- (8.4) a means for moving deferred assertions farther in assertion time from the present moment;
- (8.5) whereby the deferred assertions are rows of data which will not be claimed to make a true statement unless and until their assertion-time periods becomes current;
- (8.6) whereby collections of maintenance transactions waiting to be applied to the temporal database are eliminated, the collections of maintenance transactions including queues managed by asynchronous transaction processing software and also queues which will be released for processing by the DBMS by means of human intervention, the latter queues often called "batch transaction files" or "batch transaction tables"; and (8.7) whereby work-in-progress modifications to one or more sets of assertions in a temporal table, such work-in-progress modifications commonly said to occur in a "staging area" or a "sandbox", are contained in the same physical table as production data and the same physical table that contains all other non-deferred categories of temporal data. The present disclosure further provides:

(9) The computer program product of (8) above wherein a means for improving the performance of queries which utilize a temporal index and which request rows of data which exist in current assertion time comprises:

(9.1) a match predicate added to the temporal index, the match predicate having, for each row in the temporal table, one of two values, one of the two values indicating that the row is definitely known to have an assertion-time period which is in the past, and the other of the two values indicating that the row not definitely known to have an assertion-time period which is in the past;

(9.2) whereby the value of the temporal index to speed up the retrieval of rows of data which have an assertion-time period which contains the present moment is enhanced by filtering out known past rows when looking for current rows, in comparison to otherwise identical indexes which employ one or more columns of data which can only be used as range predicates.

Overview

Two foundational elements of the systems and methods described herein are the use of canonical schemas and the use of temporal metadata.

In some embodiments, canonical schemas may restrict object identifiers to surrogate-valued single columns. But in other embodiments, object identifiers in canonical schemas may comprise multiple columns, some or all of which do not use surrogate values.

In some embodiments, canonical schemas may express time periods by means of one column to indicate the first clock tick in a time period (or the first clock tick before the beginning of the time period), and a second column to indicate the last clock tick in a time period (or the next clock tick after that last clock tick). But in other embodiments, time periods may be represented by single columns which use time period datatypes recently made available by some DBMS vendors. Here, a clock tick is referenced as a measurement of time, but any other suitable measurements of time may also be used.

In some embodiments, canonical schemas may use as primary keys the combination of an object identifier, an effective-time period and an assertion-time period. But in other embodiments, object identifiers and time periods may be retained as non-primary key data, and primary keys may be created from one or more other columns that uniquely identify each row.

In some embodiments, canonical schemas are used as the schemas for tables. In these embodiments, the tables which use canonical schemas are canonical tables. In other embodiments, canonical schemas are used as the schemas for the physical files which persist the data in tables. In these embodiments, the physical files are canonical files, and the tables whose data is persisted in canonical files are canonically-supported tables.

One use of temporal metadata is to generate temporal tables from precursor tables. In one embodiment of the systems and methods described herein, the precursor tables are restricted to being non-temporal tables, and the generated temporal tables are restricted to being canonical tables.

In another embodiment, described below, the precursor tables may also be uni-temporal tables or bitemporal tables, and the generated tables may also be non-canonical tables. If the precursor tables are uni-temporal tables, they may be either uni-temporal assertion-time tables, or uni-temporal effective-time tables, both defined above. We note that above, uni-temporal effective-time tables are called "uni-temporal version tables". If the generated tables are non-canonical tables, they may be uni-temporal tables or bitemporal tables.

A second use of temporal metadata is to manage temporal tables. By using canonical tables as these temporal tables, all the transactions and queries which appear to update and retrieve data from non-temporal tables, uni-temporal tables, or bitemporal tables, can be managed with the same set of code, thus consolidating and simplifying the codebase used to manage these types of tables, whether that codebase be internal to or external to a DBMS.

Specifically, by using canonical schemas, entity integrity can be supported as a special case of temporal entity integrity, referential integrity can be supported as a special case of temporal referential integrity, and the otherwise serious "impedance mismatch" problems of managing referential relationships between different kinds of tables, may thus be significantly reduced or eliminated.

A third use of temporal metadata is to control the user interface at which insert, update, and delete transactions are submitted, and at which queries to retrieve data are also submitted. In a preferred embodiment, the user interface is controlled, for queries, by presenting at that interface, the tables which, in one embodiment, constitute 303 otherwise identical non-temporal tables, or 305 otherwise identical tables. These 303 and 305 tables, in many embodiments, are created and managed as views defined by means of CREATE VIEW statements or similar DDL ("Data Definition Language"). 305 otherwise identical tables are a proper superset of 303 otherwise identical non-temporal tables because 303 otherwise identical tables may or may not be non-temporal tables.

In a preferred embodiment, the user interface is controlled, for maintenance transactions, by the use of Instead Of Trigger SQL, which allows the user to write transactions against 303 or 305 tables, and which then translates that SQL into physical transactions against the canonical tables corresponding to the 303 or 305 tables.

We note that a physical transaction was defined, above, as "a SQL insert, update or delete transaction which the AVF submits to a DBMS". Hereinafter, we generalize the term "physical transaction" to mean "a SQL insert, update or delete transaction which the systems and methods described herein submit to a DBMS".

By controlling the user interface in this manner, for both maintenance transactions and for queries, the systems and methods described herein provide full temporal upward compatibility for any and all maintenance transactions and queries written against precursor tables.

In another embodiment, as explained below, temporal tables do not use canonical schemas. Instead, their data is persisted in physical structures called "canonical files". In this embodiment, the user interface is controlled by providing canonical support, by means of these canonical files, to tables which are schema-isomorphic and content-isomorphic to the precursor tables from which they are generated.

Two tables (either or both of which may be a view) are schema-isomorphic if and only if they have (i) the same table/view name, (ii) the same identically-named and identically-defined columns, (iii) the same columns comprising their respective primary keys, and (iv) the same columns comprising their respective foreign keys. Thus, 303 and 305 otherwise identical tables are schema-isomorphic to the precursor tables of the canonical tables for which they are otherwise identical tables.

Two tables (either or both of which may be a view) are content-isomorphic if and only if at each moment in time, they contain (i) all and only the same rows, (ii) all and only the same columns, and (iii) identical values in corresponding columns of corresponding rows.

In another aspect of this embodiment, the generated tables may not be simply isomorphic to, but may be actually physically identical to, their precursor tables. As will be apparent to one skilled in the art, this aspect of this embodiment supports the implementation of full bitemporal functionality on all tables in a database without altering those tables in any way. Temporal upward compatibility, in this aspect of this embodiment, is automatically provided because, at the level of DBMS tables, transactions against them, and queries against them, nothing has changed.

Additional metadata not included in embodiments described herein include: (i) column sequence; (ii) column datatype, length, scale, default values, and nullability options; (iii) code-page (e.g. 437-ASCII, 037-EBCIDIC); (iv) metadata for non-unique indexes; and (v) other table or column constraints such as the level of temporal granularity at which time periods are defined, and domain constraints such as (enforce WEEK_NBR [smallint] must be between 1 and 52).

It will be apparent to one skilled in the art how this additional metadata may be added to the temporal metadata defined in tables 511, 513, 515, 517, 519, 521, 523 and 525.

A Temporal Metadata Model

Figure 48:
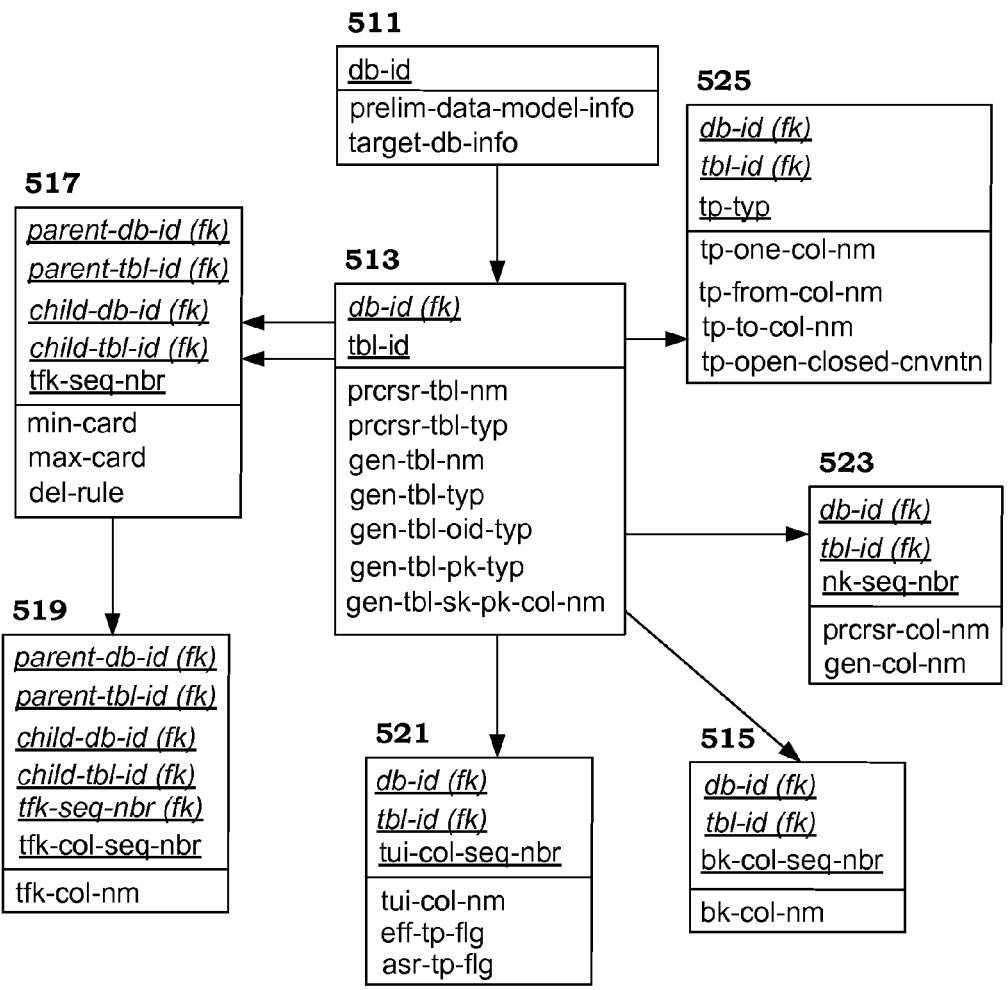
FIG. 48: a logical data model of the metadata tables which are used to map precursor tables onto generated tables. This set of tables replaces the metadata tables 501, 503, 505 and 507 shown in FIGS. 4, 5, 6 and 7. These metadata tables constitute another and more extensive embodiment of temporal metadata.

FIG. 48 is a logical data model of the temporal metadata tables 511-525. In this logical data model, each box represents a 904 entity/table (an "entity" in a logical data model, a "table" in a physical data model or database). The embodiments which this temporal metadata is a part of support (i) the use of temporal as well as non-temporal tables as precursor tables; (ii) the generation of non-canonical temporal tables as well as canonical tables; (iii) the use of multi-column object identifiers whose columns are not necessarily restricted to surrogate values; (iv) the use of single columns with a time period datatype to represent time periods; and (v) the use of primary keys which do not contain object identifiers or time periods.

The name above each box in FIG. 48 is the name of the entity and will, unless overridden, become the name of the table created from it. Primary key columns are shown inside each box and above the line internal to each box, and are underlined. Foreign key columns have an "(fk)" tag, and are italicized. Names below the line internal to each box each represent a non-primary-key column of the entity/table.

Relationships are shown by arrows from a parent table to a child table. All relationship are one-to-many relationships in which the relationship is optional for the parent table and required for the child table, except in the case of the relationship from the 513 Table Metadata table to the 515 Business Key Column Metadata table, from the 513 table to the 521 Temporal Unique Identifier Metadata table, and from the 517 Temporal Foreign Key Metadata table to the 519 Temporal Foreign Key Column Metadata table. In these three cases, the relationship is also required for the parent table.

A temporal foreign key may be defined as the column or columns, in a child bitemporal table, which references the object identifier of the one or more rows in a parent bitemporal table each of whose rows has an assertion-time period that fully includes the assertion-time period of the child row containing the temporal foreign key, and the logical union of the effective-time periods of whose rows form a continuous period of effective time that fully includes the effective-time period of the child row containing the temporal foreign key. We note that these bitemporal tables may or may not be canonical tables.

The interpretation of these metadata tables is as follows: Database-Metadata 511—this table contains such preliminary data model metadata as the DBMS and release. If the preliminary data model is a logical data model, it is the DBMS and release of the physical data model that a data modeling tool, such as Erwin, will generate from it. If the preliminary data model is a physical data model, it is the DBMS and release for which that physical data model is valid. In all cases, metadata is applied to a physical data model in order to generate a temporal database.

The columns prelim-data-model-info and target-db-info are placeholders for metadata information such as the DDL dialects of the precursor tables and the generated tables, target tablespace definitions, and partitioning definitions.

As an example of additional target database temporal metadata, consider that a database can have multiple owners or qualifiers. (These are sometimes called database "schemas", but this disclosure reserves the term "schema" to refer to a table definition.) For example, a database DB001 may have owners/qualifiers CDB123 and XDB456 for different tables COWN123.Customer and XOWN456.Customer. These tables may be in the same DB001 database.

Another target database issue that would require additional temporal metadata is that databases are often on separate servers. In addition, owners/qualifiers are usually defined within a database, but may also be in different databases.

Also, for example, FKs can span owners/qualifiers in SQL Server, or server instance/subsystems in DB2.

Table-Metadata 513: this table contains metadata for each table to be generated from the combination of a precursor table in a preliminary data model, and temporal metadata.

For each precursor table, prcrsr-tbl-nm is the name of the precursor table in the preliminary data model. prcrsr-tbl-typ indicates the type of the precursor table, which is one of the following: (i) non-temporal; (ii) bitemporal; (iii) effective-time; or (iv) assertion-time. Precursor tables are all non-canonical tables.

For each generated table, gen-tbl-nm is the name of the generated canonical table in the target database, and gen-tbl-typ indicates the type of the generated table, which is one of the following: (i) temporally-enabled canonical; (ii) bitemporal canonical; (iii) effective-time canonical; (iv) assertion-time canonical; (v) bitemporal non-canonical; (vi) effective-time non-canonical; and (vii) assertion-time non-canonical.

A temporally-enabled dependent table is a table or view that appears to contain non-temporal data, but whose data is in fact persisted in a canonical table. A temporally-enabled dependent table is a 303 otherwise identical non-temporal table.

A temporally-enabled canonical table is a canonical table for which the systems and methods described herein are able to define and manage a 303 otherwise identical non-temporal table which is a temporally-enabled dependent table.

A bitemporal dependent table is a table or view that appears to contain bitemporal data, but whose data is in fact persisted in a canonical table. A bitemporal dependent table is a 305 otherwise identical table.

A bitemporal canonical table is a canonical table for which the systems and methods described herein are able to define and manage a 305 otherwise identical table which is a bitemporal dependent table.

An effective-time dependent table is a table or view that appears to contain effective-time data, but whose data is in fact persisted in a canonical table. An effective-time dependent table is a 305 otherwise identical table.

An effective-time canonical table is a canonical table for which the systems and methods described herein are able to define and manage a 305 otherwise identical table which is an effective-time dependent table.

An assertion-time dependent table is a table or view that appears to contain assertion-time data, but whose data is in fact persisted in a canonical table. An assertion-time dependent table is a 305 otherwise identical table.

An assertion-time canonical table is a canonical table for which the systems and methods described herein are able to define and manage a 305 otherwise identical table which is an assertion-time dependent table.

A bitemporal non-canonical table is a bitemporal table which persists its own data, and is not a 305 otherwise identical table to a canonical table.

An effective-time non-canonical table is an effective-time table which persists its own data, and is not a 305 otherwise identical table to a canonical table.

An assertion-time non-canonical table is an assertion-time table which persists its own data, and is not a 305 otherwise identical table to a canonical table.

For each generated table, gen-tbl-oid-typ indicates whether its object identifier is (i) a system-generated surrogate-valued single column, indicated, for example, by means of the value "sk", or (ii) the business key of the generated table, indicated, for example, by means of the value "bk".

If the object identifier is a system-generated surrogate-valued single column, it is generated and managed by the systems and methods described herein. If the object identifier is the business key, then whether or not it is surrogate-valued, it takes on values supplied by the transactions that populate the database. In other embodiments, object identifiers which are not business keys, and which are generated and managed by the systems and methods described herein, may consist of more than one column.

For each generated table, gen-tbl-pk-typ indicates whether the PK of the table is also the temporal unique identifier of the table. If it is not, then in one embodiment, values for that PK are supplied on transactions which create and maintain the data in the table and, in the embodiment which includes temporal metadata table 513, gen-tbl-sk-pk-col-nm provides the name of that column. In another embodiment, the values for a PK which is not a temporal unique identifier may be supplied by the systems and methods described herein.

A row in the 513 Table Metadata table represents one generated table and also the one precursor table from which it is generated.

Business-Key-Column-Metadata 515: this table contains metadata for each generated table that indicates the column or columns which make up its business key. As described above, the business key of a generated table is identical to the primary key of that table's precursor table, with temporal foreign keys being substituted for any foreign keys in the primary key of the precursor table.

Business key columns in the generated table may have different column names than the names of the corresponding columns in the precursor table. bk-col-nm indicates the name of each business key column. The definition of the precursor table, in the preliminary data model, supplies the information about the corresponding primary key columns, including their names and datatypes.

Temporal Foreign-Key-Metadata 517: this table contains metadata for each temporal foreign key (TFK) to be generated from the preliminary data model together with the temporal metadata. Minimum and maximum cardinality are determined from the corresponding precursor physical table definitions, and are stored in the columns min-card and max-card, respectively, for use in managing temporal data. The option, on delete transactions, to block deletes, or cascade deletes, or set foreign key occurrences in child tables to [null], is also determined from the corresponding precursor physical table definitions, and is stored in the column del-rule.

The primary key of the TFK-Metadata 517 table is comprised of two foreign keys to the Table-Metadata 513 table, together with a sequence number. One of the foreign keys indicates the parent table for the TFK, which is the table pointed to by the TFK. The other foreign key indicates the child table for the TFK, which is the table that contains the TFK itself. The sequence number tfk-seq-nbr is used to sequence the TFKs for each child table in the same sequence in which the corresponding FKs are sequenced in the associated precursor table.

Temporal-Foreign-Key-Column-Metadata 519: this table contains metadata for each column of each TFK of each generated table. The name of the column is contained in tfk-col-nm. If multiple columns make up the temporal foreign key, tfk-col-seq-nbr determines the sequence of those columns.

The primary key of this table consists of a foreign key to the TFK-Metadata 517 table, together with tfk-col-seq-nbr, which is a sequence number. This sequence number is used to insure that the columns which make up the TFK occur in the same sequence as their occurrence in object identifiers in their parent tables. The column tfk-col-nm contains the name of each TFK column. The sequence of FKs in precursor tables, and of columns within FKs and the names of those columns, is part of the information provided by the physical table definition of the precursor table, which is part of the preliminary data model.

521 Temporal-Unique-Identifier-Metadata table: this table contains one row for every column of the temporal unique identifier of every generated table. This metadata also determines the sequence of columns in each temporal unique identifier.

523 Non-Key-Metadata table: this table contains one row for every column in every generated table that is a non-key column. Nk-seq-nbr determines a sequence for those non-key columns.

525 Precursor-Time-Period-Metadata table: this table contains metadata describing the one or two time periods used in a precursor table that is itself a temporal table. tp-typ, in the PK of this metadata table, indicates whether a time period in a temporal precursor table is an effective-time period or an assertion-time period.

If a time period is represented, in a precursor table, by a single column with a time period datatype, then the name of that column is indicated by tp-one-col-nm. If a time period is represented, in a precursor table, by a begin and end point in time, then the names of those columns are indicated by, respectively, tp-from-col-nm and tp-to-col-nm. If a time period is represented, in a precursor table, by only a begin point in time, then the systems and methods described herein use the begin point in time of the chronologically next row for the same object to determine the end point in time of the row, and if there is none, uses 9999 as that end point in time.

As stated above, "9999" represents the latest point in time, at the chosen level of granularity, that a specific DBMS can recognize and manage. In other embodiments, nulls or any other acceptable values may be used instead.

The column tp-open-closed-ind indicates whether or not each point in time is included in the time period. (In this disclosure, all examples used the closed-open convention, in which the begin point in time is included in the time period, but the end point in time is the next point in time following the last point in time in the time period.)

If the precursor table is an effective-time table, then it has one row in the Precursor Time Period Metadata 525 table, and its tp-typ is "effective". If the precursor table is a bitemporal table, then it has two rows in the Precursor Time Period Metadata 525 table. The tp-typ of one of those rows is "effective", and the tp-typ of the other of those rows is "assertion". With this information, the software is able to generate any of the generated table types (gen-tbl-typ) from non-canonical temporal tables, as well as from non-temporal tables.

For example, as will be clear to one skilled in the art, if so directed by the temporal metadata, software utilizing the systems and methods described herein may generate an effective-time table from a precursor table and the temporal metadata. In that case, based on a gen-tbl-typ of "effective" in the Table Metadata 513 table, the previously described algorithm, or any equivalent algorithm, would skip step 405 of that algorithm, or its equivalent step.

Furthermore, a temporally-enabled non-temporal table will be generated if all steps of that algorithm are included. This is because a temporally-enabled non-temporal table is a canonical table which has a dependent dynamic view populated by all and only those rows which are current in effective time and in assertion time. If the precursor table is a non-temporal table, then this view is identical in name to that table, and is column for column and column name for column name identical to it. If the precursor table is a temporal table, then the view is identical to it, in this manner, except that the one or two time periods of the precursor table are included in the 303 otherwise identical dependent table/view.

Here, the precursor temporal table of a canonical table, and the 305 otherwise identical table of that same canonical table, are schema-isomorphic to one another. Furthermore, the precursor non-temporal table of a canonical table, and the 303 otherwise identical non-temporal table of that same canonical table, are schema-isomorphic to one another.

In embodiments utilizing the systems and methods described herein and provided by DBMS vendors, the temporal metadata described herein may be defined by means of extensions to SQL DDL (Data Definition Language), and may be stored in data structures internal to a DBMS.

A row in the 525 Precursor Time Period Metadata table represents one time period in a precursor table. When a generated table is generated from a uni-temporal or bitemporal precursor table, this establishes the correspondence of a precursor time period with either an effective-time period or an assertion-time period in the generated table.

These precursor tables may or may not physically exist. It is their physical table definitions, provided, for example, in a form specific to a data modeling tool, or directly in SQL DDL (Data Definition Language), that is the starting point for the creation of generated tables.

Other Diagrams and Graphical Conventions

Figure 36:
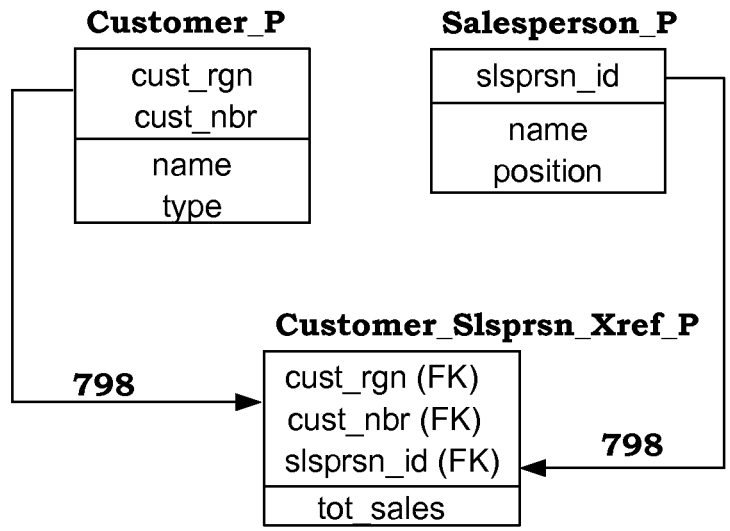
FIG. 36: a logical data model diagram showing the precursor non-temporal tables corresponding to the three 600 canonical schema tables shown in FIGS. 33, 34 and 35. The arrows in FIG. 36 represent foreign key relationships. The relationship cardinalities are one-to-many, optional for the parent and required for the child.
Figure 37:
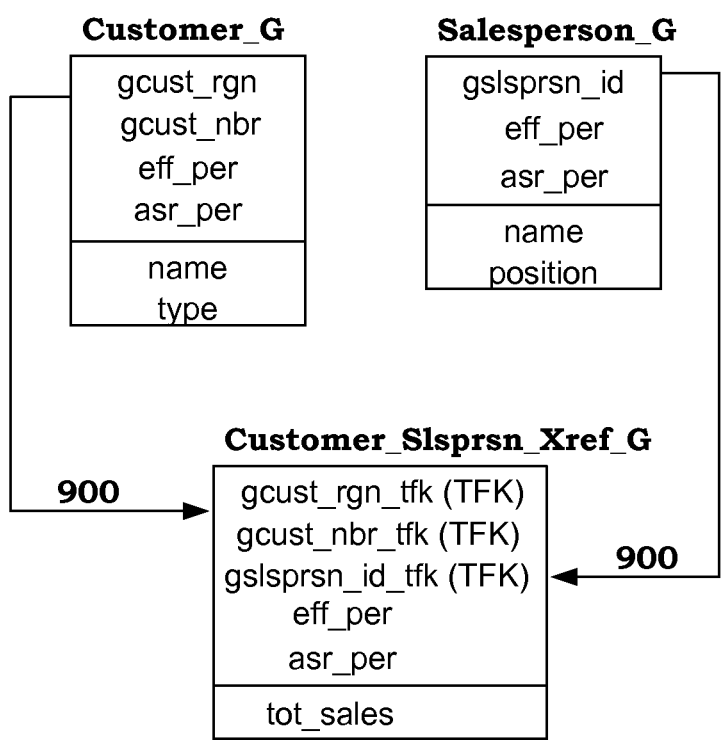
FIG. 37: a data model diagram similar to a logical data model diagram, showing the three 600 canonical schema tables generated from the precursor tables shown in FIG. 36. The arrows in FIG. 37 represent temporal foreign key relationships. The relationship cardinalities are identical to those for the corresponding foreign key relationships.

Two TFK relationships 900 are shown in FIG. 37. Their TFKs correspond to the two FK relationships shown in FIG. 36.

TFKs, like FKs, exist in child tables and point to parent tables. Because a TFK is an object identifier, and not a complete temporal unique identifier, there may be several rows in the parent table which have the indicated object identifier. Sometimes, a single parent row may have time periods which cause it to satisfy temporal referential integrity dependencies. At other times, it may require several parent rows to satisfy the TRI dependency from a single child row.

We have defined a TFK to reference an episode of the object whose object identifier value it matches. We said, above, that "episodes are the parent managed objects in a temporal referential integrity relationship." So a TFK relationship is from a parent episode to zero, one, or more child rows. If the relationship is optional for the child table, then the TFK defined for it is nullable; and otherwise not.

Figure 49:
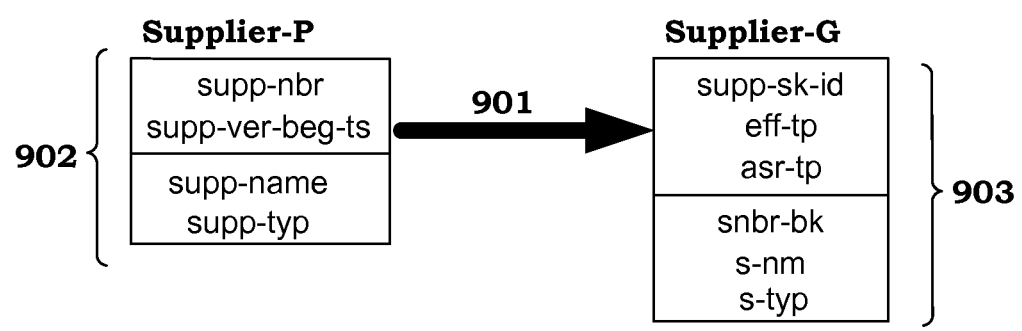
FIG. 49: showing the generation of a bitemporal table from an effective-time table, a generation made possible by the metadata shown in FIGS. 50a-50f. The arrow in FIG. 49 represents the 901 process of creating generated tables from precursor tables.

FIG. 49 shows a Supplier-P table, which is a 902 precursor table, and Supplier-G table, which is a 903 generated table. The arrow from Supplier-P to Supplier-G represents the process of creating generated tables from precursor tables, a process we have labeled as item 901.

With this process 901, the systems and methods described herein create generated tables from precursor tables under the direction of the metadata in the 511, 513, 515, 517, 519, 521, 523 and 525 metadata tables.

Many of the figures in this specification contain sample database tables. The top row of every table contains the column names of the columns of the table. Primary key columns are underlined, and usually appear left-most. Foreign key columns are italicized. Non-key columns are neither underlined nor italicized.

Other Embodiments of Temporal Primary Keys

We will sometimes use the phrase "temporally-enabled table" in place of the longer phrase "temporally-enabled non-temporal table".

A temporal primary key may be defined as a primary key comprising an object identifier, an effective-time period, and an assertion-time period.

In some embodiments, canonical schemas may represent one or more temporal primary keys other than by means of time periods represented by begin and end points in time, or by means of single-column surrogate-valued object identifiers.

In FIG. 9, which shows a 600 canonical schema table, the temporal primary key includes an object identifier 601, an effective begin date 603, and an assertion begin date 607. The effective begin date 603 represents an effective-time period; the assertion begin date 607 represents an assertion-time period.

However, in some embodiments, single-column time period datatypes may be used to represent effective-time periods and assertion-time periods. It follows that, for example, in FIG. 35, the PK shown there is another embodiment of a temporal PK 621. The PK includes a single-column effective-time period 780 and a single-column assertion-time period 781.

Further embodiments of temporal PKs 621 are also possible because other embodiments of object identifiers 601 are possible. For example, as previously stated, "[i]n another embodiment, the object identifier might consist of more than one column."

This concept is illustrated in FIG. 35, where the object identifier 601 consists of three columns. The first two columns are a temporal foreign key (TFK) 615 referencing a specific customer in the Customer_G table shown in FIG. 33. The third column is a TFK 615 referencing a specific salesperson in the Salesperson_G table shown in FIG. 34. The object identifier 601 of the associative table shown in FIG. 35 is formed by combining these two TFKs. In this example, the object designated by the object identifier 601 is a relationship between customer C123 in the southwest region, and salesperson 7102.

Thus, temporal PKs of canonical schemas may or may not use single column surrogate-valued object identifiers. The temporal PKs of canonical schemas may be multi-column, may include TFKs, and may include time periods represented in different ways.

We distinguished 600, 623, and 624 canonical schemas above. The next sections refer to 600 canonical schemas and describe them. However, the following descriptions and concepts also apply to 623 and 624 canonical schemas.

Temporal PKs and Temporal Unique Identifiers

In an alternative embodiment, the PKs of canonical or non-canonical temporal tables do not have to be temporal PKs. Instead, temporal PKs may be replaced as PKs, by any other column or columns, surrogate-valued or not, that will be a unique identifier of a row in a temporal table, the said column or columns comprising a non-temporal PK 622, illustrated in FIG. 39. However, this replacement may occur only if (i) the PK 622 uniquely identifies each row in the table, and (ii) a temporal unique identifier is also present, as a non-PK column or set of columns, in the table.

In some embodiments, a temporal unique identifier may exist in a separate table, and in a canonical table, a pointer to the temporal unique identifier may be used instead of the temporal unique identifier itself. In general, and as will be apparent to one skilled in the art, any column or set of columns, in any table, may be moved to another table and replaced by a pointer to that column or set of columns.

A temporal unique identifier ("tui") may be described as a unique identifier for a temporal table which includes (i) an object identifier, (ii) a designation of an effective-time period, and (iii) a designation of an assertion-time period. These designations may or may not be the time periods themselves. For example, in earlier embodiments, the begin date of each time period was used, in a temporal unique identifier, to designate the entire time period.

As shown in FIG. 39, non-PK temporal unique identifier 782 may be described as a temporal unique identifier which is not used as a PK.

To be temporally unique, i.e. to satisfy TEI, a row in a temporal table must be the only row in the table, anywhere within the two-dimensional temporal extent defined by the assertion-time period and the effective-time period of that row, which has that row's object identifier.

The use of temporal unique identifiers as PKs represents one embodiment of a canonical schema, but implementation by means of PKs which are not temporal unique identifiers are also possible. For example, FIG. 39 shows a canonical schema 600 table that has a non-PK temporal unique identifier 782, and that uses the surrogate-valued column cust-id as its 622 non-temporal PK. Metadata for this table is not shown, but if it were, the gen-tbl-pk-typ column of the 513 Table Metadata table would have a value of "non-tui", indicating that the PK of this table is not the temporal unique identifier of the table.

In one aspect, a temporal table must contain a temporal unique identifier, but that identifier may or may not be the PK of the table. If the temporal unique identifier is not the PK of the table, whatever is used as the PK must uniquely identify each row, and a DBMS will then be able to enforce PK uniqueness (entity integrity) on it. The non-PK temporal unique identifier 782 may be used by the systems and methods described herein to enforce TEI, and may also be used by those same systems and methods to enforce TRI.

Integrating the Management of Temporal and Non-Temporal Tables

In another embodiment, canonical schemas may also be used for non-temporal data, and thus to present, as maintainable and as queryable objects, non-temporal tables as well as temporal tables.

A non-temporal table whose data is persisted in a canonical table is a temporally-enabled non-temporal dependent table. It is schema-isomorphic with the precursor table of the canonical table which persists its data, and also with the 303 otherwise identical non-temporal table which is dependent on it.

Temporal transactions that do not specify a time period, and whose target table is a temporally-enabled table, are called "temporally-enabled transactions."

Regarding the phrase "as maintainable and as queryable objects": canonical tables are physical tables, and each of them is a bitemporal table. By supporting an effective-time dependent table, for example, a canonical table provides temporal upward compatibility for maintenance transactions and for queries against that effective-time dependent table. In one embodiment, Instead Of Trigger SQL provides temporal upward compatibility for maintenance transactions, and SQL views provide temporal upward compatibility for queries.

By managing non-temporal tables as temporally-enabled dependent tables, the problem of temporal referential integrity relationships between non-temporal and temporal tables is solved because both the temporally-enabled canonical tables and the other canonical tables use the same 600 canonical schema.

Another benefit of this integrated approach to managing temporally-enabled and temporal tables is that entity integrity is automatically enforced on temporally-enabled dependent tables by enforcing temporal entity integrity on their corresponding canonical tables, and that referential integrity is automatically enforced on temporally-enabled dependent tables by enforcing temporal referential integrity on their corresponding canonical tables. In this way, the same set of code that manages temporal tables and their integrity constraints, can be used to manage temporally-enabled non-temporal tables and their integrity constraints.

Default Values for Temporal Transactions

Above, the notation Now( ) is used to represent the moment in time at which a transaction physically commits. Hereinafter, the notation Now( ) represents a variable whose value, at any point in time, is that current point in time, and the notation Now(!) represents a constant whose value is the moment in time at which a transaction physically commits. However, in embodiments which support future assertions against canonical or canonically-supported tables, temporal transactions and temporally-enabled transactions may specify a future assertion-time period when applied to those tables.

Now(!) is a value assigned to the variable Now( ) at the point in time at which a temporal transaction commits.

In embodiments which do not support future assertions, temporal transactions cannot specify an assertion-time period, and a default assertion-time period of [Now(!)-9999] is associated with these transactions.

Transactions on effective-time dependent tables may include an explicit effective-time period. However, if they do not include an explicit effective-time period, the default value [Now(!)-9999] is used for the effective-time period associated with the transaction.

In the case of non-temporal tables implemented as temporally-enabled dependent tables, the default value [Now(!)-9999] is supplied for both the effective-time period and the assertion-time period. This is because neither effective-time periods nor assertion-time periods are defined for non-temporal tables. Thus, neither can appear on a transaction updating a non-temporal table.

An effective-time transaction may be defined as a transaction that may specify an effective-time period. Effective-time transactions may have as their targets either effective-time dependent tables or bitemporal dependent tables. Effective-time transactions may include an explicit assertion-time period only in embodiments which support future assertions.

The 305 otherwise identical table which is the target of an effective-time transaction may be either an effective-time dependent table or a bitemporal dependent table.

An effective-time canonical table is a canonical table whose precursor table is an effective-time table, and therefore whose 305 otherwise identical table is an effective-time dependent table which is schema-isomorphic to the said precursor table.

An effective-time dependent table has an effective-time period but not an assertion-time period.

A bitemporal canonical table is a canonical table whose precursor table is a bitemporal table, and therefore whose 305 otherwise identical table is a bitemporal dependent table which is schema-isomorphic to the said precursor table.

As described above, by controlling the user interface at which insert, update, and delete transactions against dependent tables are accepted, some embodiments of the software and methods described herein maintain a full bitemporal history of all modifications submitted at the user interface. This is because some embodiments (i) use otherwise identical dependent tables, at the user interface, to accept transactions and queries, (ii) use canonical tables or canonically-supported tables to persist the data submitted on those transactions, and (iii) use temporal metadata to direct their enforcement of TEI and TRI.

A preferred embodiment of this user interface utilizes Instead Of SQL triggers, but other embodiments, such as temporal extensions to the SQL language now under development in the ANSI and ISO standards committees, are also possible.

Canonical Support for Non-Temporal Tables: a Brief Case Study

FIGS. 40-44 illustrate a case study of canonical support for non-temporal tables by describing several insert, update, and delete transactions over a period of time. In each figure, the canonical schema table 600 physically exists. However, the otherwise identical non-temporal table 303 may not physically exist, and may instead exist as a non-materialized view. In one embodiment, Instead Of SQL triggers and views make it appear to database users as though they are updating and querying these otherwise identical non-temporal tables 303.

In this example, temporal metadata defines needed relationships between components of the paired schemas (e.g., 303 paired with 600) for both the Client and Policy tables. Here, FIGS. 41-44 show a Policy table 303 that is a referential integrity (not a temporal referential integrity) child table of FIG. 40's Client parent table 303. FIGS. 41-44 also show a Policy table 600 that is a temporal referential integrity child table of FIG. 40's Client parent table 600.

The 303 tables shown in these figures may not physically exist. But it will be apparent to one skilled in the art that as temporal entity integrity and temporal referential integrity are enforced on the 600 tables shown in these figures, entity integrity and referential integrity are automatically enforced on the corresponding 303 tables.

The tables 303 and 600 are associated by means of temporal metadata. Furthermore, the tables are associated by means of the same temporal metadata that enable the systems and methods described herein to create generated tables from precursor tables. The otherwise identical non-temporal tables 303 of FIGS. 40-44 are, in one embodiment, dynamic views defined on physically existing canonical tables. They are also schema-isomorphic to the precursor tables from which the generated canonical tables are derived, by means of the temporal metadata tables 511, 513, 515, 517, 519, 521, 523 and 525.

FIGS. 39-44 each show a canonical table 600 and the otherwise identical non-temporal dependent table 303 that is defined on the 600 table. The table 303, in some embodiments, exists as a view on the table 600, a view defined by means of the temporal metadata. This table 303 or view is schema-isomorphic to the precursor table from which the table 600 is generated by the temporal metadata. If the precursor table also physically exists as a populated table, the table 303 is also content-isomorphic to that precursor table, meaning that it has, in one aspect, the same rows, each with the same columns and column values, as the rows and columns and column values in the precursor table. This, as explained above, is the means by which the systems and methods described herein support temporal upward compatibility.

FIG. 40 shows a otherwise identical non-temporal Client dependent table 303, and its corresponding canonical Client table 600. This Client table's time periods define a two-dimensional temporal space which fully includes the two-dimensional temporal space of the rows of policy P861 in FIGS. 41-44 which reference that client, thus satisfying the temporal referential integrity constraint on that temporal foreign key.

Some details of the pairing of otherwise identical non-temporal tables 300 with the canonical tables 600 that support them are shown in FIGS. 45a-45g. FIG. 45a shows a Database Metadata table 511 that sets db-id=23 for the database in which the Client_G and Policy_G tables will be generated (as shown in FIG. 45b).

FIG. 45b shows a Table Metadata table 513 that defines the two canonical tables to be generated in database 23. The generated table names are Client_G and Policy_G. The names of the corresponding tables 300 are, respectively, Client_P and Policy_P.

FIG. 45c shows a Business Key Column Metadata table 515 that defines the business keys of the two tables (Client_G and Policy_G from FIG. 45b). One function of this metadata table is to provide column names for the business key columns of the generated table which may differ from the column names of the precursor table's primary key.

FIG. 45d shows a 517 Temporal Foreign Key Metadata table that identifies temporal foreign keys and, by means of sequence within child tables, associates each TFK in a 600 canonical table with the corresponding FK in the associated precursor table, and also with the corresponding FK in the associated 300 dependent table. The minimum and maximum cardinalities, and the delete rule, must be identical to the cardinalities and delete rule of the precursor table. They are repeated in the temporal metadata because they need to be available for managing the temporal data, and not just for creating the generated tables.

FIG. 45e carries the mapping between TFKs and FKs down to the column level. In this 519 Temporal Foreign Key Column Metadata table, tfk-col-nm=client-oid identifies the TFK as a single-column TFK with a column name of client-oid. By means of the sequencing in the 517 Temporal Foreign Key Metadata table, the 600 table client-oid column is paired with the corresponding column of the corresponding foreign key in the precursor table, and also with the 300 dependent table's client-nbr column. The latter column name can be derived from the physical schema of the precursor Policy_P table (not shown).

FIG. 45f defines the temporal unique identifiers for both tables in this example. Eff-tp-flg=1 indicates a column which is a single column effective-time period, and asr-tp-flg=1 indicates a column which is a single column assertion-time period. Columns with zeroes in both flags constitute, in tui-col-seq-nbr sequence, the object identifiers of the tables.

FIG. 45g maps the non-key columns in the two tables. With this metadata table, the remaining columns in the 300 table can be properly named.

The temporal metadata of this embodiment may be thought of as the "semantic glue" by which canonical tables can physically represent all types of temporal tables and also temporally-enabled non-temporal tables. This metadata "glues" canonical tables "back" to the precursor tables from which they are generated, and "forward" to the 305 otherwise identical tables which are dependent on them (and, in the case of temporally-enabled tables, to the 303 otherwise identical non-temporal tables which are dependent on them).

By means of this "glue", all temporal and temporally-enabled data is persisted in tables which use the same canonical schema, and consequently the constraints of TEI and TRI are applied to them, and among them, by means of code which does not have to distinguish among tables with different temporal schemas. In addition, by means of this "glue", dependent tables are schema-isomorphic and content-isomorphic with their corresponding precursor tables, thus providing temporal upward compatibility for those precursor tables and for the transactions and queries which may have already been written against them.

Returning to FIG. 41, this figure shows the results of a temporally-enabled insert transaction which, on February 2009, specifies the row shown in the otherwise identical non-temporal table 303 (i.e., insert values: P861, C457, HMO, $15). Because no time periods are specified on temporally-enabled transactions, the two default time periods for the transaction (i.e., the effective-time period and the assertion-time period) are both [Feb09-9999]. Prior to February 2009, the row shown in FIG. 41's otherwise identical non-temporal table 303 would not appear in that table. Specifically, a query for a policy whose policy number is P861 would not return a result, i.e., its result set would be empty. However, during or after February 2009, a query for policy P861 would return a result, e.g., a query for P861's copay amount would return a value of $15.

FIG. 40 shows a canonical 600 Client_G table that is the TRI parent table of the canonical 600 Policy_G table shown in FIGS. 41-44. Here, FIG. 40 shows a canonical 600 Client_G table supporting an otherwise identical non-temporal Client_P dependent table 303. FIGS. 41-44 each show an otherwise identical non-temporal Policy_P dependent table 303. This Policy_P table 303 is RI-dependent on FIG. 40's non-temporal Client_P table 303. This RI constraint is automatically enforced when the corresponding TRI constraint is enforced on the underlying 600 canonical tables. If client C457 in the Client_G table 600 began, in both effective time and assertion time, later than February 2009, then the attempt to insert policy number P861 into its canonical table would fail on a temporal referential integrity error. Further, any concurrent view of the corresponding 303 tables would show what would appear to be an insert into the 303 Policy_P table that failed on an RI violation.

FIG. 42 shows the results of a non-temporal update transaction which, on July 2009, results in the row shown in the otherwise identical non-temporal table 303 (i.e., update values: P861, C457, HMO, $25). Because no time periods are specified on non-temporal transactions, the two default time periods for the transaction are both [Jul09-9999]. From February 2009 to July 2009, the row showing the updated information in FIG. 42's otherwise identical non-temporal table 303 would not appear in that table, and the row shown would instead be the original row from FIG. 41's otherwise identical non-temporal table 303. Specifically, from February 2009 to July 2009, a query of the copay-amt column would return a value of $15. However, if no additional edits occurred to policy number P861, then any query of the copay-amt column occurring during or after July 2009, would return a value of $25.

FIG. 43 shows the results of another non-temporal update transaction which, on January 2010, results in the row shown in the otherwise identical non-temporal table 303 (i.e., update values: P861, C772, HMO, $25). Here, FIG. 43 is used to demonstrate a change in the policy's ownership. Because no time periods are specified on non-temporal transactions, the two default time periods for the transaction are both [Jan10-9999]. From July 2009 to January 2010, the row showing the updated information in FIG. 43's otherwise identical non-temporal table 303 would not appear in that table, and the row shown would instead be the row from FIG. 42's otherwise identical non-temporal table 303. Specifically, from July 2009 to January 2010, a query of the client-nbr column would return a value of C457. However, if no additional edits occurred to policy number P861, then any query of the client-nbr column occurring during or after January 2010 would return a value of C772.

Still referring to FIG. 43, the non-temporal update of January 2010 specifies a change to the foreign key column client-nbr. By means of the temporal metadata referred to above, the systems and methods described herein will know that the corresponding column in the canonical table is client-oid. Just as a conventional FK references a PK in a parent non-temporal table, a TFK references an object identifier in a parent temporal table. Here, the client-nbr C772, specified on the update transaction, matches obj-id 2715 in the canonical schema Client table from FIG. 40. That row, i.e. the last row shown in the Client table 600 in FIG. 40, is a single-row episode which satisfies the TRI dependency from the update transaction. Thus, the update goes through, and now, querying the 303 table's client-oid column indicates that the policy's ownership has changed.

FIG. 44 shows the results of a non-temporal delete transaction which, on July 2010, creates the otherwise identical non-temporal table 303 shown there (i.e., that beginning on July 2010, there is no current row for policy P861). Because no time periods are specified on non-temporal transactions, the two default time periods for the transaction are both [Jul10-9999]. From January 2010 to July 2010, the row from FIG. 42's otherwise identical non-temporal table 303 would appear in that table (i.e., values: P861, C772, HMO, $25). However, if no additional edits occurred to policy number P861, then beginning on July 2010, no row is shown because no row is current in both assertion time and effective time as of July 2010.

In other embodiments, rows in canonical tables that have assertion time periods with an end point in time already in the past may be physically stored in a separate table. These, and all rows with assertion-time periods with an end point in time already in the past, are rows that correspond to physically deleted rows in an otherwise identical non-temporal table. These are rows that correspond to statements that we are no longer willing to assert.

Queries that wish to access these rows may be directed to that separate table. Queries that wish to access these rows and also rows whose assertion-time periods are not entirely in the past may access a union of the two tables.

Canonically-Supported Tables and Canonical Files

In other embodiments, canonical schemas such as the 600, 623 or 624 schemas, may be used as schemas for the physical files in which the data in temporal tables is persisted. This embodiment may be referred to as a "DBMS internals embodiment" because the physical files, or "canonical files", are normally accessible only from within the DBMS itself. What is accessible to DBAs (Database Administrators) and other users of a database are the tables and their data, not those underlying files.

In a DBMS internals embodiment, canonical files are used to persist the data in uni-temporal tables and in bitemporal tables, and may also be used to persist the data in non-temporal tables. A canonical file may be, for example, a sequential file, an indexed file, a hashed-access file, a file used in a column-oriented data storage scheme, a comma-delimited file, or any other similar file as known in the art.

A canonically-supported table can be defined as a table whose data is persisted in one or more canonical files. Thus, an effective-time table may be a canonically-supported effective-time table, whether or not it is also an effective-time table that is dependent on an effective-time canonical table. An assertion-time table may be a canonically-supported assertion-time table, whether or not it is also an assertion-time table that is dependent on an assertion-time canonical table. A bitemporal table may be a canonically-supported bitemporal table, whether or not it is also a bitemporal table that is dependent on a bitemporal canonical table. A temporally-enabled non-temporal table may be a canonically-supported temporally-enabled non-temporal table, whether or not it is also a temporally-enabled non-temporal table that is dependent on a temporally-enabled canonical table.

In another embodiment, called a "canonically-visible embodiment", temporal tables and temporally-enabled tables are dependent on canonical tables, i.e. tables which use canonical schemas. All of the temporal tables and temporally-enabled tables shown in the figures of this disclosure are part of a canonically-visible embodiment.

Canonical tables may also be canonically-supported tables. Thus, it follows that some embodiments may be both canonically-visible embodiments and DBMS internals embodiments.

For example, a database whose tables are not canonical tables may contain canonically-supported effective-time tables. These tables include an effective-time period but not an assertion-time period. The same database may contain canonically-supported assertion-time tables, which include an assertion-time period but not an effective-time period. The same database may contain canonically-supported bitemporal tables, which include both time periods. However, because all these types of tables are canonically-supported tables, the files which persist the data for each of these tables are canonical files, and in all cases these canonical files contain both effective-time periods and assertion-time periods.

When non-canonical canonically-supported tables are generated from precursor tables which physically exist in a database, the generated tables are both schema-isomorphic and content-isomorphic with their precursor tables. In one aspect, they are, in fact, not just isomorphic with their precursor tables; they are substantially identical to them. They are those same precursor tables, with canonical support supplied by persisting their data in canonical files.

The use of canonical files provides an embodiment of the systems and methods described herein in which the generated tables are not required to be canonical tables. If canonically-supported tables are not canonical tables, then the systems and methods described herein provide a very low cost migration path to a database all of whose tables support the maintenance transactions and queries already described with reference to canonical tables. By supporting the transactions and queries described herein by means of canonical files instead of by means of canonical tables, the tables in databases can remain unchanged even though the temporal and bitemporal functionality described herein is provided for some or all of those tables.

Canonical Support Extended to Non-Temporal Tables

In another embodiment, canonical files may be used to persist the data in non-temporal tables.

The data in canonically-supported non-temporal tables are persisted by means of canonical files. This means that neither effective-time periods nor assertion-time periods are columns in these canonically-supported tables. Neither effective-time periods nor assertion-time periods may be specified on insert, update or delete transactions against their 303 dependent tables or, in an aspect in which these tables are substantially identical to their dependent tables, against these tables themselves. Instead, the system supplies a default value for both time periods, on all transactions against non-temporal tables. In a preferred embodiment, the default value is [Now(!)-9999].

When a delete transaction is processed for an object, the row representing that object may be physically or logically deleted from its canonically-supported non-temporal table. However, that row—in whatever form it exists in canonical files—is not deleted in the canonical files which persist that data. Instead, in those canonical files, the deleted row is withdrawn, not physically deleted, i.e. it is given an assertion-time end point of Now(!). The system also creates a copy of the withdrawn row which differs from it in having an effective-time end point of Now(!) and an assertion-time period of [Now(!)-9999].

In FIGS. 39-44, 303 otherwise identical non-temporal tables are shown together with the 600 canonical tables on which they are, in one aspect by means of a view definition, based. The relationship of canonical files to canonically-supported non-temporal tables is similar to this relationship. In these figures, if the 303 views instead represented physical tables, and the 600 tables instead represented canonical files, then these figures would illustrate how canonical files support temporal or temporally-enabled tables.

Queries may be directly issued against canonically-supported non-temporal tables. The rows which appear in these tables are, at all times, all and only those rows current in both effective time and assertion time, and so in a canonically-supported non-temporal table, each object is represented by one and only one row. Thus, in one embodiment, canonically-supported non-temporal tables are both schema-isomorphic and content-isomorphic to their otherwise identical non-temporal tables. In another embodiment, canonically-supported non-temporal tables may be physically the same tables as their otherwise identical non-temporal tables.

Managing Episodes

Two TFK relationships 900 are illustrated in FIG. 37. TFKs, like FKs, exist in child tables and point to parent tables. Because a TFK is only an object identifier, and not a complete temporal unique identifier, there may be several rows in the parent table with the indicated object identifier. Sometimes, a single parent row may have time periods which cause it to satisfy temporal referential integrity dependencies. But at other times, it may require several parent rows to satisfy the TRI dependency from a single child row.

A TFK parent is an episode of the object whose object identifier value it matches. So a TFK relationship is from a parent episode to zero, one, or more child rows. If the relationship is optional for the child table, then the TFK defined for it is nullable; and otherwise not.

In one embodiment, a TFK relationship to a dependent child row is always optional for episodes. In another embodiment, metadata may be included which would specify whether a TFK relationship is optional or required for the parent episode.

FIGS. 24-27 demonstrate supporting episodes by adding an episode begin date to a bitemporal table. But in another embodiment, episodes can be managed with the use of Episode tables, rather than by means of the episode begin date in a canonical schema. In this embodiment, in which canonical schemas do not include episode begin dates, the extended canonical schema 623 becomes canonical schema 600.

Figure 46:
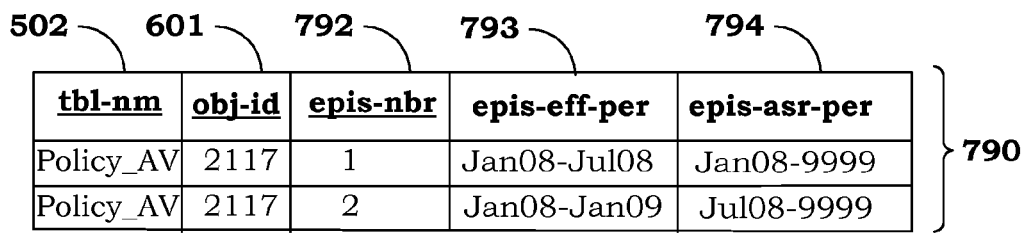
FIG. 46: a 790 Episode table showing two episodes of the object identified by object identifier 2117. This episode table records the Policy table episodes shown in FIG. 24.
Figure 47:
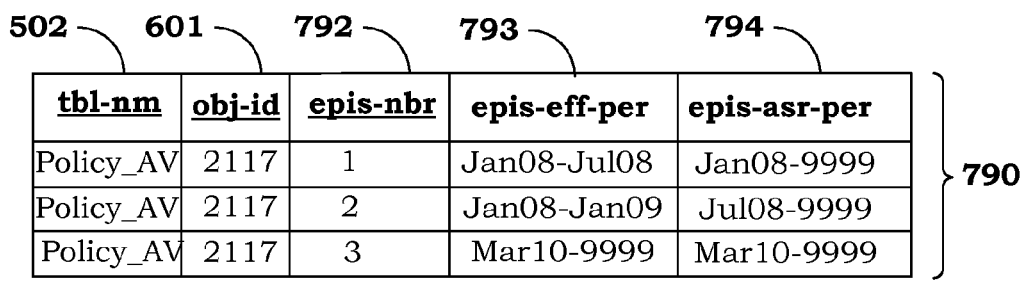
FIG. 47: the 790 Episode table showing three episodes of the object identified by object identifier 2117. This episode table records the Policy table episodes shown in FIGS. 25, 26, and 27.

Episode tables are illustrated in FIGS. 46 and 47. In one aspect, an episode table is entirely system-maintained and users cannot write transactions against it. In this aspect, an episode table may be internalized within a DBMS, and not be visible either as a table in the database itself or as a table definition in the database catalog. However, in another aspect, if the Episode table is visible to users of the database, then those users could write queries against it.

FIG. 46 corresponds to FIG. 24 in that both identify the same episodes for the same rows of data. In FIG. 24, episodes are identified as all and only those rows, in a given temporal table, for a given object identifier, which have the same episode begin date. In an Episode table, as shown in FIG. 46, episodes of a given object are distinguished by means of (i) the table name 502 of the table within which they are episodes, (ii) an object identifier 601, and (iii) a system-assigned episode number 792.

For example, the first row in the Episode table in FIG. 46 identifies an episode of policy P861 whose effective-time period extends from January 2008 up to July 2008. It corresponds to the first row in the Policy table in FIG. 24. The episode is uniquely identified as episode 1 for OID 2117 in the table named Policy_AV. That episode begins on January 2008 in assertion time.

In this example, only episodes where all constituent rows have assertion-time periods ending in 9999 are represented. In this example, the only rows with non-9999 assertion end dates are rows which are temporally deleted. Consequently, those rows can no longer be modified, and can no longer enter into TRI relationships. Thus, they are semantically equivalent to rows in non-temporal tables that have been physically deleted. Since the principal role for episodes is to assist in TRI checking, rows which can no longer enter into TRI relationships can be safely ignored because their time is past.

Continuing the discussion of FIG. 46, the second row in the Episode table begins, in assertion time, on July 2008. Its effective-time period extends from July 2008 to January 2009, and the episode corresponds to the second row in the Policy table of FIG. 24. However, during the assertion-time period beginning on July 2008, the effective-time period of the second Policy row is effective-time contiguous with the effective-time period of the first Policy row. The two Policy rows together, therefore, form a single episode. To represent this single episode, in FIG. 46, the effective-time begin date of the second episode is moved back to the effective-time begin date of the first row. This shift results in a second episode which overlaps with the first episode, and which, beginning on July 2008, covers the effective-time period of January 2008 up to January 2009, that is, the effective-time period of the combination of the first and second episodes. In another embodiment, the column epis-asr-per of the first row in FIG. 46 may be set to Jan08-Jul08 as part of the transaction which creates the second row. In this embodiment, episodes for the same object do not overlap.

In another embodiment, this shift of episode effective-time begin dates is not utilized, and the episodes in an Episode table will correspond, one for one, to the episodes implemented by means of episode begin dates.

FIG. 47 continues the example begun in FIG. 46 and shows the addition of a third episode for policy P861. This continuation shows a separate episode for policy P861 because the epis-eff-per shown in the third row is not effective-time contiguous with either of the two earlier episodes, shown in FIGS. 46 and 47. The episode represented by the third row in FIG. 47 is also the episode for the fourth and fifth rows from FIG. 26. The Policy table rows which make up the episode with a March 2010 episode begin date in FIG. 26 are not the same as the row which makes up the same episode in FIG. 25. However, from FIG. 25 to FIG. 26, the effective-time extent of the episode has not changed. Therefore, the assertion-time period of the episode itself has not changed, and so the assertion-time begin date remains March 2010.

In embodiments which support future assertions, rows may exist with non-9999 assertion end dates that are in the future. Rows with such end dates are not temporally deleted. We note that, in discussions of figures prior to FIG. 33, the term "deferred assertion" is used interchangeably with the term "future assertion". In discussions of figures beginning with FIG. 33, the term "future assertion" is used preferentially. The two terms are, nonetheless, synonymous.

An Episode table can also accommodate episodes of rows in future assertion time. This accommodation can occur because the creation of a row in future assertion time has the system lock any and all current assertion time rows for the same object which exist in at least one overlapping effective-time clock tick.

A row in a canonical table is locked if and only if its assertion end date is a non-9999 value. Thus, rows with assertion-time periods entirely in the past are locked, but other rows with non-9999 end date values may also be locked. Specifically, as explained above, locking is done, in association with future assertions, by setting the assertion end date of rows affected by a future assertion to the same value as the assertion begin date of the future assertion itself. This process of managing and using episodes is described in detail, above, in reference to FIGS. 28, 29, 30*a-b*, 31, and 32*a-d*, within the discussion of those figures.

The concept of an effective-time initial row can be defined as: for a given object identifier in a canonical bitemporal table, a row whose effective-time period is not contiguous with the effective-time period of any effective-time earlier row with the same object identifier that shares at least one assertion-time clock tick with the said row.

Episodes as Canonically-Agnostic

In another embodiment, episodes can be used to manage standard bitemporal tables.

A standard bitemporal table can be described as a bitemporal table which is not a canonically-enabled table.

If episodes can be used to manage standard bitemporal tables, then episodes are "canonically-agnostic" in the sense that it does not matter whether they are defined on canonical or on non-canonical bitemporal tables.

Episodes clearly can be used with any tables that utilize canonical schemas. It follows that they can be used in temporally-enabled canonical tables, uni-temporal canonical tables and bitemporal canonical tables.

In embodiments which do not support future assertions, assertion-time periods cannot be specified on any transactions. In such embodiments, transactions against temporally-enabled non-temporal tables can specify neither effective-time periods nor assertion-time periods. But in all embodiments, both those that support future assertions and those that do not, when a time period cannot be specified on a transaction, the default value of [Now(!)-9999] is used.

Thus, in both canonical tables and canonical files, the rows created by all temporal and temporally-enabled transactions include both time periods, and thus support the use of episodes. Episodes work on all and only those rows on which both effective- and assertion-time periods appear; but it does not matter whether the values for those time periods are explicitly specified on transactions, or are default values; and it does not matter whether those time periods appear on canonical tables, or only in the canonical files of canonically-supported tables.

In embodiments which support future assertions, assertion-time periods can be specified on transactions against all types of canonical tables, and on transactions against non-canonical bitemporal tables. This is because episodes are defined, for specific objects, on a two-dimensional temporal space, and effective-time periods and assertion-time periods together define such a two-dimensional space.

It may appear, however, that episodes cannot be used with non-canonical bitemporal tables because it may appear that non-canonical bitemporal tables do not have the concept of an object, and thus lack an object identifier.

But first of all, an object is defined, above, as "anything that can be distinguished from other instances of its type, and that can change over time." And an OID is defined, above, as "a unique identifier for an object."

Next, a temporal unique identifier is defined, above, as consisting of an object identifier, an assertion-time period and an effective-time period. It follows that the component of the temporal unique identifier of a standard bitemporal table which is not either of the time periods, is the object identifier for that table. It distinguishes the instance of the type represented by the table from all other instances. For example, in a Customer standard bitemporal table, the portion of the temporal unique identifier which uniquely identifies a customer, and distinguishes that customer from all other customers, is an object identifier, or OID.

Given this definition of "episode", it will therefore be apparent to one skilled in the art that episodes may be defined on and managed on standard bitemporal tables, canonical bitemporal tables, or canonically-supported bitemporal tables.

Future Assertions as Canonically-Agnostic

In another embodiment, future assertions against standard bitemporal tables can be managed by the systems and methods described herein.

To support future assertions, the tables to which they apply must contain both (i) an effective-time period and an assertion-time period, and (ii) distinct from both time periods, a column or other means of recording the point in time at which each row is physically created. The 624 deferred assertion canonical schema, shown in FIG. 28, provides an example of a canonical schema which contains a column which is distinct from both time periods, and which is used to record the point in time at which each row is physically created.

It therefore follows that any standard bitemporal table which records the point in time at which each row is physically created in a separate column from both time periods, is one which may contain future assertions. Future assertions are thus canonically-agnostic.

Match Predicates as Canonically-Agnostic

In another embodiment, match predicates for time periods are canonically agnostic.

For any uni-temporal or bitemporal table, a column can be added to the table which will take on one of two values, as described above, and which may appear as a match predicate in an index defined on the table. So it will be apparent to one skilled in the art that match predicates, as defined in this disclosure, are canonically-agnostic. That is, they may be defined on tables which are neither canonical nor canonically-supported.

Canonically-Agnostic Database Generation: Backward Compatibility.

In another embodiment, the ability of the systems and methods described herein can be extended (i) to generate temporal databases from temporal as well as non-temporal tables defined in a preliminary data model, (ii) to generate temporal databases whose tables are neither canonical tables nor canonically-supported tables, and (iii) to generate temporal tables which are valid for databases managed by specific DBMSs.

As described above, the systems and methods described herein can utilize an algorithm to generate a temporal database from a preliminary data model together with temporal metadata. The tables or entities in the preliminary data model are precursor tables. The temporal metadata, in one embodiment, is contained in the 501, 503, 505, and 507 metadata tables.

A "business key" in a temporal table was previously defined as consisting of columns that were not part of the PK of that table. However, in embodiments where business keys can be object identifiers, a business key can be defined less restrictively, as the column or columns in a temporal table which correspond to the primary key columns of the precursor table for that temporal table.

As described above, the systems and methods described herein can utilize an algorithm to generate a temporal database from a preliminary data model together with temporal metadata. In that embodiment, the tables or entities in the preliminary data model are non-temporal tables. The temporal metadata, in that embodiment, is contained in the 501, 503, 505, and 507 metadata tables. The tables generated, in that embodiment, are canonical tables.

But in another embodiment, the 511-525 metadata tables support the same functionality. This follows from the fact that the temporal metadata of metadata tables 511-525 contains all the metadata in temporal metadata tables 501-507. This establishes that 511-525 metadata fully supports the functionality described above, and is therefore an extension of it.

Specifically: the 501 metadata table, shown in FIG. 4, associates a precursor table with the table generated from it. For example, the column tbl-nm identifies the precursor table; the column temp-tbl-nm identifies the generated table. The 513 Table Metadata, shown in FIGS. 38*b*, 45*b* and 50*b*, does this with, respectively, the column prcrsr-tbl-nm and the column gen-tbl-nm.

The 503 metadata table, shown in FIG. 5, specifies the parent and child tables for a temporal foreign key by means of, respectively, the column src-tbl-nm and the column tar-tbl-nm. The 517 TFK Metadata table, shown in FIGS. 38*d* and 45*d*, does this by means of the two FKs which are part of the PK of the 517 TFK Metadata table.

The 503 metadata table uses the column req-fig to indicate whether or not the TFK is nullable. This is done, in the 511-525 metadata tables, by determining the minimum and maximum cardinality from the physical table definition of the precursor table, and storing this information in the columns min-card and max-card, respectively, of the 517 TFK Metadata table 503 uses the column del-rule-ind to indicate whether a delete, when there is at least one child for the TFK, should be (i) blocked, (ii) continued (with all child instances of the TFK set to null), or (iii) cascaded down the chain of child instances. This information may also be determined from the physical table definition of the precursor table. It is stored in the column del-rule of the 517 table.

The metadata table 505, shown in FIG. 6, uses the column bus-key-col-nm to indicate the column or columns which make up the business key of the temporal table indicated by the column tbl-nm. If there are multiple columns in the business key, they must occur in the same sequence as they do in the primary key of the precursor table. The Business Key Metadata table 515 uses the column bk-col-seq-nbr to establish the sequence of columns of the business key in the generated table.

The metadata table 507, shown in FIG. 7, maps temporal foreign key column names in a generated table (tbl-nm) to the corresponding column names of the corresponding foreign key in the precursor table. The Temporal Foreign Key Metadata table 517 uses the column tfk-seq-nbr to sequence temporal foreign keys in a generated table in the same sequence in which the corresponding foreign keys occur in the precursor table. The Temporal Foreign Key Column Metadata table 519 uses the column tfk-col-seq-nbr to sequence columns within TFKs.

Database Generation from a Precursor Temporal Table: a Case Study

Another embodiment extends the process of generating a temporal database from non-temporal precursor tables in a preliminary data model so that the process also supports generating a temporal database from temporal precursor tables, and also supports generating a temporal database whose generated tables include non-canonical tables.

The systems and methods described herein, in embodiments which use the 511-525 metadata tables, add the ability to generate temporal databases for specific DBMSs and specific current and future releases of those DBMSs. In addition, these embodiments include support for precursor tables that are themselves uni-temporal tables, and for precursor tables that are themselves bitemporal tables. Finally, support for generated tables that are non-canonical uni-temporal or bitemporal tables are also supported in these embodiments.

An example showing the process of generating a bitemporal Supplier-G table from an effective-time Supplier-P table together with associated metadata will be described to illustrate the use of this temporal metadata.

FIG. 49 shows a Supplier-P table, which is a precursor table 902, and Supplier-G table, which is a generated table 903. The arrow 901 from Supplier-P to Supplier-G represents the process of creating generated tables from precursor tables.

With this process 901, the systems and methods described herein create generated tables from precursor tables with the help of metadata tables. Metadata tables 511, 513, 515, 517, 519, 521, 523 and 525 provide the information needed to generate temporal tables and temporally-enabled tables from tables which are themselves temporal or non-temporal.

Step 1. For as many rows as there are in Table-Metadata 513, start building a CREATE TABLE statement, or other DDL statement which defines a table to a DBMS. Begin by plugging in the value from the gen-tbl-nm column. As shown in FIG. 50b, the name of the generated table will be Supplier-G.

Step 2. For each row in Table-Metadata 513, shown in FIG. 50b, define the object identifier (oid) type to be used in the generated tables. In this example, the Supplier-G table will use a surrogate-valued single column as its oid. The object identifier type, which is either "sk" (surrogate key) or "bk" (business key) is recorded in 513's gen-tbl-oid-typ column.

The Supplier-G oid column name will be supp-sk-id, as indicated by the TUI Column Metadata table 521 column tui-col-nm. The one or more columns making up the object identifier are those columns in the 521 table that have both flags set to 0.

The Supplier-G business key columns are the set of columns, in sequence, for db-id=7 and tbl-id=1, shown in the BK Column Metadata 515 table, in FIG. 50c. The business key column names are stored in the column bk-col-nm, and are snbr-bk and eff-tp. The column datatype of the column which does not represent a time period is taken from the physical table definition of the corresponding Supplier-P precursor table. The column datatype of the column which represents the effective-time period is, in one embodiment, always a time period datatype, regardless of how the time period is represented in the precursor table.

Step 3. In Table-Metadata 513, the column gen-tbl-pk-typ indicates whether or not the primary key of the generated table will be the temporal unique identifier (tui) of that table.

In this example, the primary key for the generated table will be the temporal unique identifier. The object identifier of the temporal unique identifier will be a surrogate key with the column name supp-sk-id. This is the one column in the TUI Column Metadata table 521, in FIG. 50c, both of whose flags are 0.

The Non-Key Metadata table 523, shown in FIG. 50e, completes the definitions of the remaining columns for the generated table. The column prcrsr-col-nm, in this table, is in fact redundant, since the column nk-seq-nbr indicates the sequence of non-key columns in the precursor table.

Step 4. The Precursor Time Period Metadata table 525 identifies Supplier-P as an effective-time table. Supplier-P is an effective-time table in which a single column represents a time period by means of a begin point in time. That is indicated by a value in the 525 column tp-one-col-nm and by the corresponding nulls in the "from" and "to" column names. Finally, the 525 column tp-open-closed-cnvntn indicates the convention used for the time period representation in the precursor table. In embodiments supported by this metadata table 525, time periods in generated tables are represented in single-columns with a time period datatype. In other embodiments, additional metadata could be used to allow time periods to be represented in different ways in generated tables.

The Precursor Time Period Metadata table 525 is used during the initial database conversion. It identifies the column or pair of columns which contain the source data which will be used to populate the effective time period in the generated table.

Step 5. The last step is to provide for temporal upward compatibility. All queries, and all insert, update and delete statements, which work against the precursor table (assuming there is a populated precursor table against which such SQL has already been written) must work, without modification, against the generated table.

As for queries, software utilizing the systems and methods described herein can be used to define and display a view over the generated table, for example by means of a CREATE VIEW statement, whose name is identical to the name of the precursor table.

In this view, the temporal unique identifier of the generated table must be replaced by the primary key of the precursor table. In this view, all temporal foreign keys, if any, must be replaced by the corresponding foreign keys in the precursor table. It will be apparent to one skilled in the art that the described metadata tables make it possible to do both these things.

Finally, columns must be added to the view corresponding to the non-key columns of the precursor table. The datatypes of these columns can be derived from the table definitions of the original precursor tables. The column names of these columns come from the prcrsr-col-nm column in Non-Key-Metadata 523.

Additionally, in a preferred embodiment, Instead Of Trigger SQL is utilized to maintain temporal upward compatibility for insert, update, and delete statements, as previously described.

In another aspect, the column target-db-info in Database-Metadata 511 can be used to tell software utilizing the systems and methods described herein what vendor-specific and release-specific type of database will be the target for the generated tables. With this information, the software can modify a DBMS-agnostic set of temporal table definitions to conform to the requirements of specific SQL dialects.

Utilizing the systems and methods described herein allow one skilled in the art to generate a temporal database from a precursor database plus temporal metadata. Generally, the basic idea is to map precursor data structures onto generated data structures in a DBMS-agnostic way, and then to translate the DBMS-agnostic SQL DDL into DDL appropriate for the specific target database.

Schema Evolution

In another embodiment, the systems and methods described herein may be used as part of a solution to the schema evolution problem.

Schema evolution is a difficult problem and is being actively worked on in the computer science community. However, as will be clear to one skilled in the art, the systems and methods described herein may be useful in implementing a solution to the schema evolution problem. For example, database table definitions, such as CREATE TABLE statements, or fragments thereof, from which complete table definitions might be assembled, may be stored as bitemporal data in the canonical schemas of the software and methods described herein. If they are, then a bitemporal history of all changes to these table definitions will be available to the software that does implement a schema evolution solution.

Conclusion

By means of the systems and methods described herein, the use of canonical schemas, whether in database tables or in the physical files which persist the data in database tables, simplifies the management of temporal data, including the relationships of that temporal data to temporally-enabled non-temporal data. Systems and software utilizing the methods described herein do this by using a canonical bitemporal schema to store all uni-temporal and bitemporal data, and also to store temporally-enabled non-temporal data. Systems and software utilizing the methods described herein incorporate the enforcement of entity integrity and referential integrity, which applies only to non-temporal data, as a special case of the enforcement of temporal entity integrity and temporal referential integrity, which applies to both temporal data and temporally-enabled non-temporal data.

Using the systems and methods described herein, when data appears to its users to have only one temporal dimension, a default value for the other temporal dimension is added to the transactions which maintain that data before those transactions are applied to their target tables 303 or 305, and a view mechanism, or similar mechanism, is used to support queries against those tables that are aware of only the explicit temporal dimension of that data. If data appears to its users to have no temporal dimensions, i.e. to be conventional, current data, then a default value for both temporal dimensions is added to transactions before they are applied to their target tables, and a view mechanism, or similar mechanism, is used to support queries against those tables that assume that only current data is available to query.

The systems and methods described herein use temporal metadata to simplify the creation and management of canonical tables, including temporally-enabled non-temporal tables, and also the creation and management of non-canonical tables. Temporal metadata makes it possible to generate canonical tables from non-temporal tables, and from non-canonical temporal tables. For those enterprises who wish to convert non-canonical tables into either uni-temporal or bitemporal non-canonical tables, the temporal metadata of the systems and methods described herein also support that conversion.

By means of canonical schemas, conventional tables may continue to be modeled, maintained, and queried as tables containing only current data. Within their generated canonical tables, or their associated canonical files, a complete bitemporal record of all changes to that data is preserved.

Temporal metadata also supports the "otherwise identical" capabilities provided by the systems and methods described herein. With these capabilities, a query for what the objects represented by canonical or canonically-supported data were like at any past point in time, or are like at the current moment in time, or are expected to be like at any future point in time, can always be satisfied—provided, of course, that the past, current or future states of those objects have been recorded in the database.

In addition, a query for what the database said, at any past point in time, that objects represented by its data were like, are currently like, or are expected to be like, can always be satisfied. This data may be found in assertion-time canonical tables, or it may remain resident in effective-time canonical tables or in bitemporal canonical tables.

In embodiments supporting future assertions, queries can also be supported that ask what the database is expected to say, at any future point in time, that objects represented by its data were like, are currently like, or are expected to be like.

Business intelligence software provides an extensive temporal history of events. The systems and methods described herein provide an equally extensive temporal history of the past, present, and future states of persistent objects, and also of the past, present and future states of the data that record those states of those objects. The systems and methods described herein also encapsulate the complexities of the evolutionary path from today's data management and access capabilities to the data management and access capabilities described herein.

What is claimed is:

1. A computer program for using a canonical table to persist a bitemporal history of data created by one or more transactions written to update a non-canonical table, embodied in a computer-readable storage medium, the computer program comprising:

logic adapted to transform the one or more transactions into one or more bitemporal transactions against the canonical table;

logic adapted to enforce at least one of temporal entity integrity and temporal referential integrity on the one or more bitemporal transactions;

logic adapted to update the canonical table with the one or more bitemporal transactions; and logic adapted to control a user interface to present a view of the canonical table as a queryable object whose set of rows is identical to a set of rows that would have resulted if the one or more transactions had been applied to the non-canonical table, wherein the canonical table is a table that uses a canonical schema.

2. The computer program of claim 1, further comprising:
logic adapted to determine when the non-canonical table is a non-temporal table; and
logic adapted to supplement each of the one or more transactions with a default transaction-time period and a default valid-time period.

3. The computer program of claim 1, further comprising:
logic adapted to determine when the non-canonical table is a non-canonical bitemporal table; and
logic adapted to supplement each of the one or more transactions with a default transaction-time period, and to supplement each of the one or more transactions with a default valid-time period if a valid-time period is not expressly provided on the transaction.

4. The computer program of claim 1, further comprising:
logic adapted to determine when the non-canonical table is a valid-time table; and
logic adapted to supplement each of the one or more transactions with a default transaction-time period, and to supplement each of the one or more transactions with a default valid-time period if a valid-time period is not expressly provided on the transaction.

5. A computer program for using a canonical file to persist a bitemporal history of the data created by one or more transactions written to update a non-canonical table, embodied in a computer-readable storage medium, the computer program comprising:
logic adapted to transform the one or more transactions into one or more bitemporal transactions against the canonical file;
logic adapted to enforce at least one of temporal entity integrity and temporal referential integrity on the one or more bitemporal transactions;
logic adapted to update the canonical file with the one or more bitemporal transactions; and
logic adapted to control a user interface to present a view of the canonical file as a queryable object whose set of rows is identical to a set of rows that would have resulted if the one or more transactions had been applied to the non-canonical table, wherein the canonical file is a storage structure that uses a canonical schema.

6. The computer program of claim 5, further comprising:
logic adapted to determine when the non-canonical table is a non-temporal table; and
logic adapted to supplement each of the one or more transactions with a default transaction-time period and a default valid-time period.

7. The computer program of claim 5, further comprising:
logic adapted to determine when the non-canonical table is a non-canonical bitemporal table; and
logic adapted to supplement each of the one or more transactions with a default transaction-time period, and to supplement each of the one or more transactions with a default valid-time period if a valid-time period is not expressly provided on the transaction.

8. The computer program of claim 5, further comprising:
logic adapted to determine when the non-canonical table is a valid-time table; and
logic adapted to supplement each of the one or more transactions with a default transaction-time period, and to supply each of the one or more transactions with a default valid-time period if a valid-time period is not expressly provided on the transaction.

9. A computer program for managing at least one parent table with a valid-time period and at least one child table with a valid-time period, the at least one child table containing a temporal foreign key that references the at least one parent table, embodied in a computer-readable storage medium, the computer program comprising:
logic adapted to persist the representation of at least one episode in the at least one parent table, the at least one episode comprising a valid-time earliest row and a group of zero or more other rows in the at least one parent table;
wherein the valid-time earliest row and the group of zero or more other rows have the same object identifier,
wherein the union of the valid-time period of the valid-time earliest row and the valid-time periods of the rows in the group of zero or more other rows is a valid-time period that extends continuously from the start of the valid-time earliest row's valid-time period to the end of the valid-time latest row's valid-time period, and
wherein, if the at least one parent table and the at least one child table both have a transaction-time period, the intersection of the transaction-time period of the valid-time earliest row and the transaction-time periods of the rows in the group of zero or more other rows is not empty.

10. The computer program of claim 9, further comprising:
logic adapted to enforce a constraint of temporal referential integrity by ensuring that for every non-null temporal foreign key in a row in the at least one child table there exists an episode of the at least one parent table,
wherein the object identifier of each of the valid-time earliest row and the group of zero or more other rows in the episode matches the object identifier designated by the temporal foreign key in at least one child row in the child table,
wherein the start of the valid-time period of the episode is no later than the start of the valid-time period of the at least one child row,
wherein the end of the valid-time period of the episode is no earlier than the end of the valid-time period of the at least one child row,
wherein, if the at least one parent table and the at least one child table both have a transaction-time period, the start of the transaction-time period of the episode is no later than the start of the transaction-time period of the at least one child row, and
wherein, if the at least one parent table and the at least one child table both have a transaction-time period, the end of the transaction-time period of the episode is no earlier than the end of the transaction-time period of the at least one child row.

11. The computer program of claim 9:
wherein the valid-time earliest row in an episode in the at least one parent table is not valid-time contiguous with a valid-time earlier row in the at least one parent table that has an identical object identifier,
wherein the valid time latest row in an episode in the at least one parent table is not valid-time contiguous with a valid-time later row in the at least one parent table that has the same object identifier,
wherein, if the at least one parent table has a transaction-time period, the valid-time earliest row in an episode in the at least one parent table is not valid-time contiguous with a valid-time earlier row in the at least one parent table that has the same object identifier and that has a transaction-time period that shares at least one point in time with the transaction-time period of the valid-time earliest row in the episode, and wherein, if the at least one parent table has a transaction-time period, the valid-time latest row in an episode in the at least one parent table is not valid-time contiguous with a valid-time later row in the at least one parent table that has the same object identifier and that has a transaction-time period that shares at least one point in time with the transaction-time period of the valid-time latest row in the episode.

12. A computer program for managing at least one bitemporal table, embodied in a computer-readable storage medium, the computer program comprising:

logic adapted to apply at least one transaction that specifies a future transaction-time period to the at least one bitemporal table;

logic adapted to add at least one row with a future transaction-time period to the at least one bitemporal table if the at least one transaction is an insert transaction;

logic adapted to apply at least one of temporal entity integrity and temporal referential integrity to the at least one transaction that specifies a future transaction-time period; and logic adapted to control a user interface to present rows with future transaction-time periods as queryable objects.

13. The computer program of claim 12, further comprising:

logic adapted to prevent any transaction from updating or deleting a first row in the at least one bitemporal table for which there is a second, correlated row in the at least one bitemporal table;

wherein the first row in the at least one bitemporal table has a transaction-time period that does not end in the past, wherein the first row in the at least one bitemporal table has the same object identifier as the correlated row in the at least one bitemporal table, wherein the valid-time period of the first row in the at least one bitemporal table and the valid-time period of the second, correlated row in the at least one bitemporal table have at least one point in valid time in common, and wherein the second, correlated row in the at least one bitemporal table has a transaction-time period that begins later than the transaction-time period of the first row.

14. The computer program of claim 12, further comprising:

logic adapted to replace a far-future transaction-time period on at least one row in the bitemporal table with a near-future transaction-time period.

15. The computer program of claim 12, further comprising:

logic adapted to replace a near-future transaction-time period on at least one row in the bitemporal table with a far-future transaction-time period.

16. A computer program for creating at least one generated table definition from at least one precursor table definition, embodied in a computer-readable storage medium, comprising:

logic adapted to create the at least one generated table definition using metadata that identifies a database that will contain the at least one generated table definition and metadata that identifies a data management system that will manage the database;

logic adapted to ensure that the generated table definition is valid for the data management system that will manage the database that will contain the generated table definition;

logic adapted to create, for a foreign key definition or a temporal foreign key definition in the at least one precursor table definition, a temporal foreign key definition in the generated table definition if the temporal foreign key definition in the generated table definition references a temporal table; and logic adapted to create, for a foreign key definition or a temporal foreign key definition in the at least one precursor table definition, a non-temporal foreign key definition in the generated table definition if the non-temporal foreign key definition in the generated table references a non-temporal table, wherein the type of the precursor table defined by the precursor table definition and the type of the generated table defined by the generated table definition are each one of a non-temporal table, a valid-time table, a transaction-time table, or a bitemporal table, and wherein the type of the precursor table defined by the precursor table definition and the type of the generated table defined by the generated table definition are not the same type.

17. The computer program of claim 16, further comprising:

logic adapted to use metadata that defines at least one precursor table and a table to be generated from the at least one precursor table, to convert the rows of the at least one precursor table into rows which conform to the table definition of the table to be generated from the at least one precursor table.

18. A computer program for managing at least one temporal parent table and at least one temporal child table, the at least one temporal child table containing at least one temporal foreign key referencing the at least one temporal parent table, the at least one temporal parent generated from at least one non-temporal parent table and the at least one temporal child table generated from at least one non-temporal child table, the at least one non-temporal child table containing a foreign key referencing the at least one non-temporal parent table, embodied in a computer-readable storage medium, the computer program comprising:

logic adapted to apply at least one temporal transaction to the at least one temporal child table; and logic adapted to apply the constraint of temporal referential integrity to the at least one temporal transaction, wherein the type of the temporal child table is one of a valid-time table, a transaction-time table, or a bitemporal table, wherein the type of the temporal parent table is one of a valid-time table, a transaction-time table, or a bitemporal table, wherein the type of the temporal child table and the type of the temporal parent table are the same type, and wherein the minimum cardinality and the maximum cardinality of the temporal foreign key in the temporal child table match the minimum cardinality and the maximum cardinality of the foreign key in the non-temporal child table.

19. A computer program for managing at least one table having a transaction-time period, embodied in a computer-readable storage medium, the computer program comprising:

logic adapted to utilize a column in the at least one table, wherein the column contains a value indicating that the end point in time of the transaction-time period of a row in the at least one table is a past point in time, and a value indicating that end point in time of the transaction-time period of the row in the at least one table is not a past point in time;

logic adapted to initialize the column, on all rows inserted by temporal transactions, to the value that indicates that the end point in time of the transaction-time period of the row in the at least one table is not a past point in time; and logic adapted to update the column, on all rows logically deleted by temporal transactions, to the value that indicates that the end point in time of the transaction-time period of the row in the at least one table is a past point in time.

20. The computer program of claim 19, further comprising logic adapted to utilize an index which includes the column as a match predicate positioned prior to any range predicates in the index.

21. A computer program for managing at least one table having a valid-time period, embodied in a computer-readable storage medium, the computer program comprising:

logic adapted to utilize a column in the at least one table, wherein the column contains a value indicating that the end point in time of the valid-time period of a row in the at least one table is a past point in time, and a value indicating that end point in time of the valid-time period of the row in the at least one table is not a past point in time;

logic adapted to initialize the column to the value that indicates that the end point in time of the valid-time period of the row in the at least one table is a past point in time, on all rows inserted by temporal transactions that specify valid-time periods that are entirely in the past;

logic adapted to initialize the column to the value that indicates that the end point in time of the valid-time period of the row in the at least one table is not a past point in time, on all rows inserted by means of temporal transactions that specify or accept as default values valid-time periods that are not in entirely the past; and logic adapted to set the value of the column on every row in the at least one table whose valid-time period end point in time is set by a temporal transaction to the time at which the temporal transaction takes place or to a past point in time, to the value that indicates that the end point in time of the valid-time period of the row is a past point in time.

22. The computer program of claim 21, further comprising logic adapted to utilize an index which includes the column as a match predicate positioned prior to any range predicates in the index.

* * * * *